(12) United States Patent
Webster et al.

(10) Patent No.: US 10,827,801 B2
(45) Date of Patent: Nov. 10, 2020

(54) LAST FOR AN ARTICLE OF FOOTWEAR

(71) Applicant: Under Armour, Inc., Baltimore, MD (US)

(72) Inventors: James Webster, Baltimore, MD (US); Thomas Foxen, Portland, OR (US); David McManus, Portland, OR (US)

(73) Assignee: UNDER ARMOUR, INC., Baltimore, MD (US)

( * ) Notice: Subject to any disclaimer, the term of this patent is extended or adjusted under 35 U.S.C. 154(b) by 213 days.

(21) Appl. No.: 15/907,702

(22) Filed: Feb. 28, 2018

(65) Prior Publication Data

US 2018/0242693 A1  Aug. 30, 2018

Related U.S. Application Data

(60) Provisional application No. 62/464,922, filed on Feb. 28, 2017.

(51) Int. Cl.
  *A43B 23/02* (2006.01)
  *A43B 5/00* (2006.01)
  (Continued)

(52) U.S. Cl.
  CPC .......... *A43B 23/0245* (2013.01); *A43B 1/14* (2013.01); *A43B 5/00* (2013.01); *A43B 9/00* (2013.01); *A43B 23/025* (2013.01); *A43D 11/01* (2013.01); *B05D 1/02* (2013.01); *B32B 3/30* (2013.01); *B32B 5/02* (2013.01); *B32B 5/18* (2013.01); *B32B 5/245* (2013.01); *B32B 27/065* (2013.01); *B32B 27/40* (2013.01); *A43B 1/04* (2013.01); *A43B 3/0036* (2013.01); *A43B 3/0078* (2013.01); *A43B 5/02* (2013.01); *A43B 5/025* (2013.01); *A43B 7/08* (2013.01); *A43B 7/144* (2013.01); *A43B 23/026* (2013.01); *A43B 23/0215* (2013.01); *A43B 23/0225* (2013.01); *A43B 23/0235* (2013.01); *A43B 23/0265* (2013.01); *A43B 23/042* (2013.01);
  (Continued)

(58) Field of Classification Search
  CPC ...... A43B 23/0245; A43B 23/26; A43D 3/02; A43D 3/04; A43D 3/026
  See application file for complete search history.

(56) References Cited

U.S. PATENT DOCUMENTS 956,576 A * 5/1910 Goding ................. A43D 3/026
                                                    12/137
1,969,962 A   8/1934 Bodle et al.
(Continued)

FOREIGN PATENT DOCUMENTS

SU           1639603 A1    4/1991

OTHER PUBLICATIONS

PCT International Search Report and Written Opinion, PCT/US2018/020151, dated Aug. 2, 2018, 6 pages.
(Continued)

*Primary Examiner* — Shaun R Hurley
*Assistant Examiner* — Bao-Thieu L Nguyen
(74) *Attorney, Agent, or Firm* — Edell, Shapiro & Finnan, LLC

(57) ABSTRACT

A last for forming an upper of an article of footwear includes an exterior surface, where the exterior surface includes a plurality of three dimensional structural surface components disposed over at least 50% of the exterior surface of the last.

18 Claims, 28 Drawing Sheets

(51) Int. Cl.

| | | |
|---|---|---|
| *A43B 9/00* | (2006.01) | |
| *B32B 5/18* | (2006.01) | |
| *B32B 3/30* | (2006.01) | |
| *B32B 5/24* | (2006.01) | |
| *B32B 5/02* | (2006.01) | |
| *B32B 27/06* | (2006.01) | |
| *B32B 27/40* | (2006.01) | |
| *A43D 11/01* | (2006.01) | |
| *A43B 1/14* | (2006.01) | |
| *B05D 1/02* | (2006.01) | |
| *B29K 105/04* | (2006.01) | |
| *A43D 3/02* | (2006.01) | |
| *B29D 35/12* | (2010.01) | |
| *B29K 75/00* | (2006.01) | |
| *A43B 23/17* | (2006.01) | |
| *A43D 100/04* | (2006.01) | |
| *A43D 100/00* | (2006.01) | |
| *A43D 100/06* | (2006.01) | |
| *A43B 7/14* | (2006.01) | |
| *A43B 23/08* | (2006.01) | |
| *A43B 7/08* | (2006.01) | |
| *A43B 1/04* | (2006.01) | |
| *B33Y 80/00* | (2015.01) | |
| *A43B 5/02* | (2006.01) | |
| *A43B 3/00* | (2006.01) | |
| *B29D 35/06* | (2010.01) | |
| *B29D 35/14* | (2010.01) | |
| *A43B 23/04* | (2006.01) | |
| *A43B 23/26* | (2006.01) | |
| *A43D 8/16* | (2006.01) | |

(52) U.S. Cl.
CPC .............. *A43B 23/087* (2013.01); *A43B 23/17* (2013.01); *A43B 23/26* (2013.01); *A43D 3/02* (2013.01); *A43D 3/026* (2013.01); *A43D 8/16* (2013.01); *A43D 100/00* (2013.01); *A43D 100/04* (2013.01); *A43D 100/06* (2013.01); *B29D 35/061* (2013.01); *B29D 35/126* (2013.01); *B29D 35/128* (2013.01); *B29D 35/146* (2013.01); *B29K 2075/00* (2013.01); *B29K 2105/04* (2013.01); *B32B 2266/0278* (2013.01); *B32B 2437/02* (2013.01); *B33Y 80/00* (2014.12)

(56) References Cited

U.S. PATENT DOCUMENTS

| | | | |
|---|---|---|---|
| 2,789,933 A | 4/1957 | Bargmeyer | |
| 3,106,729 A | 10/1963 | Kamborian | |
| 3,720,971 A | 3/1973 | Wyness et al. | |
| 4,295,238 A * | 10/1981 | Clark ................. | B29D 35/061 12/142 RS |
| 4,354,318 A | 10/1982 | Frederick et al. | |
| 6,299,962 B1 * | 10/2001 | Davis ................. | A43B 23/0255 12/142 P |
| 6,845,541 B1 * | 1/2005 | Lai ..................... | A43D 3/02 12/123 |
| 6,871,424 B2 | 3/2005 | Labonte et al. | |
| 7,047,668 B2 | 5/2006 | Burris et al. | |
| 8,005,558 B2 * | 8/2011 | Waatti .................. | A43D 3/02 700/98 |
| 8,084,117 B2 * | 12/2011 | Lalvani .................. | B32B 3/266 428/135 |
| 8,124,549 B2 | 2/2012 | Torres et al. | |
| 8,316,561 B2 | 11/2012 | Jia | |
| 8,757,038 B2 | 6/2014 | Siegismund | |
| 8,850,723 B2 | 10/2014 | Greene et al. | |
| 9,463,481 B2 | 10/2016 | Peng et al. | |
| 2001/0055684 A1 * | 12/2001 | Davis ................. | A43B 23/0255 428/379 |
| 2004/0168349 A1 * | 9/2004 | Cole, III ............... | A43B 13/14 36/25 R |
| 2005/0142331 A1 * | 6/2005 | Anderson .................. | B31F 1/07 428/152 |
| 2005/0287371 A1 * | 12/2005 | Chaudhari .............. | B60R 19/18 428/412 |
| 2006/0155417 A1 * | 7/2006 | Cremaschi ................ | A43D 3/02 700/182 |
| 2006/0276095 A1 | 12/2006 | Dua et al. | |
| 2008/0168684 A1 | 7/2008 | Aly | |
| 2010/0175276 A1 | 7/2010 | Dojan et al. | |
| 2010/0286583 A1 | 11/2010 | Torres et al. | |
| 2011/0156314 A1 * | 6/2011 | Alberg .................... | B29C 41/26 264/334 |
| 2011/0159758 A1 * | 6/2011 | Martin .................... | B32B 3/266 442/1 |
| 2011/0185594 A1 | 8/2011 | Zhang et al. | |
| 2012/0066931 A1 * | 3/2012 | Dojan ................. | A43B 23/0235 36/83 |
| 2012/0144703 A1 | 6/2012 | Trinkaus et al. | |
| 2013/0171409 A1 * | 7/2013 | Meli ....................... | B29C 70/48 428/131 |
| 2013/0291317 A1 * | 11/2013 | Hanson ..................... | A43D 3/04 12/133 R |
| 2013/0305465 A1 * | 11/2013 | Siegismund ............... | A43B 9/12 12/146 C |
| 2014/0059734 A1 * | 3/2014 | Toronjo .................. | A41D 1/00 2/69 |
| 2014/0101816 A1 * | 4/2014 | Toronjo .................. | A41D 31/02 2/69 |
| 2014/0109286 A1 * | 4/2014 | Blakely .................. | A41D 31/02 2/69 |
| 2014/0196321 A1 | 7/2014 | Wu et al. | |
| 2014/0223671 A1 * | 8/2014 | Fisher .................... | A43D 3/022 12/133 R |
| 2014/0237738 A1 * | 8/2014 | Johnson .................. | A43D 25/07 12/107 R |
| 2014/0237853 A1 * | 8/2014 | Fisher .................... | A43D 3/022 36/46.5 |
| 2014/0283410 A1 | 9/2014 | Marvin et al. | |
| 2015/0013187 A1 * | 1/2015 | Taniguchi ................ | A43B 1/04 36/84 |
| 2015/0282564 A1 * | 10/2015 | Meschter ................ | A43B 23/227 36/45 |
| 2015/0282565 A1 * | 10/2015 | Kilgore ................ | A43B 23/227 36/45 |
| 2016/0166010 A1 | 6/2016 | Bruce et al. | |
| 2016/0166011 A1 | 6/2016 | Bruce et al. | |
| 2016/0168774 A1 * | 6/2016 | Breithaupt ............... | D04H 1/70 36/50.1 |
| 2016/0206049 A1 * | 7/2016 | Kallayil .................. | A43D 3/025 |
| 2017/0035147 A1 * | 2/2017 | Farris .................... | A43B 23/026 |
| 2017/0071291 A1 | 3/2017 | Follet et al. | |
| 2017/0156443 A1 * | 6/2017 | Guyan ...................... | A45F 3/12 |
| 2017/0238659 A1 * | 8/2017 | Bohnsack ........... | A43B 23/0245 |
| 2018/0263339 A1 * | 9/2018 | Neumann .................. | A43B 1/02 |
| 2018/0317606 A1 * | 11/2018 | Schneider .............. | A43B 9/20 |
| 2018/0333903 A1 * | 11/2018 | Condon .................. | B29C 43/34 |
| 2018/0352893 A1 * | 12/2018 | Cross ...................... | A43B 11/00 |
| 2019/0152149 A1 * | 5/2019 | Arayama ................ | A43D 3/02 |
| 2019/0252291 A1 * | 8/2019 | Huitink ................ | H01L 23/562 |

OTHER PUBLICATIONS

Hodakel, "What is Sympatex Fabric: Properties, How its Made and Where", https://sewport.com/fabrics-directory/sympatex-fabric. accessed Oct. 17, 2019 (2019), 24 pages.

* cited by examiner

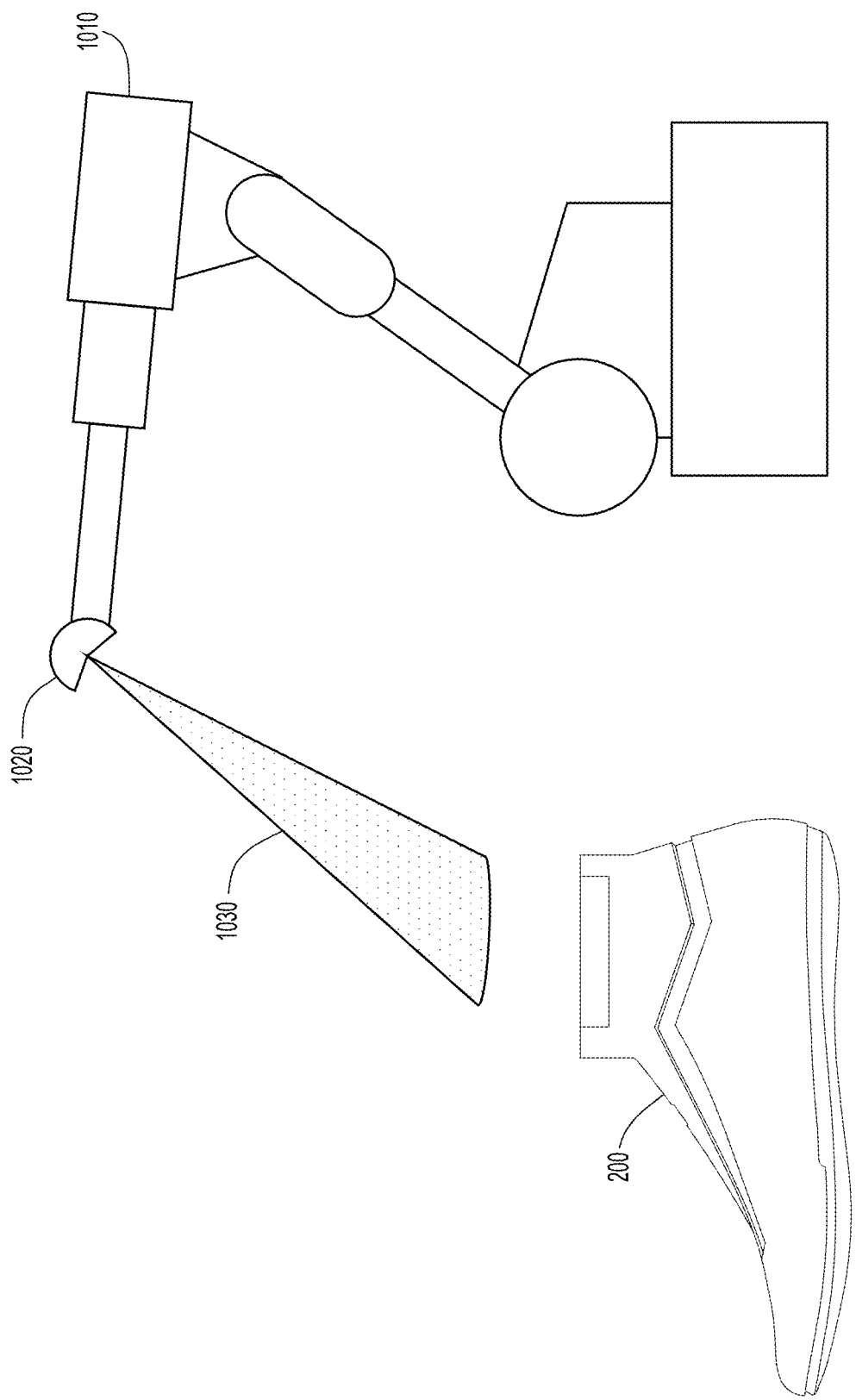

LAST FOR AN ARTICLE OF FOOTWEAR

FIELD OF THE INVENTION

The present invention relates to forming an article of footwear using a last and, in particular, to forming an upper via a deposition process onto the last.

BACKGROUND

Articles of footwear typically include an upper and a sole structure attached in some manner to the upper. For example, an article of footwear or shoe typically includes an upper secured (e.g., via adhesive and/or stitching) to a sole structure that can include a midsole (to provide a level of cushioning to a user depending upon a particular use) and an outsole to provide a certain level of traction and/or wear resistance to the bottom of the shoe.

The upper can be formed from a number of different types of materials depending upon the desired features of the upper. For example, the upper can be formed of natural or synthetic polymer materials that are either molded to form the upper or formed from filaments or fibers (e.g., using a knitting or weaving process). Further, uppers can be formed with layers of materials, such as materials that include fabric layers with foam and/or other types of cushioning materials provided between the fabric layers. Further still, the outer surface of an upper can be contoured with different patterns or designs, sometimes very intricate design patterns that increase the complexity of the manufacturing process used to form the upper.

Manufacturing uppers having different features, made of different materials and/or having different layers for particular end uses can be a difficult and time consuming process which can also include human interactions at a number of stages during the manufacture process. This can in turn make it difficult to mass produce certain types of shoes.

SUMMARY OF THE INVENTION

In example embodiments, a last for forming an upper of an article of footwear comprises an exterior surface, where the exterior surface includes a plurality of three dimensional structural surface components disposed over at least 50% of the exterior surface of the last.

In some example embodiments, the structural surface components include a plurality of different patterns. At last one pattern can repeat along a portion of the exterior surface.

The present invention facilitates a number of advantages in forming an upper and/or combined upper and sole structure for a shoe. For example, detailed and intricate structural features can be easily formed on an exterior surface of the upper based upon corresponding (but reversed or inverted) structural features provided on the last used to spray form the upper. Internal structural features (i.e., structural features provided between inner and outer layers of the upper) can also be easily integrated within the upper in accordance with techniques described herein.

The above and still further features and advantages of the present invention will become apparent upon consideration of the following detailed description of specific embodiments thereof.

BRIEF DESCRIPTION OF THE DRAWINGS

FIGS. 10A-10D depict automated processing steps for forming an upper in accordance with an embodiment of the invention as described herein, in which a robotic arm spray application is used to spray form layers on a last to form the upper.

Figure 1A:
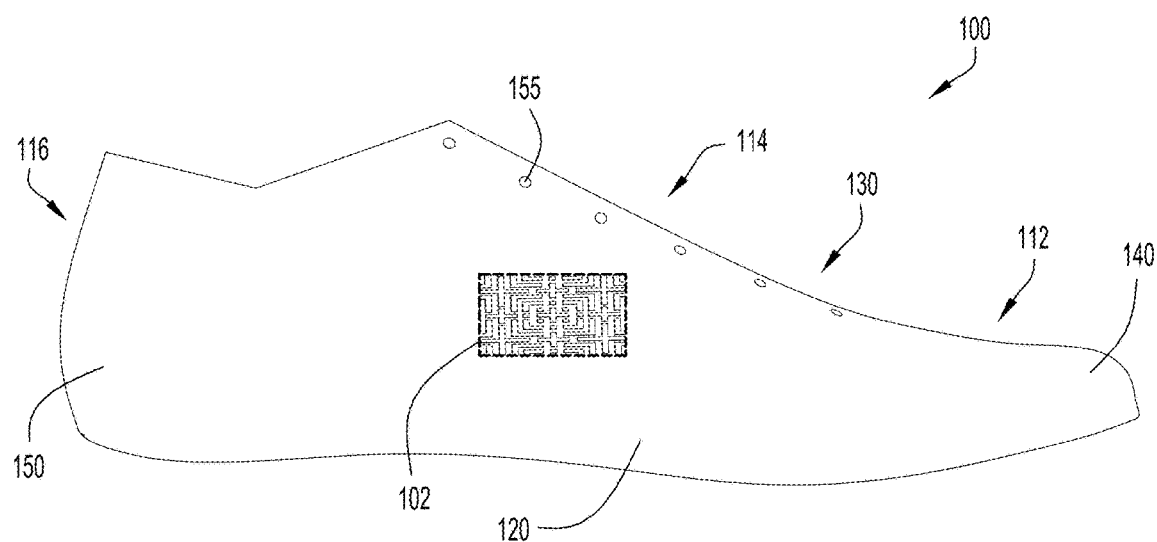
FIGS. 1A and 1B are side views of an upper for a shoe formed with the spray deposition process in accordance with an embodiment of the invention as described herein.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

DETAILED DESCRIPTION

Aspects of the disclosure are disclosed herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Further, the terms "comprising," "including," "having," and the like, as used with respect to embodiments of the present disclosure, are synonymous.

Initially, it is noted that the figures depict embodiments of an upper or an article of footwear including an upper and sole structure and further embodiments of a last for three dimensionally spray forming an upper and/or upper with sole structure for a single foot (e.g., an upper, an upper with sole structure, or a last for a left foot or, alternatively, for a right foot of a user). However, it is noted that the same or similar features can also be provided for a last or an upper or upper with sole structure that forms an article of footwear (shoe) configured for the opposing foot (e.g., for the opposing right or left foot of a user), where such features of the upper, upper with sole structure and last forming the upper and/or sole structure for the other foot can be a reflection or can be "mirror image" symmetrical in relation to the last, upper and/or sole structure depicted in the figures.

As described herein with reference to the example embodiments of the figures, an article of footwear or shoe is formed with an upper that is formed via a liquid particle deposition or spray forming process. In particular, one or more layers are sprayed or spray deposited onto a footwear or shoe mold, also referred to herein as a "shoe last" or a "last", to form the upper. The spray forming process can comprise spraying/depositing droplets of polymer material onto the last to build up/form a layer of a desired thickness. Further layers can be spray formed or applied in any other suitable manner over a spray formed layer so as to form a multi-layered upper structure on the last. The spray formed upper can be combined in any conventional or other suitable manner with a sole structure (e.g., a sole structure including a midsole and/or an outsole) to form the shoe. In other embodiments, an entire shoe, including upper and sole structure (i.e., midsole and/or outsole), can be formed by a spray forming process as described herein.

As described herein, the spray coating or spray deposition process, also referred to herein as spray forming, of the present invention is used to form one or more layers over a shoe last by depositing polymer material (e.g., deposited from a spray nozzle) onto the last. The polymer material can be deposited in solid (e.g., solid fibers or filaments), semi-solid (e.g., partially solid polymer material) and/or liquid state in the spray deposition process. After the polymer material is deposited as one or more layers over selected portions of the shoe last, the polymer material is sufficiently set, solidified or cured/hardened to form at least a portion of an upper. The upper is removed from the last and further processed as necessary for a particular embodiment to form the shoe. The spray forming process to form a layer over the last comprises building up the layer (i.e., increasing a thickness of the layer) by depositing material that forms the layer onto or over the last until a layer of sufficient or desired thickness is achieved.

As discussed in greater detail, below, a composite article of footwear or a component thereof (e.g., an upper) is created utilizing a spray process in which a polymer is atomized to produce a jet of fine particles (e.g., liquid droplets optionally with solid filaments or fibers suspended therein). The atomized polymer is applied to a surface (e.g., a mechanical form or mold configured in the shape of a human foot to define a shoe last). The polymer is applied via one or more passes to form a coating having a predetermined thickness. In particular, multiple coatings may be applied utilizing different polymer compositions to form additional build layers. The texture on the last may include both a macrostructure (large scale protrusions defining valleys and hills capable of preventing tears along the composite), as well as microstructure (surface texture providing tactile sensation or increasing the surface roughness on the macrostructure).

Example Embodiments of Spray Formed Shoe Uppers

Figure 1B:
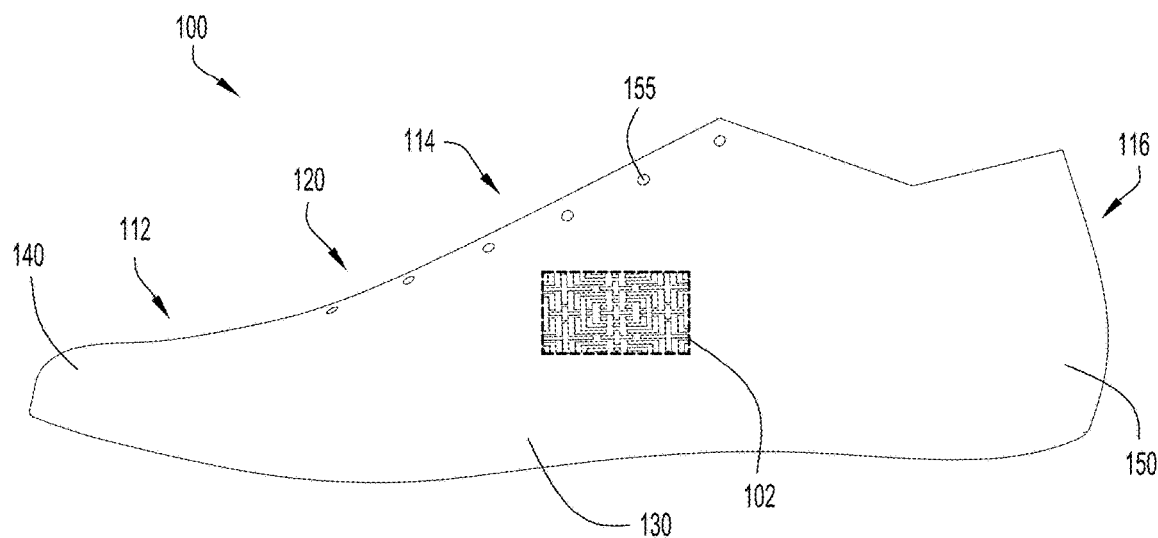
Figure 1C:
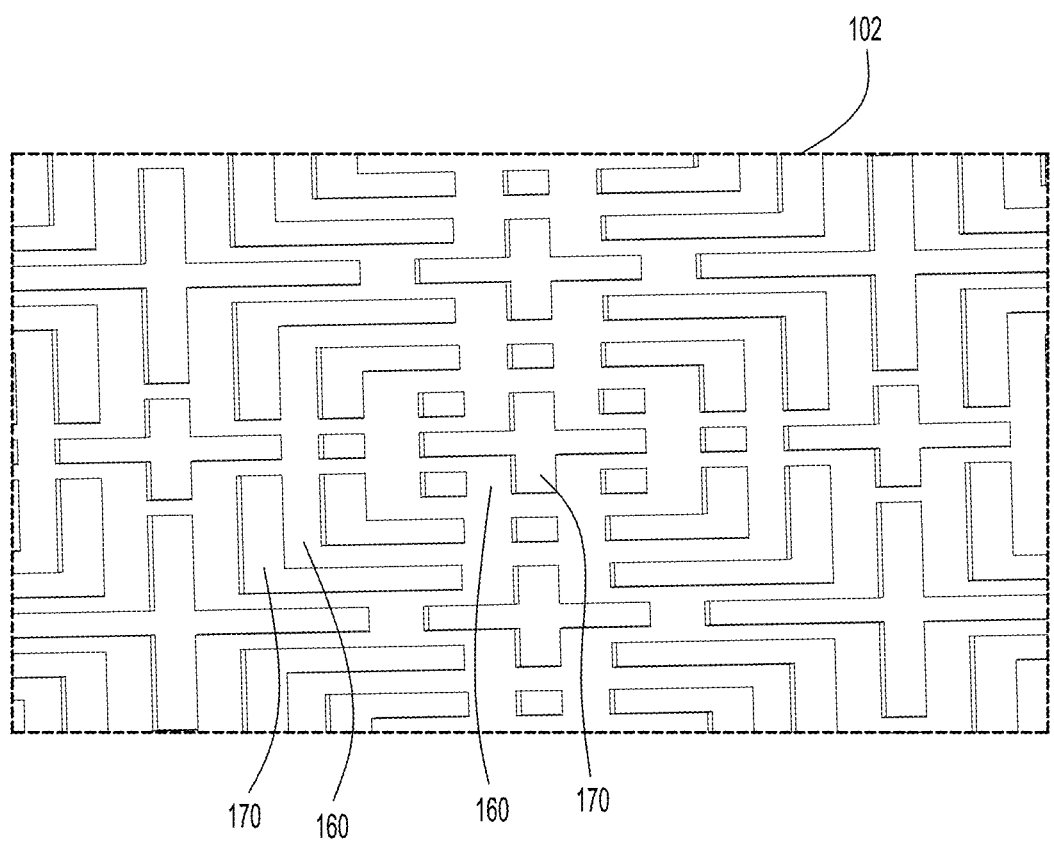
FIG. 1C is an enlarged view of a side portion of the upper of FIG. 1A showing structural features formed on the exterior surface of the upper.
Figure 2A:
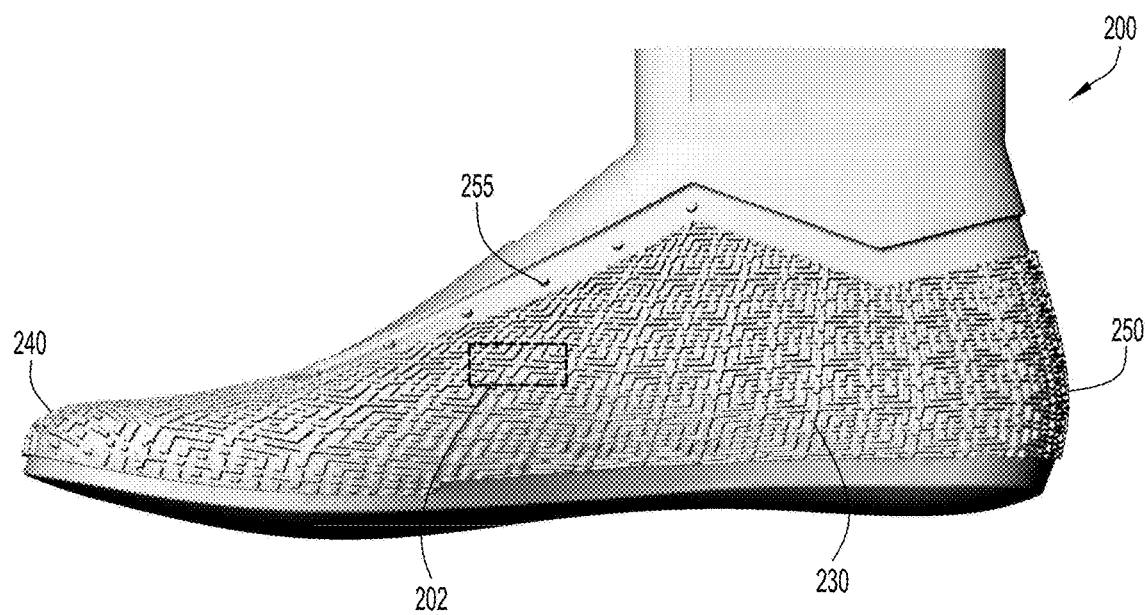
FIGS. 2A and 2B are views of opposite sides of a shoe last used to form the upper of FIG. 1A.
Figure 2B:
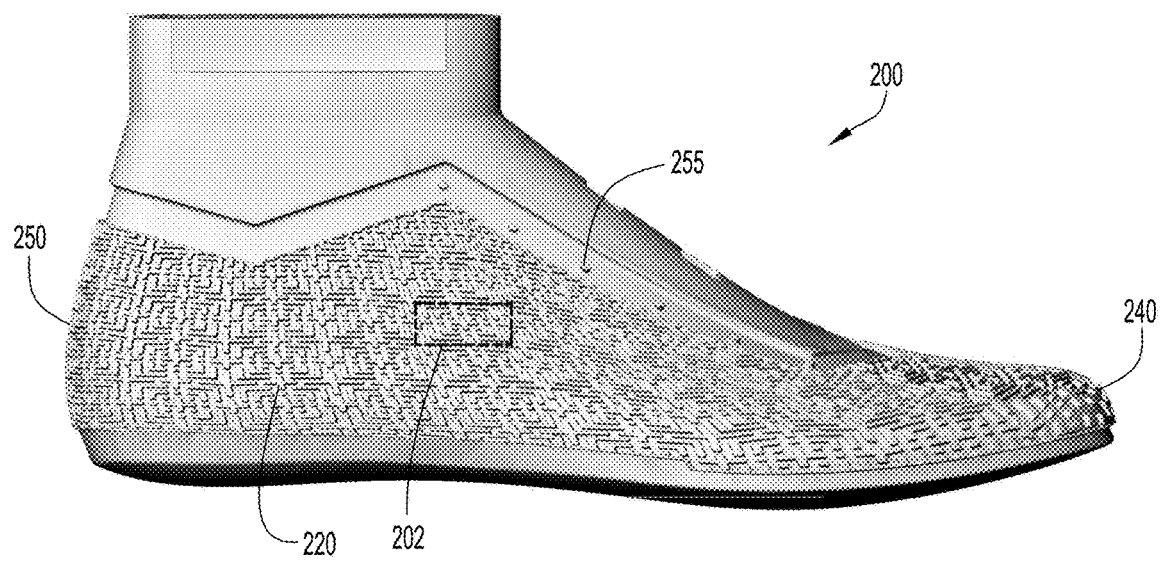
Figure 2C:
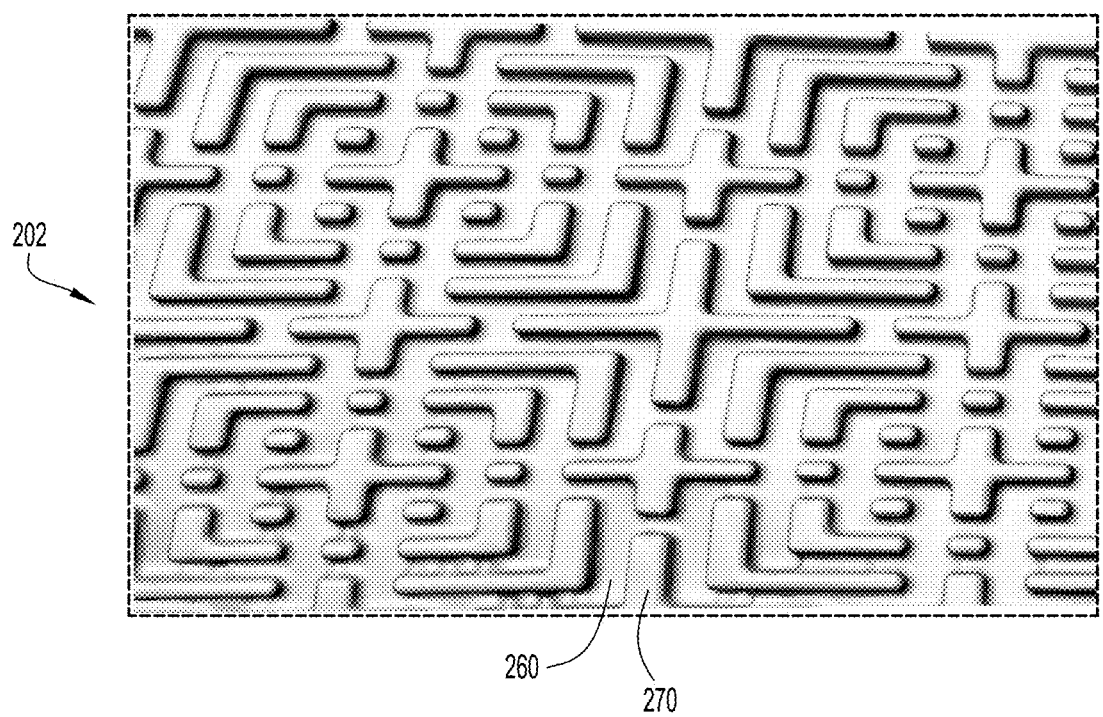
FIG. 2C is an enlarged view of a side portion of the shoe last of FIGS. 2A-2B showing structural features disposed on the exterior surface of the shoe last that define an inverted contour or "negative image" pattern that forms structural features for exterior surface portions of the shoe last as shown in FIG. 1C.
Figure 3A:
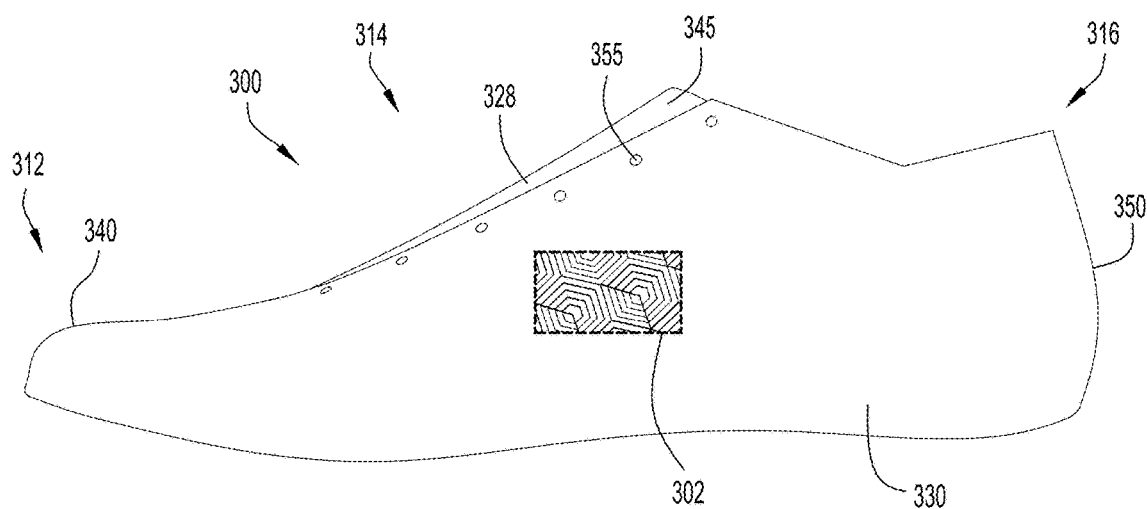
FIGS. 3A and 3B are side views of another embodiment of an upper for a shoe formed with the spray deposition process in accordance with the invention as described herein.
Figure 3B:
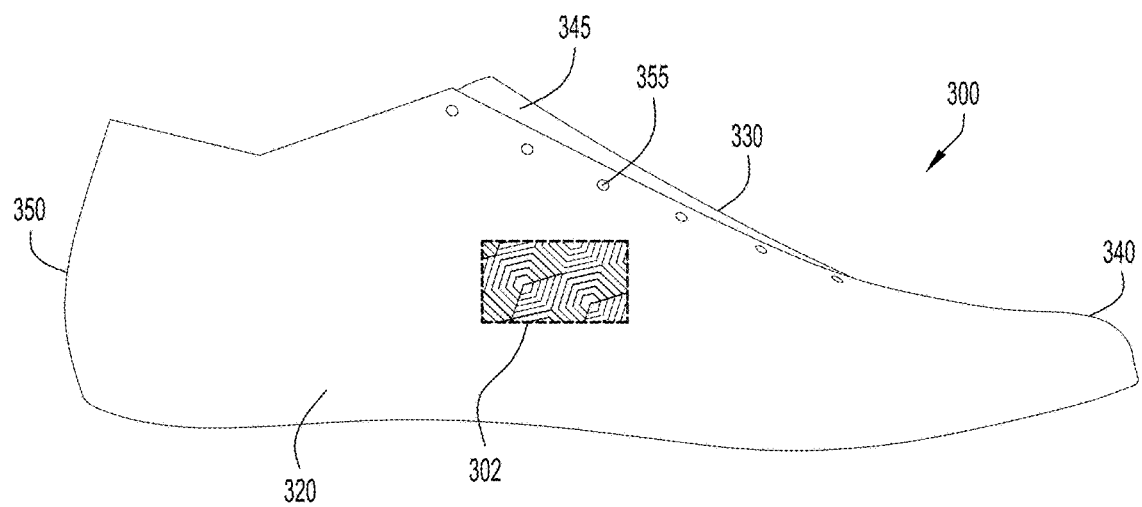
Figure 3C:
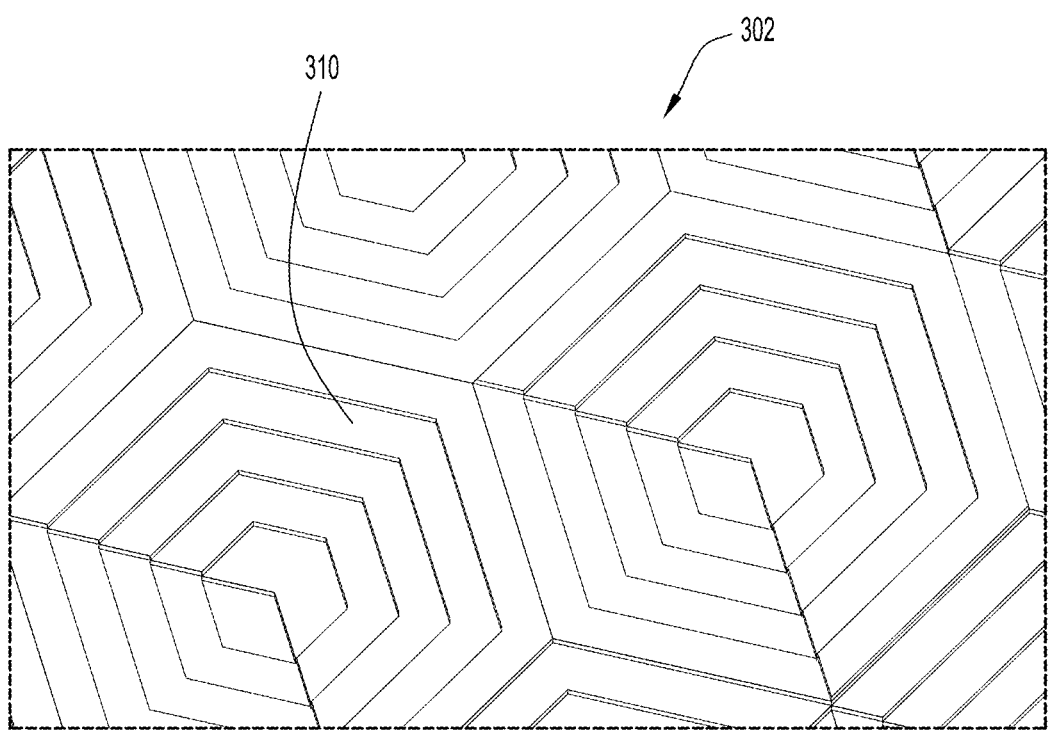
FIG. 3C is an enlarged view of a portion of the upper of FIGS. 3A-3B showing structural surface features formed on the exterior surface of the upper.
Figure 4A:
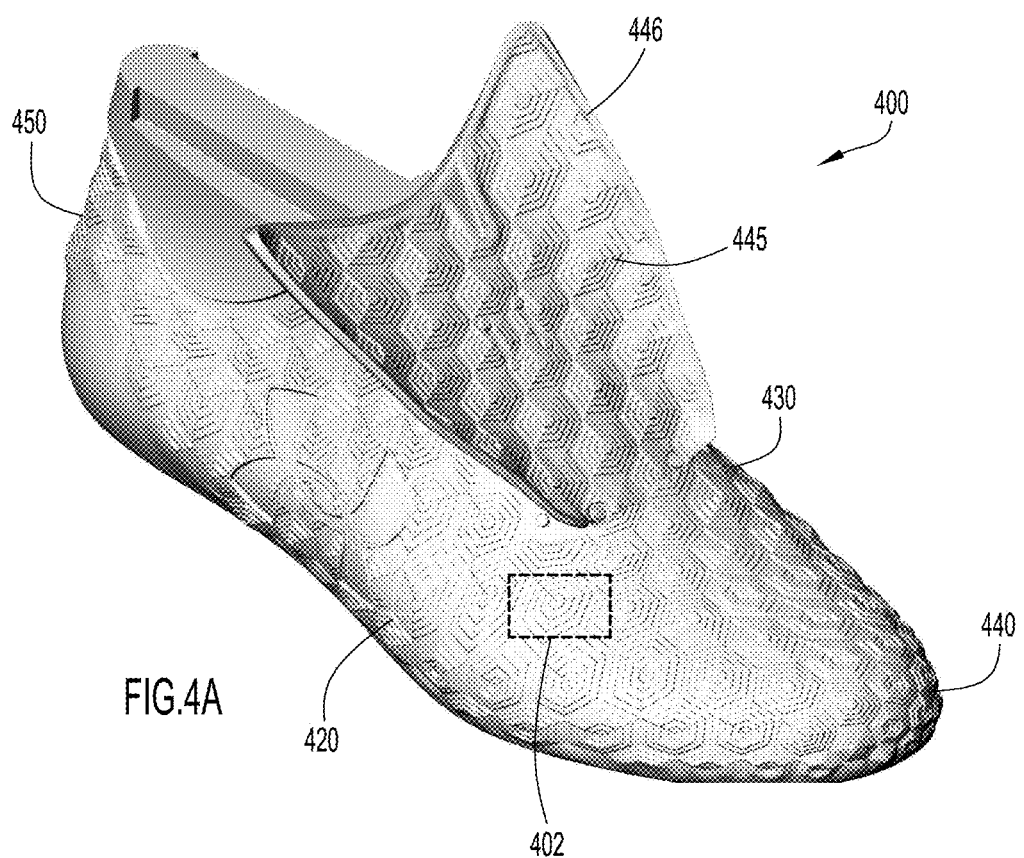
FIGS. 4A and 4B are side views in perspective of a shoe last used to form the upper of FIGS. 3A and 3B.
Figure 4B:
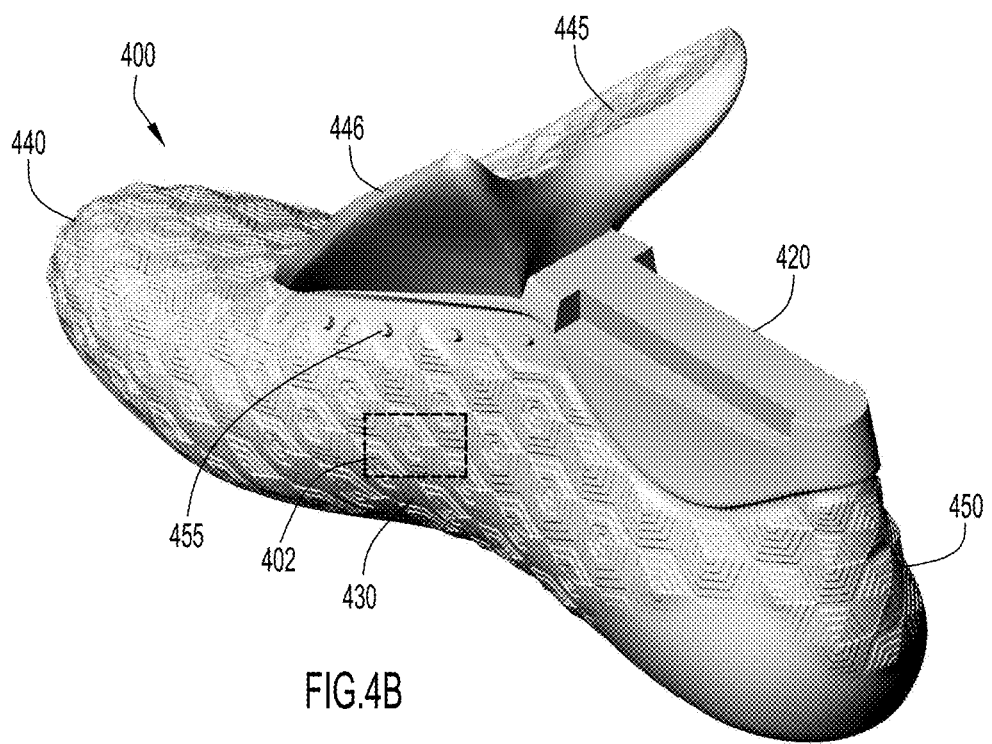
Figure 4C:
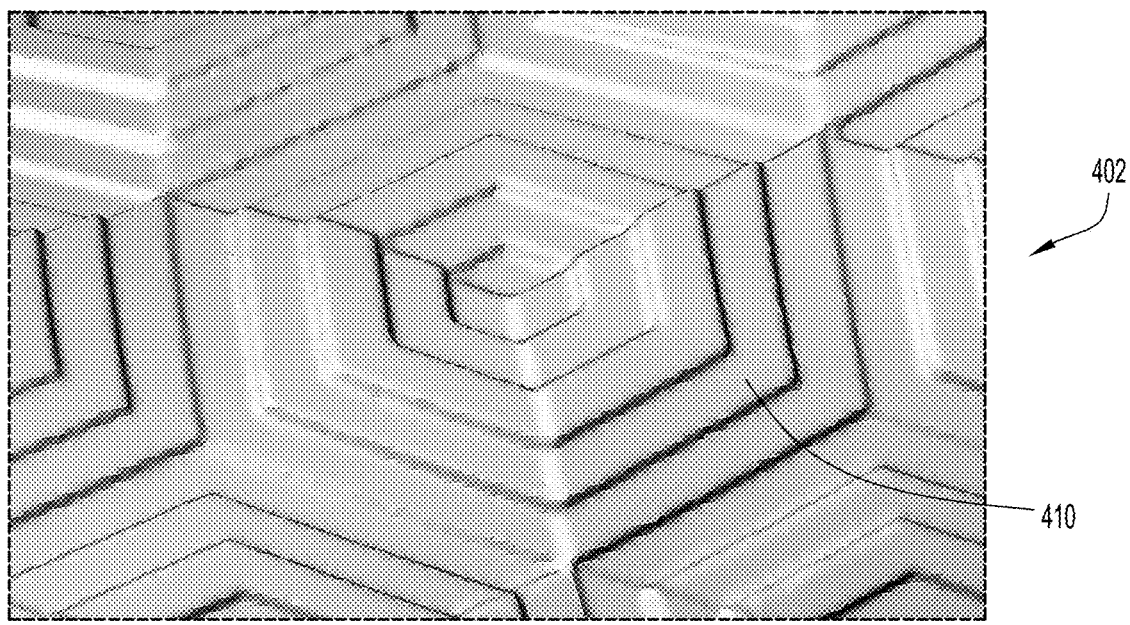
FIG. 4C is an enlarged view of an exterior side surface portion of the shoe last of FIGS. 4A-4B showing structural features for the shoe last that form the respective structural feature patterns on the exterior surface of the upper as depicted in FIG. 3C.

Some examples of uppers formed using a spray deposition process according to the invention and having intricate exterior surface structural features are described with reference to FIGS. 1A-1C, 3A-3C and 5A-5E. As described herein, the upper of FIGS. 1A-1C is formed with a last as depicted in FIGS. 2A-2C, while the upper of FIGS. 3A-3C is formed with a last as depicted in FIGS. 4A-4C and the upper of FIGS. 5A-5E is formed with a last as depicted in FIGS. 6A-6G. The uppers are formed using a spray deposition process as described herein, where exterior surface portions of each upper can include elaborate and intricate three dimensional structural features (e.g. structural features as depicted by the exterior upper surface patterns as depicted in the enlarged views of FIGS. 1C, 3C, and 5C-5E). While the uppers depicted in FIGS. 1, 3 and 5 (with the exception of FIG. 5E) show only small portions of the exterior surfaces of the uppers having three dimensional exterior structural surface features, such features can be disposed about any selected portions (e.g., some or all) of the exterior surface for each of the uppers. This is further indicated in the lasts depicted in FIGS. 2, 4 and 6 (which show exterior structural surface features over the surfaces of the lasts).

Referring to FIGS. 1A and 1B, an upper 100 is formed utilizing a spray forming or spray deposition process as described herein and includes exterior surface structural features comprising a repeating pattern of rib-like structures and channels or indentations along the exterior surface of the upper. The upper 100 includes a front or forefoot region 112 that generally aligns with the ball and toes of a user's foot (i.e., when a user is wearing the upper), a midfoot region 114 that generally aligns with the arch and instep areas of the user's foot, and a hind foot region 116 that generally aligns with the heel and ankle areas of the user's foot. The upper 100 further includes a medial side 120 that is oriented along the medial or big toe side of the user's foot, a lateral side 130 that is oriented along the lateral or little toe side of the user's foot, a toe (i.e., front) end 140 or toe cage that corresponds with the toe end of the user's foot and a heel (i.e., rear) end 150 that corresponds with the heel of the user's foot. The heel end 150 has a curved shape defining a heel cup that generally conforms to the user's heel and extends between the medial and lateral sides 120, 130 of the upper 100. A main opening at a top or neck portion of the upper 100, which is defined between the toe end 140, heel end 150, medial and lateral sides 120, 130 provides access to a cavity of the upper that is configured to receive the user's foot. The midfoot region 114 further includes a vamp section extending from the toe cage toward the neck portion of the upper, where the vamp section of the upper 100 includes an open section defined between the upper edges of the medial and lateral sides 120, 130 and that extends to the main opening of the upper. The medial/lateral side upper edges can include cut-out holes or eyelets 155 that are suitably aligned and dimensioned to receive a shoe lace or other fastener that firmly secures the user's foot within the upper (i.e., by pulling or cinching the lateral and medial sides toward each other using the shoe lace or other fastener). In certain embodiments, a tongue member that is not formed contiguously or integral during the spray forming process with the other portions of the upper can nevertheless be secured at the open vamp section of the upper 100. In other embodiments (e.g., refer to the upper of FIGS. 3A-3C and FIGS. 5A-5G as described herein), a tongue portion can be integrally formed with other portions of the upper using the spray forming process as described herein.

Some or all of the exterior surface portions of the upper 100 of FIGS. 1A and 1B include a number of exterior surface features that are formed on the upper utilizing the spray forming process as described herein. A partial enlarged view of a portion (indicated as portion 102 on sides of the upper 100) of the exterior surface of the upper 100 is depicted in FIG. 1C, in which a repeating unit of the structural features is shown. The enlarged portion 102 includes a repeating pattern unit that is repeated over some or all of the exterior surface of the upper 100 (e.g., over the lateral and medial sides, over the toe cage and vamp sections, and around the heel end of the upper). Alternatively, the repeating pattern unit depicted in portion 102 can repeat along certain exterior surface area portions of the upper while other exterior surface area portions can include other exterior surface structural features (e.g., other repeating exterior surface patterns) or can remain relatively smooth (i.e., not structural surface features at such exterior surface portions).

As depicted in FIG. 1C, the repeating pattern unit shown in enlarged portion 102 includes a series of elongated, raised rib-like structures 160 (also referred to herein as ribs) and a series of grooves or channels 170 defined between the ribs 160, where the ribs 160 and channels 170 are formed along some or all portions of the exterior surface of the upper (e.g., along the medial side 120, lateral side 130, toe end 140 and heel end 150). The pattern unit 102 including ribs 160 and channels 170 can be formed in an array or repeating pattern along the upper exterior surface (e.g., with some ribs connecting with each other to form series of interconnected rectangular or square structures and corresponding channels arranged in similar patterns between the ribs). However, any suitable arrangement of structures can be formed on any one or more exterior surface portions of the upper, where the arrangement of structures can change in configuration (e.g., change in patterns, shapes of ribs and/or channels, etc.) at different locations of the upper. Ribs and/or other structural features provided on the exterior surface of the upper provide certain functional features for the upper as described in further detail herein.

Referring to FIGS. 3A-3C, another embodiment is depicted of an upper 300 formed utilizing a spray forming/spray deposition process as described herein. The upper 300 includes the same or similar regions as described for the upper 100 of FIGS. 1A and 1B, namely, a forefoot region 312, a midfoot region 314 and a hind foot region 316, as well as a medial side 320, a lateral side 330, a toe cage or toe end 340 and a rear or heel end 350. The upper 300 further includes a tongue member 345 that is formed integrally and contiguously during the spray forming process with the other portions of the upper 300, where the tongue member 345 extends in the vamp section of the upper between the upper edges of the medial and lateral sides 320, 330 and from a region of the toe end 340 to an opening at a neck portion of the upper that receives a wearer's foot. The upper 300 further includes openings at the upper edges of the medial and lateral sides that define eyelets 355, where the eyelets 355 are suitably aligned and dimensioned to receive a shoe lace or other fastener.

The upper 300 also includes exterior surface features that form a pattern along portions of the upper. A repeating unit of the exterior surface patterns is depicted in the enlarged view of FIG. 3C (which shows an exterior surface portion 302 of the upper 300). Similar to upper 100, the repeating pattern unit included in the enlarged exterior surface portion 302 of the upper 300 can continuously repeat along some or all of the exterior surface of the upper 300 (e.g., along the lateral and medial sides, along the toe cage, the vamp section and/or along the heel end of the upper 300).

The repeating pattern unit included in enlarged portion 302 depicted in FIG. 3C comprises a series of polygonal (e.g., hexagonally) shaped structures 310 of different sizes that are nested within each other and form raised or stepped portions and depressions along exterior surface portions of the upper. Like the exterior structural features described herein and depicted in the repeating pattern unit of FIG. 1C, the exterior surface structural features depicted in the repeating patterns of FIGS. 3C and 3D can also provide certain functional features of the upper as described herein.

A still further embodiment is depicted in FIGS. 5A-5F of an upper 500 that is formed utilizing a spray forming/spray deposition process as described herein. The upper 500 also includes the same or similar regions as described for the other two uppers of FIGS. 1 and 3, namely, a forefoot region 512, a midfoot region 514 and a hind foot region 516, as well as a medial side 520, a lateral side 530, a toe cage or toe end 540 and a rear or heel end 550. The upper 500 further includes a tongue member 545 that is formed integrally and contiguously during the spray forming process with the other portions of the upper 500, where the tongue member 545 extends in the vamp section of the upper between the upper edges of the medial and lateral sides 520, 530 and from a region of the toe end 540 to an opening at a neck portion of the upper that receives a wearer's foot. The upper 500 further includes openings at the upper edges of the medial and lateral sides that define eyelets 555, where the eyelets 555 are suitably aligned and dimensioned to receive a shoe lace or other fastener.

The upper 500 includes a plurality of different pattern units (some repeating pattern units) disposed along different exterior surface portions of the upper. The different surface portions of the upper including different exterior surface patterns comprise different zones or different zonal areas of the upper, where the different zones can provide different functional features for the upper. The views of FIGS. 5C, 5D and 5E depict examples of exterior surface portions or zones of the upper 500 that include different repeating patterns that provide different functional features for the upper.

Figure 5A:
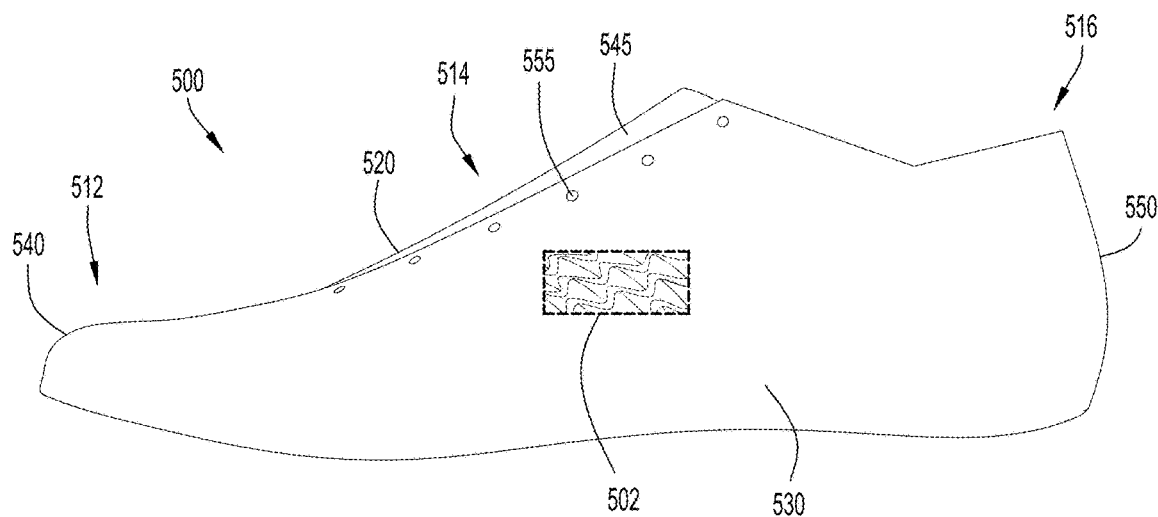
FIGS. 5A and 5B are side views of a further embodiment of an upper for a shoe formed with the spray deposition process in accordance with the invention as described herein.
Figure 5B:
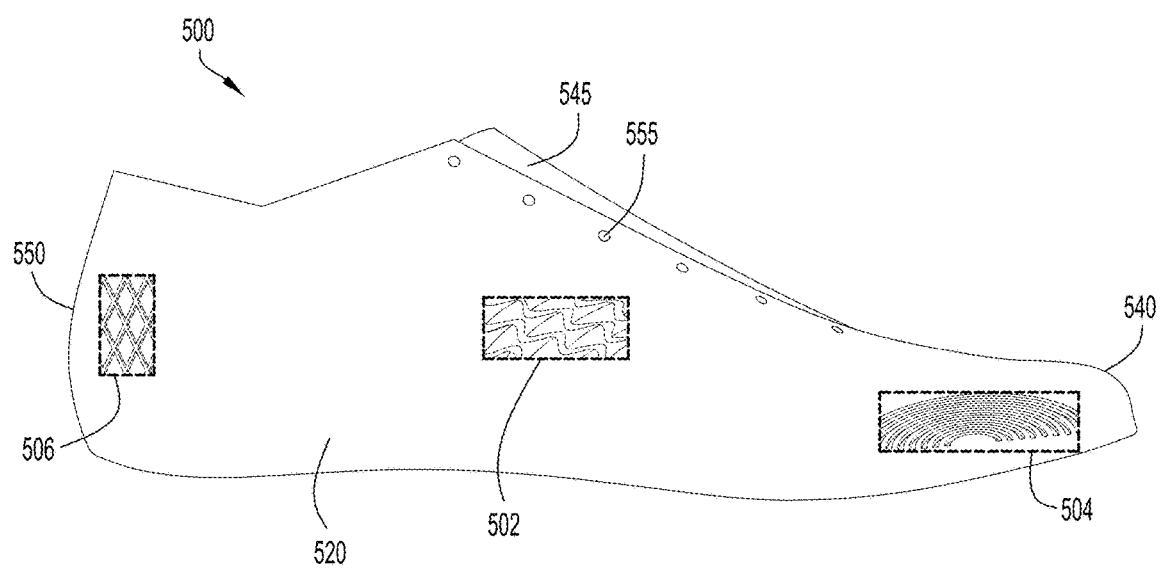
Figure 5C:
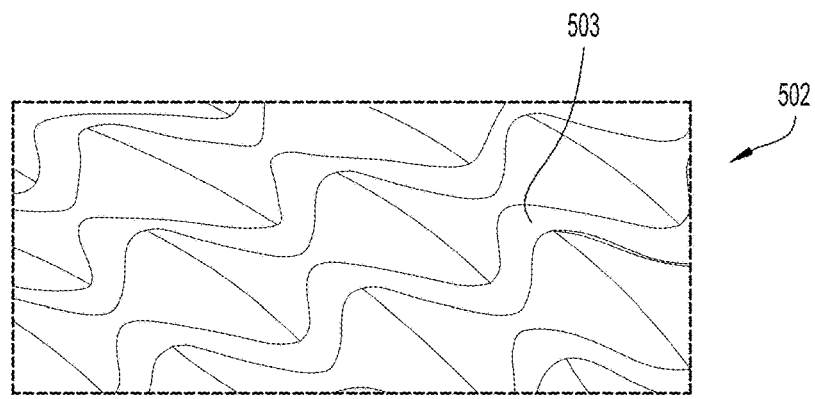
FIG. 5C is an enlarged view of a portion of the upper of FIGS. 5A and 5B that is located along an exterior side surface (e.g., along views as depicted in FIGS. 5A and 5B) showing structural surface features formed on the exterior surface of the upper.

Referring to FIG. 5C, an upper exterior surface portion 502 includes a repeating pattern unit that comprises a series of triangular shaped or wavy ridges 503 that extend three dimensionally outward from other, relatively flat or smooth exterior surface portions of the upper 300 so as to define an uneven contour along exterior surface portions of the upper. This repeating pattern unit of portion 502 extends along exterior surface portions of the medial side 520 and lateral side 530 of the upper 500. The three dimensional surface pattern of this repeating pattern unit can enhance the features of the upper when provided along the medial and lateral sides of the upper. In particular, the three dimensional surface pattern (the triangular shaped or wavy ridges 503) can comprise a three dimensional auxetic pattern (i.e., the pattern includes three dimensional auxetic structures). Generally, auxetics are structures or materials that have a negative Poisson's ratio such that, when stretched, they become thicker perpendicular to the applied force. The auxetic patterning of the exterior surface structural features depicted in surface portion 502 can be applied, e.g., along both the lateral and medial sides of the upper 500 so as to increase or enhance the support and fit of the upper against the wearer's foot during use.

Figure 5D:
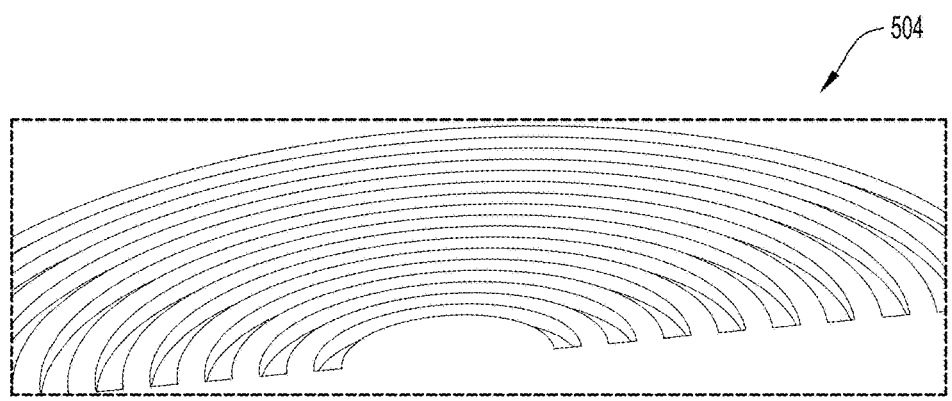
FIG. 5D is an enlarged view of a portion of the upper of FIGS. 5A and 5B that is located along an exterior surface of a toe portion (e.g., along the view depicted in FIG. 5B) showing structural surface features formed on the exterior surface of the upper.
Figure 5E:
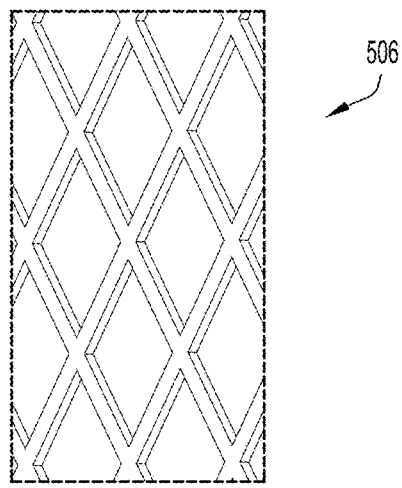
FIG. 5E is an enlarged view of a portion of the upper of FIGS. 5A and 5B that is located along an exterior surface of a heel portion (e.g., along the view depicted in 5B) showing structural surface features formed on the exterior surface of the upper.

Referring to FIG. 5E, an upper exterior surface portion 506 includes a plurality of raised structures having a pattern of intersecting rib-like structures that define diamond shaped depressions between the rib-like structures, where the pattern extends along both lateral and medial sides 520, 530 at the end heel 550 of the upper 500. The exterior surface pattern can be configured to enhance the strength and support at the heel end 550 of the upper 500 (e.g., providing the functional features of a heel counter for the upper).

Referring to FIG. 5D, disposed along one or both of the medial side 520 and lateral side 530 at the front or toe end 540 of the upper 500 is a pattern unit that comprises a series of semicircular or arc shaped ribs with corresponding arc shaped grooves defined between neighboring or adjacent ribs, where the ribs and grooves are concentrically aligned with each other (e.g., a truncated or halved spiral pattern, or a radial pattern of ribs and corresponding grooves). This radial pattern of ribs and grooves provides an enhanced gripping surface (enhanced traction at such surface) for contact with objects such as balls (e.g., a soccer ball) when the upper is implemented in a shoe for use in certain sports or other athletic activities.

Figure 5F:
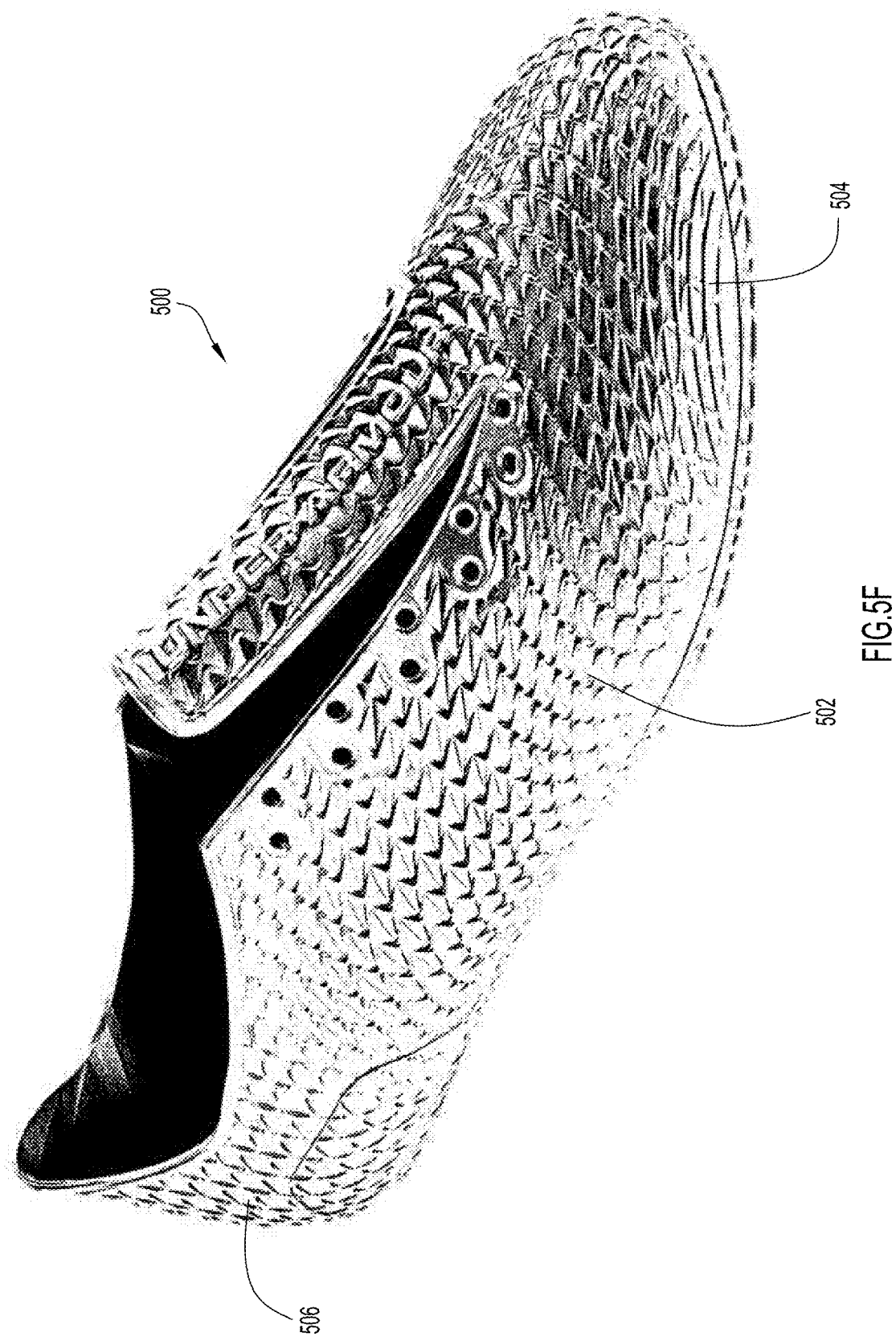
FIG. 5F is a side view in perspective of the upper of FIGS. 5A and 5B and further showing a transition of an exterior surface pattern for the patterns depicted in FIGS. 5C-5E at different zones of the upper.

The transition between different pattern units, such as those depicted in FIGS. 5C-5E, can be achieved in any desired manner. Referring to FIG. 5F, an example embodiment is depicted showing the transition of pattern units/repeating patterns between different zones or zonal areas of the upper 500. For example, the pattern unit 504 at the toe end changes to repeating pattern unit 502 along the side of the upper 500 and then to repeating pattern unit 506 at the heel end of the upper 500.

The embodiments of a shoe upper depicted in FIGS. 1, 3 and 5 are formed such that substantially the entire upper is formed as a single, continuous or unitary three dimensional member with the exception that a bottom portion of the upper is unformed/open. In such embodiments, the upper can be secured to a strobel or other suitable bottom surface member for attaching the upper to a sole structure. However, the spray forming process as described herein can also facilitate the formation of a bottom surface for the upper such that the entire upper is formed as a single, continuous or unitary member (including bottom surface, i.e., forming an enclosed sock-like structure as the spray formed upper). Further, the three dimensional exterior surface structural features or components defined on the uppers can be disposed along a majority (e.g., at least 50%) of the surface area of the upper.

Example Embodiments of Shoe Lasts Used to Spray Form Uppers

As previously noted and as further described herein, the uppers of FIGS. 1, 3 and 5 can be formed utilizing a spray forming process by spray coating/depositing one or more suitable materials on a mold or shoe last, such as the shoe lasts depicted in FIGS. 2A-2C, FIGS. 4A-4C and FIGS. 6A-6G.

A shoe last (also referred to as a last) refers to a mold that can be solid or hollow and has a three dimensional shape that facilitates spraying of one or more layers of materials onto exterior surface portions of the last that, when set or solidified, can be removed from the last so as to define the upper. In particular, the shoe last has a three dimensional shape that generally conforms to the three dimensional shape of the upper to be formed. Further, the last can comprise a single, unitary mold structure or, alternatively two or more separate mold structures depending upon the types of structural features and/or layers of material that are desired for the upper to be spray formed. For example, in embodiments in which the shoe last comprises two or more mold structures, the mold structures can be combined with each other in any suitable manner, such as in a clam shell configuration (e.g., an internal mold nested within and spaced from an external mold, where the upper is formed by spray depositing one or more layers of materials within the spacing between the two molds). In the embodiments depicted in the figures, the shoe last comprises a single unitary structure that facilitates spray forming of the upper onto the last followed by removal of the upper such that the upper is seamless.

Referring to FIGS. 2A-2C, an example embodiment is depicted of a last 200 used to form the upper 100 of FIGS. 1A-1C. The last 200 has a three dimensional configuration generally corresponding with the shape of the upper 100 and thus includes the same or similar sections that correspond with the same sections of the upper. In particular, the last 200 includes a medial forming side 220 that corresponds in shape with the medial side 120 of the upper 100, a lateral forming side 230 that corresponds in shape with the lateral side 130 of the upper 100, a toe end 240 that corresponds in shape and location with the toe end 140 of the upper 100, and a heel end 250 that corresponds in shape and location with the heel end 150 of the upper 100. The last 200 further includes a bottom side (not shown).

The last 200 further includes structural features on portions of its exterior surface that correspond with the pattern 102 of ribs 160 and channels 170 of the upper 100. In example embodiments, the repeating pattern of three dimensional structural features and/or other three dimensional structural features can be provided on at least about 10% of an exterior surface area of the last, such as at least about 25% of the exterior surface area of the last, at least about 50% of the exterior surface area of the last, or at least about 75% of the exterior surface area of the last that does not include the bottom side of the last.

A comparison of the surface patterns depicted in FIG. 1C for the upper 100 and FIG. 2C for the last 200 indicates that the exterior surface structural features of the last 200 are inverted/reversed in contour in relation to corresponding exterior structural surface features of the upper 100. This is due to the manner in which the upper is formed as described in further detail herein, where one or more layers of materials are spray formed onto exterior surface portions of the last 200 to form the upper and the resultant spray formed upper structure is removed from the last and turned inside out to define the upper (e.g., the surface of a first or initial layer formed by spray deposition and directly contacting the last 200 becomes the outer or exterior layer of the upper 100 after the upper is removed from the last 200 and is turned inside out). The upper that is formed is therefore the inverted form of the last used to form the upper. In other words, a right footed shaped last forms a left footed upper (and, similarly, a left footed shaped last forms a right footed upper) using the process described herein in which the upper is turned inside out after being removed from the last.

Referring to FIGS. 2A and 2B, the medial and lateral forming sides 220, 230 of the last 200 correspond with the medial and lateral sides 120, 130 of the formed upper 100. Further, the structural features of the last 200, namely rib-like structures or ribs 270 and channels 260 as shown in FIG. 2C (which shows an exterior surface portion 202 of the last 200), are inverted or reversed in surface contour in relation to the ribs 160 and channels 170 of the upper 100. In other words, the channels 260 on the last 200 define the ribs 160 on the upper 100, while the ribs 270 on the last 200 define the channels 170 on the upper 100. Such inversion or reversal of surface contour for the exterior surface structural features for one of the last and the upper is also referred to herein as being a reverse image or a "negative image" of the corresponding exterior surface structural features for the other of the last and the upper.

In example embodiments, the structural features for the last 200 (e.g., ribs 270 and channels 260) can extend along each of the medial forming side 220, lateral forming side 230, toe end 240 and heel end 250 of the last 200. The bottom side of the last 200 can relatively smooth (i.e., no structural features provided on the last bottom side). In alternative embodiments, the bottom side of the last can also be presented with exterior surface structural features (e.g., structural features that may be imparted to the bottom surface of a spray formed upper that enhance securing of the upper to a sole structure). In addition, located along the upper portions of each of the lateral and medial forming sides of the last 200 are a series of generally elongated (e.g., cylindrical) protrusions 255. As described herein, when an upper (e.g., upper 100) is spray formed on the last 200, openings or eyelets are defined along the upper (e.g., eyelets 155 of upper 100) at locations corresponding with the protrusions 255 of the last 200.

The last 400 depicted in FIGS. 4A-4B is used to form the upper 300 of FIGS. 3A-3B. Like the last 200 of FIGS. 2A-2B, last 400 also has a three dimensional configuration that, while inverted in contour (since the upper 300 is turned inside out when it is removed from the last after being formed), generally corresponds with the shape of the upper 300 and thus includes the same or similar sections that correspond with the same sections of the upper (i.e., including a medial forming side 420, a lateral forming side 430, a toe end 440 and a heel end 450 all of which correspond in shape with the complimentary sides of the upper 300). The last 400 further includes a bottom side (not shown). The last 400 also includes generally cylindrical protrusions 455 located at upper side portions of the lateral and medial forming sides, where the protrusions 455 facilitate formation of the eyelets 355 for the upper 300.

The last 400 also includes a tongue forming portion 445 that extends upward and outward in a wing-like manner from a upper shaped main body portion of the last 400 at a location between the lateral and medial forming sides 420, 430 and at a vamp section between the toe end 440 and heel end 450 of the last. The shape of an upper/outwardly facing surface 446 of the tongue forming portion 445 has a shape that conforms to (and thus facilitates formation of) the tongue portion 345 of the last 300. The edges of the outwardly facing surface 446 of the tongue forming portion 445 can also be slightly raised to define a sharply angled transition to other surface portions of the tongue forming portion that extend from the surface 446 back toward the main body of the last 400. As described herein, this angled transition provides cut-in lines for the spray formed tongue of the upper that enhances separation between the tongue portion 345 and outwardly facing surface 446 of the tongue forming portion 445 during removal of the spray formed upper from the last.

Also similar to the last 200, last 400 includes a surface contour with exterior surface structural features that are inverted in contour in relation to (i.e., are a reverse image or a "negative image" of) the corresponding exterior surface structural features for the upper 300 that is formed using the last 400 with a spray forming process as described herein. Referring to FIG. 4C, an enlarged view of an exterior surface portion 402 of the last 400 shows a repeating pattern for the last. The exterior surface portion 402 includes stepped hexagonal structures 410 that are inverted/opposite in three dimensional contour in relation to corresponding hexagonal structures 310 at the corresponding exterior surface portions 302 of the upper 300. In particular, the pattern of exterior surface structural features of FIG. 4C is the negative image (i.e., facilitates formation) of the pattern of exterior surface structural features depicted in FIG. 3C for the upper 300. Like the last 200, the repeating pattern of three dimensional structural features and/or other three dimensional structural features for the last 400 can be provided on at least about 10% of the exterior surface of the last, such as at least about 25% of the exterior surface of the last, at least about 50% of the exterior surface of the last, or at least about 75% of the exterior surface of the last that does not include a bottom side of the last.

The last 600 depicted in FIGS. 6A-6G is used to form the upper 500 of FIGS. 5A-5E. As with the other lasts described herein, last 600 also has a three dimensional configuration that, while inverted in contour (since the upper 500 is turned inside out when it is removed from the last after being formed), generally corresponds with the shape of the upper 500 and thus includes the same or similar sections that correspond with the same sections of the upper (i.e., including a medial forming side 620, a lateral forming side 630, a toe end 640 and a heel end 650 all of which correspond in shape with the complimentary sides of the upper 500). The last 600 further includes a bottom side (not shown). Like the other lasts, last 600 also includes generally cylindrical protrusions 655 located at upper side portions of the lateral and medial forming sides, where the protrusions 655 facilitate formation of the eyelets 555 for the upper 500.

The last 600 also includes a tongue forming portion 645 that is located between the lateral and medial forming sides 620, 630 and at a vamp section between the toe end 640 and heel end 650 of the last. However, unlike last 400, the tongue forming portion 645 of last 600 follows the general contour of the vamp section of the last (i.e., portion 645 does not extend outward in a wing-like manner as portion 445 does for last 400). This portion 645 facilitates formation of the tongue 545 of the upper 500.

Figure 6A:
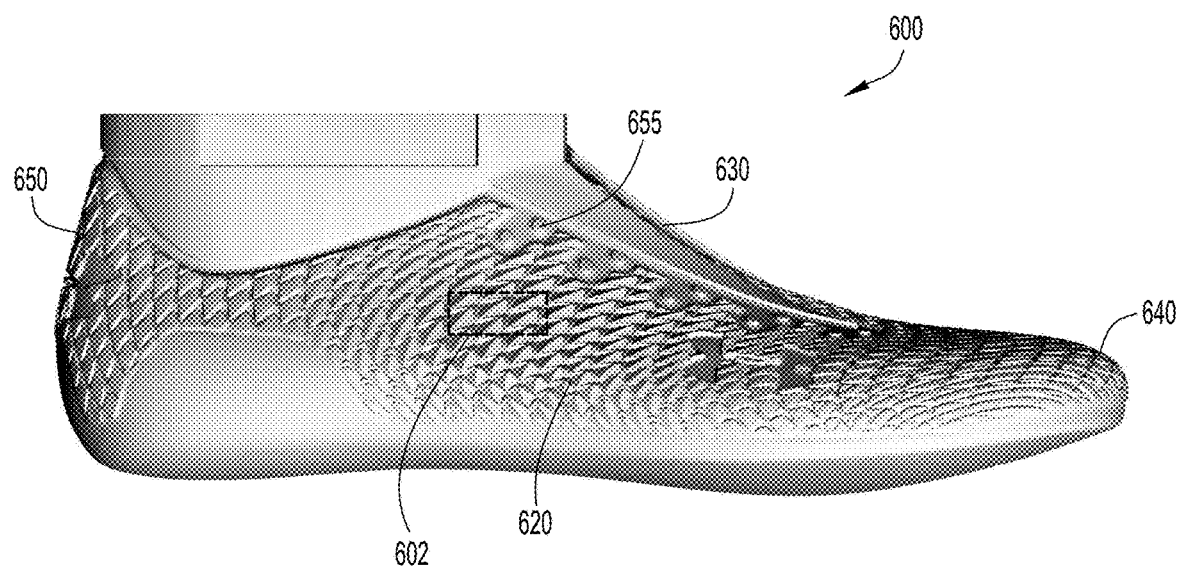
FIGS. 6A-6D are different views of a shoe last used to form the upper of FIGS. 5A-5D.
Figure 6B:
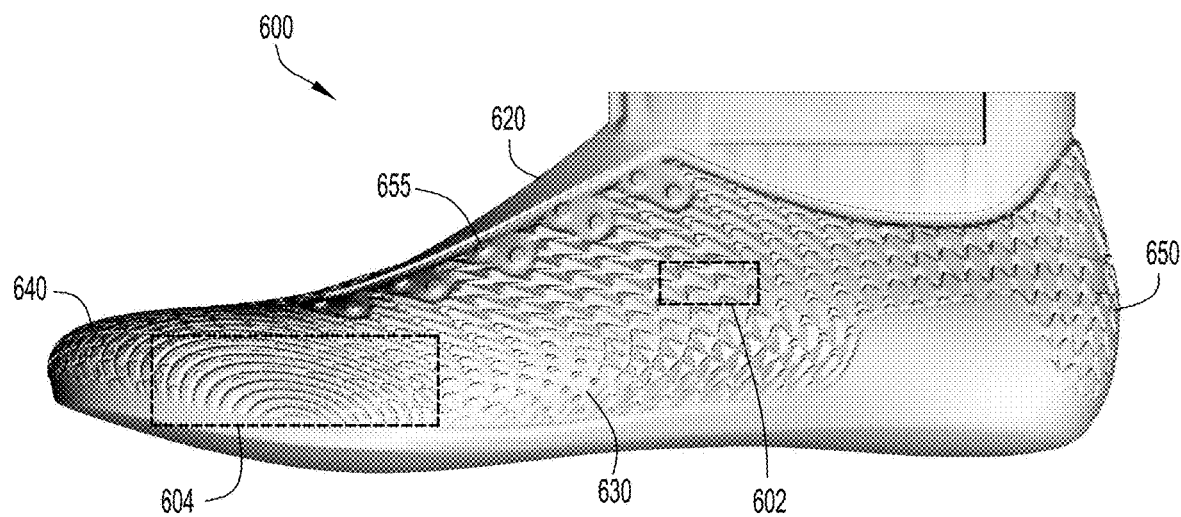
Figure 6C:
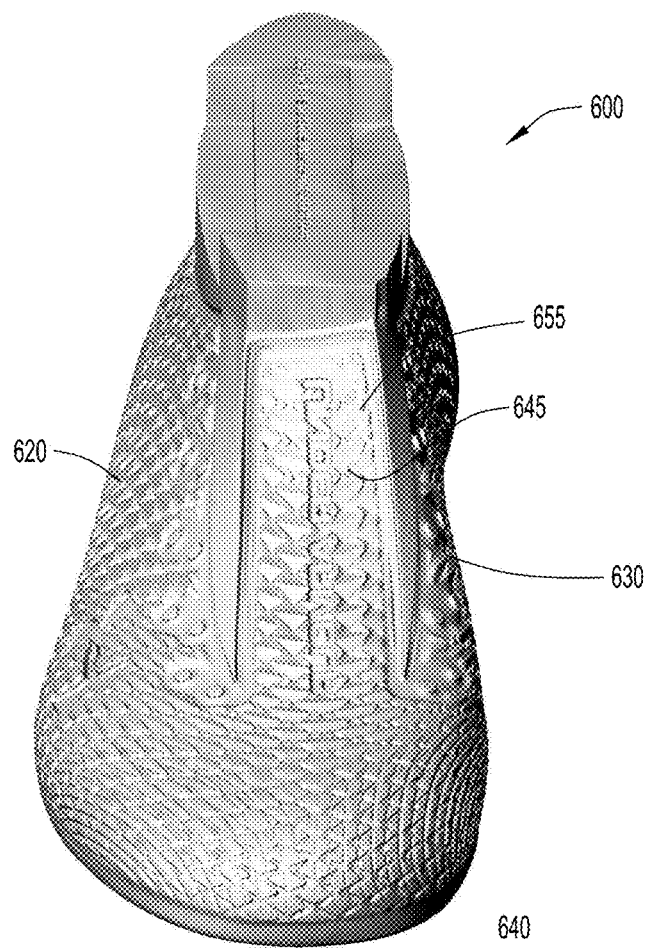
Figure 6D:
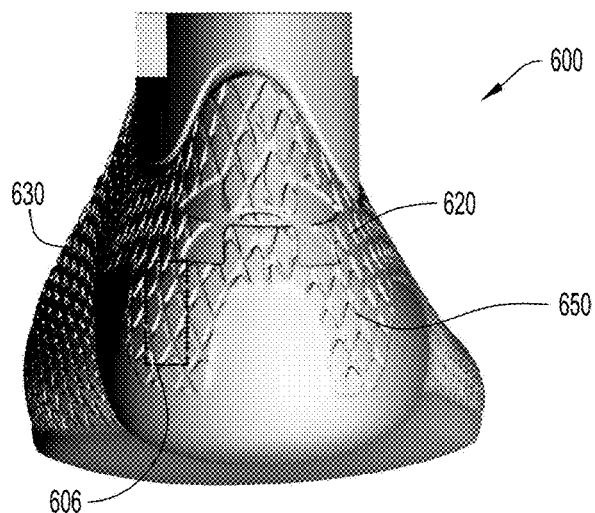
Figure 6E:
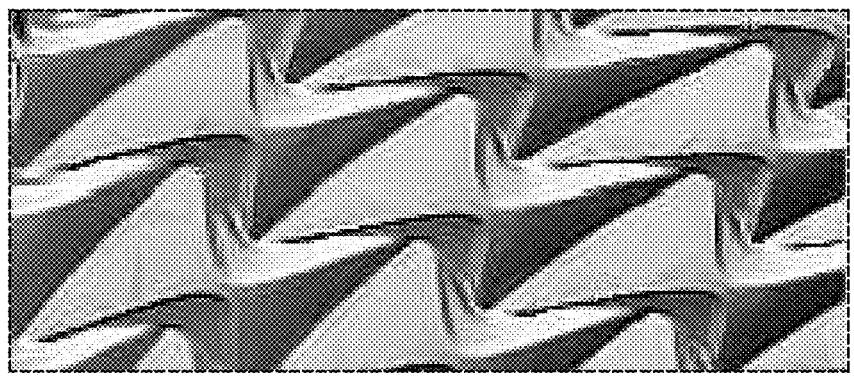
FIG. 6E is an enlarged view of an exterior side surface portion of the shoe last of FIGS. 6A-6D showing structural features for the shoe last that form the respective structural feature patterns on exterior surface portions of the upper as depicted in FIG. 5C.
Figure 6F:
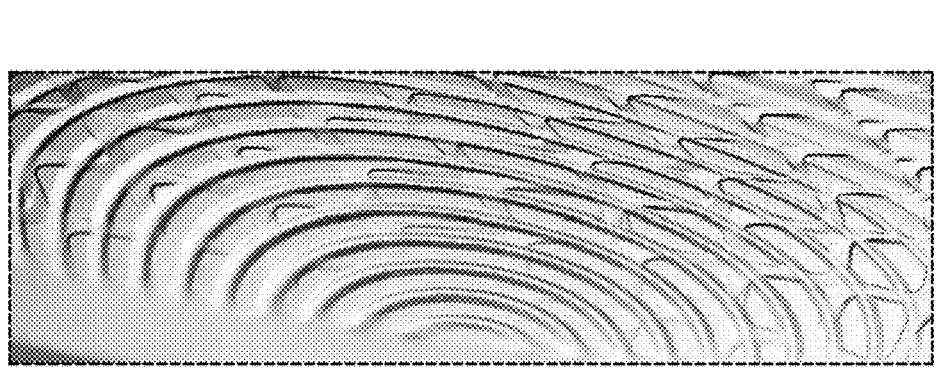
FIG. 6F is an enlarged view of an exterior side surface portion of the shoe last of FIGS. 6A-6D showing structural features for the shoe last that form the respective structural feature patterns on exterior surface portions of the upper as depicted in FIG. 5D.
Figure 6G:
FIG. 6G is an enlarged view of an exterior side surface portion of the shoe last of FIGS. 6A-6D showing structural features for the shoe last that form the respective structural feature patterns on exterior surface portions of the upper as depicted in FIG. 5E.

Last 600 also includes a surface contour with exterior surface structural features that are inverted in contour in relation to (i.e., are a "negative image" of) the corresponding exterior surface structural features for the upper 500 that is formed using the last 600 with a spray forming process as described herein. Referring to FIGS. 6E, 6F and 6G, enlarged views of exterior surface portions 602, 604 and 606 of the last 600 are depicted which are inverted in contour in relation to (i.e., negative images of) the corresponding patterns depicted in the exterior surface portions 502, 504 and 506 of the upper 500 as depicted in FIGS. 5C, 5D and 5E.

Similar to the other lasts, the repeating pattern of three dimensional structural features and/or other three dimensional structural features for the last 600 can be provided on at least about 10% of the exterior surface of the last, such as at least about 25% of the exterior surface of the last, at least about 50% of the exterior surface of the last, or at least about 75% of the exterior surface of the last that does not include a bottom side of the last. As noted for the upper 500, some of the patterns (e.g., the pattern unit of surface portion 602 depicted in FIG. 6E) are repeating pattern units over exterior surface portions of the last (e.g., over the lateral and medial side forming portions of the last) while other pattern units (e.g., the pattern unit of exterior surface portion 604 of FIG. 6F) are only at one or more selected locations along the exterior surface of the last.

A shoe last can be formed in any suitable manner and utilizing any suitable materials that ensure the integrity of the last during the formation of an upper on the last with a spray forming method as described herein. Some non-limiting examples of providing a shoe last include: providing a last formed of a suitable polymer material (e.g., a polyamide, such as nylon) or a silicon based material, providing a last made of wood, and providing a last having a stainless steel or other suitable metal surface. As described herein, the last can be a solid structure or, alternatively, a hollow structure (e.g., a hollow structure including an interior cavity that facilitates filling of the last with a heating and/or cooling fluid and/or draining of sprayed material from drainage channels extending from an exterior surface portion to a hollow internal portion of the last). Further still, the last can have a clam shell configuration to facilitate formation of an upper and/or shoe between two molds of the clam shell configuration (e.g., where a portion of the upper is formed via one or more spray formed layers). In an example embodiment, a hollow last is filled entirely or partially with a thermal treatment fluid (e.g., water or any other suitable fluid that provides a desired heat transfer between the fluid and the last material). Suitable structure (e.g., a thermal fluid recirculation system including piping to direct fluid into and out of the last interior cavity) can be provided to facilitate flow of thermal fluid through the last interior cavity in order to enhance heat exchange between the fluid and the last.

A polymer or silicon based last can be formed, e.g., by any suitable method, such as a 3D printing process, forming the last within a mold, etc. For example, forming a last using 3D printing techniques facilitates the formation of very fine, intricate and elaborate three dimensional exterior surface features that are transferred (as a "negative image") to a surface of the upper that is spray formed on the last.

The exterior metal surface last can also be formed via any suitable manner in which the entire last is made of the metal (e.g., by a casting or machining process) or only the exterior surface of the last is metal (e.g., by covering some or all of a wood or polymer last structure with a metal layer via any suitable plating or other metal deposition process). The exterior structural features provided on the metal last can be formed in any suitable manner (e.g., via laser etching, mechanical etching, acid and/or other chemical etching, etc.).

Depending upon a particular application, the last can also be formed as a solid or hollow material. For example, for certain applications, it may be desirable to allow for drainage of excess polymer spray material from the last, where drainage holes are provided in and extending to a hollow interior of the last (with further drainage structure coupled with the last to capture such excess polymer spray material).

Providing a hollow last also reduces weight and/or can reduce material cost associated with the last (particularly when forming a metal last).

A metal last (or last having an exterior metal surfaces) can also have certain advantages in that it has a very smooth and relatively nonporous surface that enhances formation of a layer to the surface. In addition, the metal last can be heated quickly to a desired temperature (depending upon the thermal conductivity of the metal material). Further, a metal last can be made hollow while maintaining sufficient strength of the outer shell and exterior surface. A polymer or silicon formed last can also provide advantages in that exterior surface features on the last can be elaborate and easily formed (e.g., via 3D printing, etching, etc.).

Spray Forming an Upper

Example embodiments of spray forming an upper are described primarily with reference to the last embodiment of FIG. 2. However, it is noted that the spray forming process is applicable for forming uppers with any last, including the lasts of FIGS. 4 and 6.

An upper can be formed by spraying each side of the last 200, including the bottom side, such that the upper in essence forms a sock-like structure. Alternatively, the upper can be formed by spraying only portions of the last 200, such as all sides of the last 200 except for its bottom side. In such embodiments, the upper comprises a unitary member that is three dimensional in shape and that is substantially or entirely seamless (such as the upper 100 depicted in FIGS. 1A and 1B). In other embodiments, the last 200 can be sprayed to form one or more layers in any other manner such that the upper structure formed on and removed from the last 200 can be removed to form a two dimensional and incomplete upper structure that is then combined with other upper structures to form the final, three dimensional upper member.

In example embodiments, the composite upper is formed as a plurality of material layers that are built upon each other by applying successive coats of atomized polymer compositions onto the last, thereby forming a series of layers, with adjacent layers overlapping each other. An example upper, such as upper 100, can be formed from a plurality of material layers spray coated onto the last 200 and built up consecutively one layer upon the next. The materials forming the various layers can be any suitable materials capable of being spray formed to coat the last and then dried or hardened to form a solidified structural layer of the upper. Some non-limiting example polymer materials that may be used to form a layer of the upper by a spray forming process include polyurethanes, polyolefins (e.g., polyethylene), polyesters (e.g., polyethylene terephthalate) and polyethers.

In an embodiment, a synthetic skin formed of a polyurethane elastomer based on polyisocyanate polyaddition products is utilized. The polyol component and the isocyanate component are mixed and the resultant reaction mixture is sprayed onto the last. The polyol component then reacts with the isocyanate component to form polyurethane. The isocyanate may be selected from the group of aromatic isocyanates, aliphatic isocyanates, and combinations thereof. Examples of isocyanates diphenylmethane diisocyanates (MDIs), polymeric diphenylmethane diisocyanates (pMDIs), toluene diisocyanates (TDIs), hexamethylene diisocyanates (HDIs), dicyclohexylmethane diisocyanates (HMDIs), isophorone diisocyanates (IPDIs), and combinations thereof. The polyol may include an aromatic polyol, an aliphatic polyol, polyether polyol, or a polyester polyol. The polyurethane elastomer composition may also include one or more additives. Commercially available examples of a sprayable urethane elastomer are ELASTOSKIN® and ELASTOLLAN®, both available from BASF, Wyandotte, Mich.

In operation, and as explained in greater detail below, spray polyurethane skin is a process of spraying a thin film of elastomeric polyurethane (PU) onto the last. When the PU cures, the film is peeled off of the mold in a single sheet (skin) and finished with a variety of post mold processes. The PU may be applied directly to the last, or mold release agent (sacrificial or otherwise) is first applied to the last. In further embodiments, a paint layer is applied before application of the PU layer to provide color to the finished composite upper. Spray skin processes are capable of producing thin parts utilizing mold having fine cavities and details. Injection molding process, in contrast, does not consistently fill out a mold cavity and, in particular, a mold cavity including fine textures. The spray skin process, then, can transfer extremely fine detail from the mold face such as texture or grain detail, company logos, etc. In addition, the layers of a spray form process become chemically bonded to each other, avoiding the need to utilize adhesive layers to secure adjacent layers together.

In further embodiments, a layer is formed of polymer foam composition such as a polyurethane foam. The polyurethane foam may include the isocyanate and the polyol forming the polyurethane elastomer, along with a blowing agent. The blowing agent includes physical blowing agents, chemical blowing agents, and combinations thereof. A commercially available example of a sprayable urethane foam is ELASTOFLEX®, available from BASF, Wyandotte, Mich.

The layers that are spray formed with a suitable polymer material can vary in density as well as other structural properties so as to impart certain physical features in the upper at the layers including, without limitation, breathability, stiffness or flexibility, stretchability, moisture wicking properties, antimicrobial properties, etc. The layers can further be formed by spray deposition of a polymer material as spray droplets in a molten (or semi-molten) or liquid (or semi-liquid/semi-solid) state onto the last, where the polymer material can be sprayed (e.g., in a single pass or in multiple passes) on portions of the last to build up a polymer layer having any desired thickness (e.g., uniform thickness or varying thickness) at different locations along the last. For example, a layer having a small thickness may only require a single pass over portions of the last (or a very few number of passes) to build up the desired thickness, whereas a layer having a larger thickness may require multiple passes (e.g., 2, 3, 4 passes or even more passes) over certain portions of the last in order to build up the desired thickness of the layer. Thus, the thickness and density of the sprayed on/spray formed layer is controlled based upon the amount of spray droplets of polymer material applied at different areas along the last, where the layer is continuously increased in thickness and/or density based upon the building up or successive application of spray of polymer material to such areas.

Another option for forming a layer of the upper is to spray form elongated fibers or filaments comprising one or more different polymer materials onto the last thus forming a nonwoven or other fibrous (e.g., textile or fabric) material layer for selected portions of the upper. As described in further detail herein, any suitable process for spray forming polymer filaments or fibers to form a nonwoven or other fibrous material layer on a surface can be used in the methods described herein to obtain a textile material layer of the upper comprising filaments or fibers. For example, as described herein, a process of spray forming a nonwoven material layer can be achieved by spraying polymer filaments or fibers in a binder material onto the last (or over a layer already formed on the last).

As further described herein, portions of a nonwoven or other fibrous material layer that are preformed (i.e., already formed as a fabric or textile material) can be embedded within spray formed layers or, alternatively, provided as an interior or exterior layer of the upper. A nonwoven material is a fabric material made from synthetic fibers or filaments (e.g., continuous and/or staple fibers or filaments) that are combined and entangled to form an integral unit. Other types of fibrous (e.g., textile or fabric) materials that can be embedded between spray formed layers (or provided as an interior or exterior layer) of an upper include knitted fabric materials, woven fabric materials, and embroidered fabric materials. Knitted, woven, nonwoven and embroidered fabric materials are well known in the textiles art.

The filaments or fibers forming the nonwoven or other fibrous material layer can be synthetic filaments or fibers formed from any suitable one or more types of polymer materials typically utilized for forming nonwoven fibrous webs including, without limitation, polyolefins (e.g., polyethylene, polypropylene, etc.), polyesters (e.g., polyethylene terephthalate), and polyamides (e.g., nylon), including fiber combinations that provide a desired elasticity to the nonwoven web such as elastane fibers (e.g., elastic PU, such as the types commercially available as Lycra or Spandex). Alternatively, the filament or fibers can also be natural filaments or fibers (e.g., formed from cotton, silk, etc.). By varying amounts and types of polymer or other materials (as well as filament cross-sections of such polymer materials) within the fibers/filaments used to form the nonwoven web fibrous layer, various physical characteristics of this layer can be controlled (e.g., breathability or air/moisture permeability, elasticity, moisture absorption, etc.). In example embodiments, a nonwoven fibrous layer will also provide greater breathability (e.g., greater air and/or moisture permeability) through this layer than other sprayed polymer layers.

The materials can be selected to have suitable physical and chemical properties such that, upon being sprayed onto the last (or onto a layer already formed on the last), different materials located at the boundaries of adjacent layers suitably adhere to each other via chemical bonding and/or any other suitable adhesion mechanism such that the formed upper including layers of different materials comprises a single unitary structure. As described herein, one layer can be sprayed onto another layer on the last while that layer is partially but not completely solidified and/or cured (e.g., the already formed layer is partially cured and somewhat tacky) so as to enhance the interaction and adhesion between the materials at the boundaries of adjacent layers. As further described herein, in certain embodiments a density gradient can be defined at a transition boundary between two adjacent layers (e.g., between a second sprayed layer subsequently spray formed over a first sprayed layer).

Figure 7:
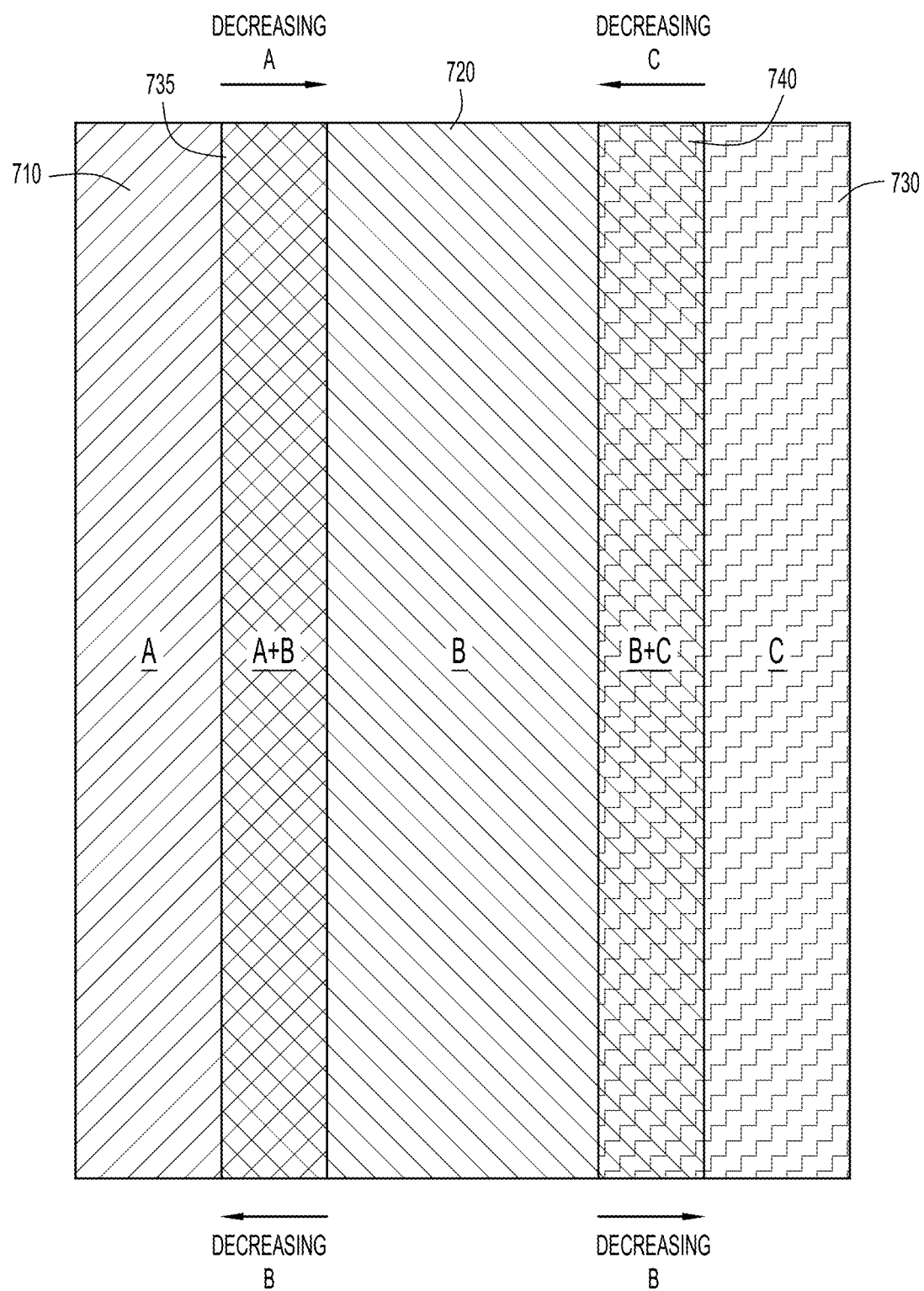
FIG. 7 is an example embodiment showing a cross-sectional view of a portion of an upper showing various layers that form the upper.

One example upper product that can be formed utilizing the spray forming methods described herein is an upper that has a combination of three layers as depicted in the cross-sectional view of a portion of an upper in FIG. 7. For example, the upper can be formed so as to have an exterior or outer polymer skin layer, a central or intermediate layer of padding (e.g., open cell foam material such as PU foam), and an interior layer forming a lining or interior skin layer facing the user's foot (e.g., another polymer skin layer, such as PU or polyester, or a nonwoven layer forming the interior lining of the upper). The embodiment of FIG. 7 is a three layer upper structure, in which the outer layer forms an outer "skin" layer of the upper, the intermediate (embedded) layer forms a softer, foam layer and the interior layer serves as an interior soft lining facing the wearer's foot. All three layers (exterior, intermediate and interior) can be spray formed. Alternatively, any combination of one or more layers can be spray formed while one or more other layers is provided in another manner (e.g., preformed and applied to last).

In operation, the layers are applied to the last in the desired order, forming a layer thereon. Referring to FIG. 7, the first or exterior layer 710, which is the first coating or layer applied (sprayed) on the last 200 and includes structures on its exposed surface (e.g., ribs 160 and channels 170 as shown for the upper 100 of FIGS. 1A-1C), can be formed from a polyurethane (PU) skin material of low thickness (e.g., the first layer possesses a thickness that is less than the thickness of the second layer) so as to function as the external "skin" layer of the upper 100. The second (intermediate) or central coating (layer) 720 is applied (spray formed) over the first coating (layer) 710 may be formed of a polymer foam material, such as a PU foam (e.g., a PU material having a density that is less than the density of external PU skin layer 710). The third or inner layer 730 of the upper, applied (via spraying) to the second, foam layer 720, is formed of a composition suitable as a lining material (e.g., PU, polyolefin or polyether) that forms the interior surface portion of the upper 100. Inner layer 730 can be formed from the same or different type of material as the exterior layer 710. In certain embodiments, the inner layer 730 can be formed from a different type of polymer material than the exterior layer 710 (e.g., a sprayed polyester layer or a sprayed polyether layer) and/or can be formed as a nonwoven fibrous layer so as to provide an interior liner for the upper that has a softer texture, a more breathable and/or moisture absorbent surface against the user's foot placed within the upper. The exterior or skin layer (e.g., layer 710) of the upper can be configured to provide some or a majority of the physical properties of the spray formed upper (e.g., strength, flexibility, etc.). The interior layer (e.g., layer 730) can be configured as a soft and comfort layer that functions as an interior lining of the upper (i.e., the surface of the upper that faces and/or engages the foot of the wearer of the upper).

In another embodiment, an upper can be spray formed as a two layer structure. An example of a two layer structure is similar to the three layer structure depicted in FIG. 7 with the exception that the intermediate or central layer 720 is not formed as part of the upper. In this embodiment, the outer or exterior layer can further serve as a "skin" layer (e.g., formed of a suitable PU or other polymer material that forms an external skin of the upper), while the second layer can comprise a spray formed fibrous material layer such as the types described herein (e.g., a spray formed nonwoven layer that comprises staple synthetic fibers mixed or combined with a binder material). Another example of a two layer upper is a knitted (or other type of formed fabric) upper, in which a preformed, knitted fabric material is placed over the last to form a first layer, and a polymer material is then spray formed over the knitted fabric material. When the upper is removed from the last and turned inside out, the knitted fabric material layer forms the exterior surface of the upper while the polymer material layer forms the interior liner layer for the upper.

However, while example embodiments of a three layer upper and a two layer upper have been described, it is noted that the invention is not limited to such examples but instead can include spray formed uppers with any number of layers that are spray formed or applied in any other manner and embedded between other spray formed layers of the upper.

As described in more detail herein, each successive layer is applied (e.g., spray formed) over another layer that is partially or fully cured (e.g., with a buildup of a layer over another layer being formed by spray droplets being continuously deposited onto the last); accordingly, no adhesive layer is needed to secure adjacent layers together. Instead, depending upon how hardened or solidified the existing layer is when the successive layer is spray formed onto such existing layer, a portion of the sprayed material forming the successive layer can combine or otherwise chemically or mechanically bond with the exposed surface of the existing layer upon which the successive layer is spray formed. This can result in a slight overlap or embedding between contacting layers thereby forming a transition zone being defined at the boundary between the two adjoining layers (e.g., as shown in FIG. 7, a transition zone 740 is located at the slight overlapping boundary between layer 720 and layer 730, and a transition zone 735 is located at the slight overlapping boundary between layer 720 and layer 710).

An example embodiment of a spray forming process utilizing a last (e.g., last 200 as depicted in FIGS. 2A-2C, a last 400 as depicted in FIGS. 4A-4C, or a last as depicted in FIGS. 6A-6G) to form a multi-layered upper (e.g., an upper including layers such as those depicted in FIG. 7) is now described with reference to FIGS. 8-10. This embodiment relates to formation of an upper by spray coating/depositing one or more layers on a last and then removing the upper and turning it inside out as the final product, such that the layer first sprayed on the last becomes the exterior layer of the upper and/or the surface of such layer engaging the last becomes the exterior surface layer of the upper.

Figure 8:
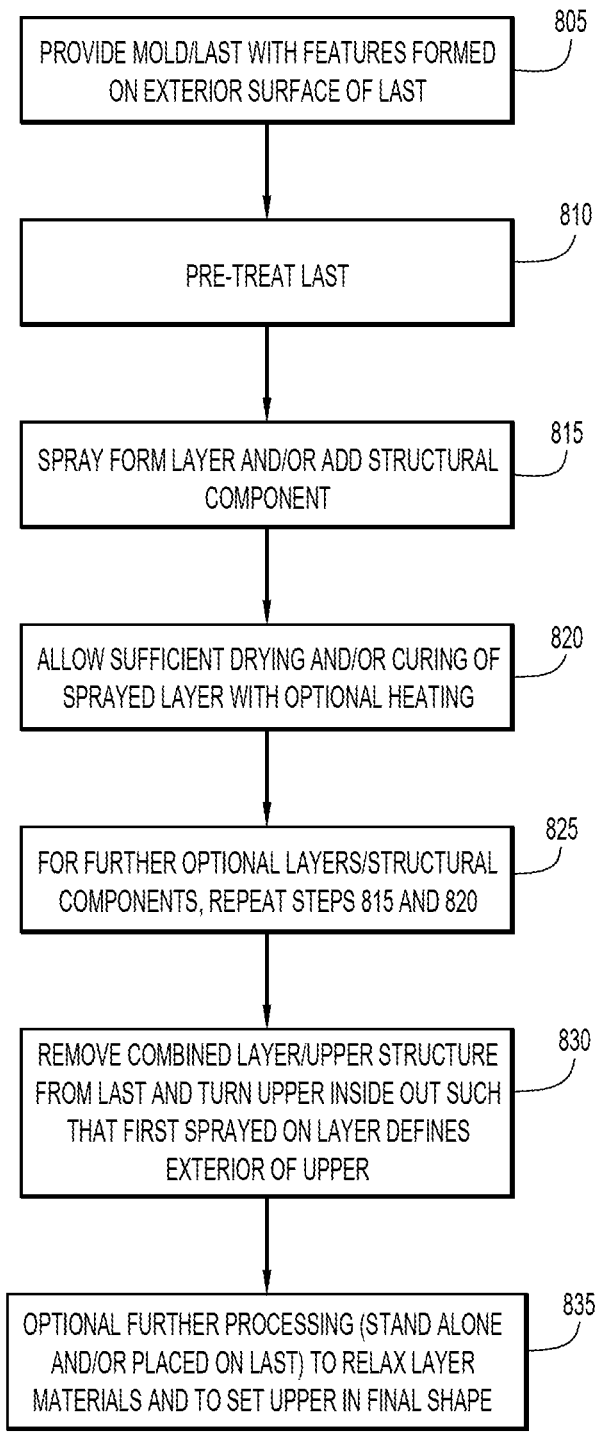
FIG. 8 is a flowchart that sets forth method steps for spray coat forming of an upper in accordance with an embodiment of the invention as described herein.
Figure 9:
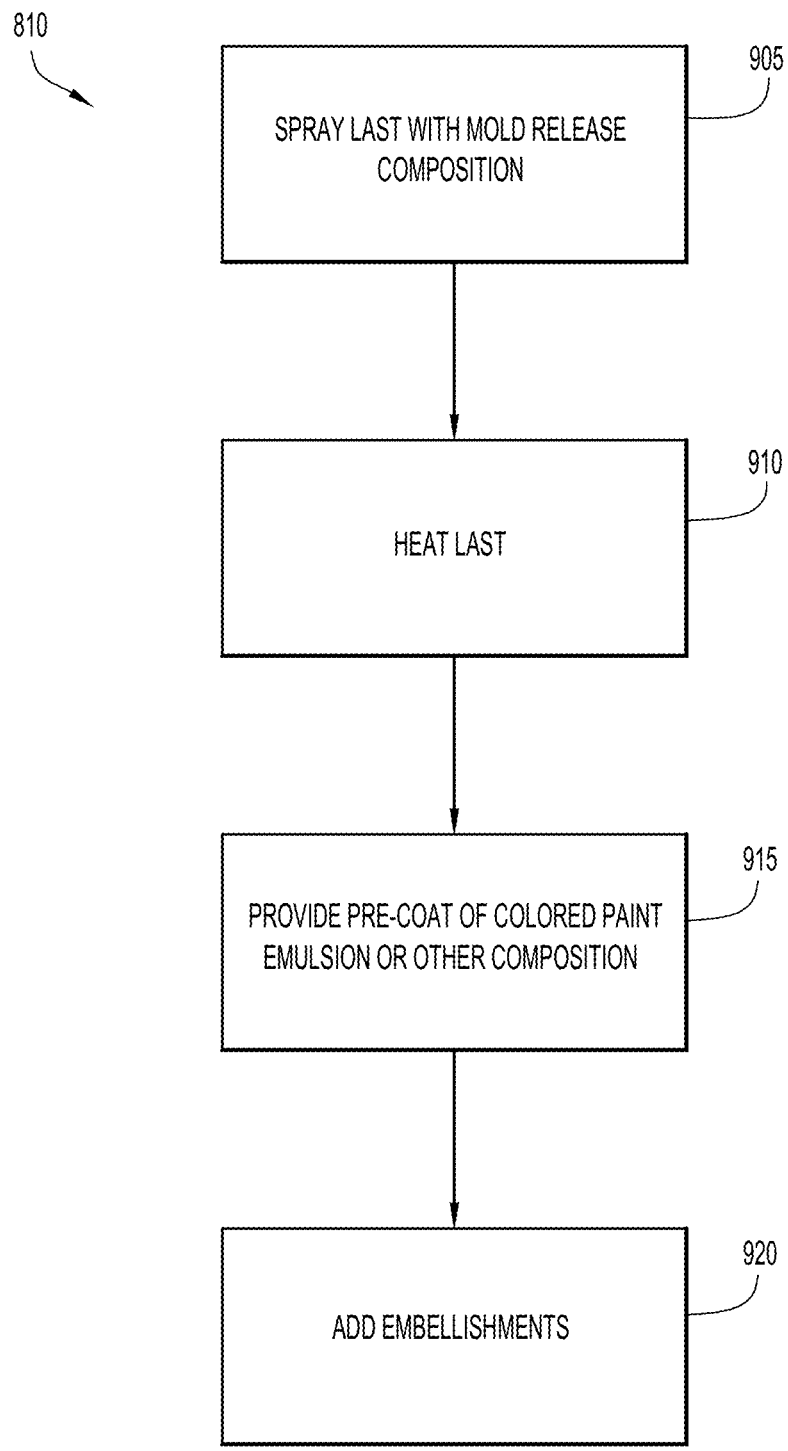
FIG. 9 is a flowchart setting forth an example embodiment of pre-treatment steps for treating the last prior to spray forming of structural layers of the upper on the last.

Referring to the flowchart of FIG. 8, at 805, a shoe last is provided having structural features formed on portions of its exterior surface (e.g., ribs 270 and channels 260 for last 200, or the surface features as shown for the last 400 of FIGS. 4A-4C or the last of FIGS. 6A-6G). As previously noted, the structural features can be of any suitable types and configurations so as to impart a reversed or inverted contour or a negative image of the structural features of the last on the first sprayed structural layer on the last which forms the exterior surface of the upper.

At 810, the last is treated prior to application of the first spray formed structural layer for the upper. Pretreatment of the last can include heat treatment of the last and/or the addition of certain materials to the last to facilitate easy removal of the upper from the last after its formation as well as the addition of certain embellishments that will adhere to the initial or first sprayed structural layer of the upper (i.e., the layer which will have a surface defining the exterior of the upper). Depending upon the chemical makeup/compositions of at least the initial layer (which becomes the exterior layer of the upper) to be sprayed onto the last, it may be desirable to heat treat the last such that it is at a certain temperature prior to and/or during spray treatment and/or setting or curing of the layer(s) forming the upper. The last can also be sprayed with a mold release composition that minimizes or prevents adhesion or sticking of the layer sprayed directly onto the last. Any suitable mold release composition can be used that is suitable for the type of material to be initially spray formed onto the last.

Certain embellishments, such as structural components that provide aesthetic designs (e.g., a company logo, other design features) to the exterior of the upper can also be applied to selected areas of the last, where the embellishments become at least partially embedded within the exterior surface of the upper as the initial layer is sprayed over such embellishments and formed on the last. Another pretreatment of the last prior to forming the initial structural layer for the upper is to apply a pre-coat of a colored emulsion or other colored coating that results in adhering to the initial structural layer sprayed onto the last subsequent to application of the pre-coat colored layer.

An example series of pretreatment steps associated with step 810 are described with reference to the flowchart depicted in FIG. 9. Any one or more of the pre-treatment steps may be performed, and the order of performing such steps can also be modified in any desired manner. In this example, at 905, the last is sprayed with a mold release composition to facilitate ease of removal of the upper from the last after the upper has been formed. At 910, the last is optionally heated to dry the mold release composition and/or to obtain a suitable operating temperature of the last as one or more structural layers are applied to the last and depending upon the chemical/structural compositions of the materials being sprayed (so as to achieve desired properties, curing and/or other chemical reactions of the materials sprayed on to the last in forming the one or more layers).

At 915, a pre-coat is applied to the last, where the pre-coat composition can be one or more paint emulsions having one or more desired colors and/or other compositions (e.g., a PU composition) which will adhere to the exterior (i.e., first spray formed) layer of the upper. The pre-coat can further include chemical compositions having other physical properties such as antimicrobial properties, hydrophobic properties, etc. These physical properties (e.g., antimicrobial properties, waterproof or water resistant properties, etc.) are thus imparted to the exterior surface of the spray formed upper. In addition, when pre-coating with paint emulsions, the spray patterning can be adjusted during application of paint emulsions having one or more colors, where the paint emulsions can be sprayed in two or more different directions as the paint emulsions are applied to the last. This can result in a unique transitional color effect, when the sprayed paint emulsions are transferred to the surface of the first layer applied to the last, particularly when the paint emulsions are sprayed in two or more directions onto the last at the raised, three dimensional structural components/features.

At 920, embellishments can be added to the last at one or more desired locations. The embellishments (e.g., aesthetic structure such as company logos and/or other designs) can be pressed against the pre-coated surface of the last and held in place, by friction and/or sticking to the pre-coat which might be slightly dried (e.g., in a gel like state) but still somewhat tacky (e.g., not fully cured, solidified, dried and/or hardened). While steps 915 and 920 are described in which embellishments are added after a pre-coat (e.g., with emulsion paint), these steps can also be reversed in order (e.g., embellishments applied to last prior to pre-coating with emulsion paint).

Referring again to the flowchart of FIG. 8, at 815 (after pre-treatment of the last), a first layer is formed by spraying a polymer material (e.g., PU, polyester, polyolefin or polyether) over all or selected portions of the last, including last portions that include the three dimensional exterior surface structural features (such as ribs 270 and channels 260 of last 200, or the structural features of last 400 or last 600). The polymer material can be, e.g., in a liquid, solid or semi-solid/semi-liquid (i.e., a partially wet) state and/or can undergo one or more chemical reactions as the material is deposited onto the last. The polymer material can be sprayed in any suitable manner and utilizing any one or more types of spray equipment.

For example, referring to FIG. 10A, an automated spray system is utilized in which a robotic arm 1010 including at least one spray nozzle 1020 directs a flow of polymer material 1030 (e.g., as an aerosol or suspension of closely packed particles and/or droplets of polymer material, where the polymer particles can be in a liquid, solid or semi-solid/partially liquid state) onto the last, where the robotic arm 1010 can move in one or more passes over selected portions of the last (where the robotic arm is programmed to move in a selected travel pattern over the last) to build up the first layer (e.g., layer 710) to one or more desired thicknesses. During this spraying of the first layer onto the last, the sprayed material forms over the structural features of the last which results in the formation of a reversed or inverted contour (i.e., a negative image) of such features on the layer (e.g., ribs 270 of the last 200 define corresponding channels 170 on the surface of the layer 710 of upper 100, while channels 260 of the last 200 define ribs 160 on the surface of the layer 710 of upper 100). Further, if any embellishments and/or emulsion paint or other pre-treatment layer was applied to the last, the structural material layer applied to the last over such pre-treatment layer will adhere to such embellishments and/or pre-treatment layer (e.g., embellishments will become partially embedded within the sprayed on/spray formed layer while the emulsion paint adheres to the exterior surface of the sprayed formed layer). Thus, when the upper is removed from the last at the end of the process, the exterior surface of the upper (e.g., the exposed surface of layer 710 of the upper 100) will include such embellishments and/or color features.

The spraying of the first (i.e., upper exterior) layer as well as subsequent layers onto the last (at step 815) can be performed so as to provide a substantially uniform thickness over the last or, alternatively, to vary the thickness of the layer over the last. For example, it may be desirable to build up the layer to a greater thickness along some portions in relation to other portions of the upper. For example, spray forming a layer can be performed to achieve a greater thickness at areas such as the heel end or heel cup of the upper in comparison to areas such as the vamp section, medial and/or lateral sides of the upper (e.g., to provide enhanced structural support for the upper along the heel or along the sides of the upper). In another example embodiment, the thickness of the spray formed layer can be varied such that the layer has a greater thickness at a lower end that connects with a sole structure, while the thickness gradient of the layer changes in that it decreases (becomes thinner) as the layer extends upward toward an upper end of the upper. In applications in which a thickness gradient is imparted in the spray formed exterior layer such that the layer decreases in thickness from a lower (sole structure connecting) end toward an upper end of the upper can create a speckled like effect for the exterior surface at the thinner layer portions.

The spraying technique can further be performed by varying the structural composition of the material as it is sprayed along different areas of the last to form the layer such that the upper layer that is formed has different physical characteristics in certain areas (e.g., creating an upper layer having different physical properties in different locations or zones of the upper). For example, the density, precise chemical formulation, etc. of the polymer material being sprayed to form a single layer on the last can be modified at certain areas so as to vary physical features such as breathability/air permeability, weight, etc. of the layer at different locations of the upper while maintaining the same or similar thickness at all locations of the single layer.

The optional modifications in thickness (forming a layer having a thickness gradient along selected directions of the spray formed layer), density (forming a layer having a density gradient along selected directions of the spray formed layer), chemical composition (modification in chemical composition of the material forming the layer along selected directions of the spray formed layer), etc. for a spray formed layer can be achieved in a number of different ways using one or more spray form nozzles. For example, a spray system utilizing an automated robotic arm that includes one or more spray nozzles can be provided to spray the polymer material in one or more different formulations (e.g., two or more PU materials having different densities) and at one or more spray velocities toward the last (e.g., changing the spray velocity from the spray nozzle in selected directions of spray along the last). In addition, controlling the traveling speed of the robotic arm as it sprays over the last to form a layer, and controlling the number of passes (e.g., one pass, two passes, three passes, etc.) over the same surface area portions of the last by the robotic arm while spraying material toward the last can be used to adjust physical properties such as layer thickness, layer density, layer chemical composition along different locations of the spray formed layer. The shape of the material spray or spray pattern from the nozzle can be of any suitable type, such as flat or conical/cone shaped, depending upon the spray nozzle utilized for a particular spray forming process, and this can also be adjusted to achieve different properties for the material layer spray formed on the last.

Thus, the spray methods described herein facilitate modifying physical properties of the material within a single layer of the upper that is formed of the same or similar type of polymer material (e.g., PU) as well as the structural properties of the upper (e.g., air permeability/breathability, structural/reinforcing strength, etc.) within this single layer at different locations of the upper.

After the first layer has been formed at the desired thickness (or thicknesses) and/or desired density (or densities) along the last, the formed layer is allowed to at least partially dry and/or partially cure, at 820, prior to applying any further layer and/or structural components to the layer. Depending upon the polymer chemistries involved in formation of the layer (based upon the types of one or more polymer materials used to form the layer), the layer may require a certain period of drying, hardening and/or curing time before further process steps can occur. The last may also be heated during this time to enhance (e.g., accelerate) drying/curing/hardening of the material layer on the last.

After a suitable time for drying/curing of the first polymer layer spray formed on the last, the process can proceed, at 825, by applying any further polymer layer and/or structural components as desired and then allowing for sufficient drying/curing of the layer prior to applying any further layers or components to such layer (i.e., repeating steps 815 and 820).

In example embodiments, it may be desirable to only allow the material layer to partially dry or partially cure before any further layer and/or structural component is deposited or spray formed over this layer. For example, during curing of a polymer material in the sprayed layer (e.g., a PU material or a polyester material), the polymer material can become gel-like or sticky/tacky while not being fully hardened or cured. It is desirable to apply any further layer and/or structural component during the time period at which the polymer material within the layer is not fully cured/dried/hardened but instead only partially dried/cured and still in a tacky or gel-like state. For example, application of a further layer to an already formed layer can occur prior to the end of the cure time for the polymer material under its curing conditions but after the polymer material has gelled (e.g., at a time period that is between the gel time and the cure time for the polymer material). Applying any subsequent polymer material layer during this period facilitates suitable adhesion between the two adjacent layers at their interfaces or boundaries (e.g., by chemical bonding and/or structural engagement between the polymer materials of the two layers at such interface or boundary). Such adhesion between adjoining layers can be achieved via the spray forming process without any lamination of the layers together or laminate disposed between the layers and/or without any other adhesive material required to secure the two layers together.

Referring again to FIG. 7, a next or successive layer can be spray formed over the most recently spray formed layer prior to this layer being fully dried, hardened and/or cured. This can result in a portion of the next spray formed layer combining (e.g., partially overlapping) with the already formed layer at the interface or boundary so as to form a thin transition zone at such boundary, where the transition zone can comprise combinations of sprayed material forming each of the two adjoining layers. As depicted in the example embodiment of FIG. 7, a transition zone 735 is formed during the spray forming process in which layer 720 is already spray formed over layer 710. In particular, the first or initial spray formed layer 710 can comprise a material A, while the next, subsequent or second spray formed layer 720 can comprise a material B. The transition zone 735 formed at the boundary between layers 710 and 720 comprises a combination of materials A and B. Materials A and B can be materials that comprise completely different chemical compounds (e.g., material A comprises PU while material B comprises polypropylene staple fibers mixed or combined with a binder material). Alternatively, materials A and B can comprise the same basic chemical compounds that differ in densities, molecular weights and/or other physical properties (e.g., material A can comprise a first PU, and material B can comprise a second PU that has a different molecular weight and different density in relation to the first PU). Similarly, a transition zone 740 is formed during the spray forming process in which layer 730 is spray formed over layer 720, where layer 730 can comprise a material C that differs from material B and the transition zone 740 includes combinations of materials B and C.

The combination of the two adjoining layers that defines the transition zone at their boundaries and that includes a combination or mixture of the materials used to form the two adjoining layers can have a thickness that is much smaller (e.g., 10% or less in thickness) than the thickness of one or both of the spray formed layers adjoined to each other. In addition, a density gradient exists for each material within the transition zone. For example, and referring again to FIG. 7, the density of material A in transition zone 735 decreases from a greater density value to a smaller density (eventually approaching zero) in a direction going from layer 710 to 720 (as shown by arrow A). Similarly, the density of material B in transition zone 735 decreases from a greater density value to a smaller density (eventually approaching zero) in a direction going from layer 720 to 710 (as shown by arrow B1). The density of material B in transition zone 740 decreases from a greater density value to a smaller density (eventually approaching zero) in a direction going from layer 720 to 730 (as shown by arrow B1), while the density of material C in transition zone 740 decreases from a greater density value to a smaller density (eventually approaching zero) in a direction going from layer 730 to 720 (as shown by arrow C).

Any structural components that are desired to be formed as part of the upper can be applied by adhering a preformed structural component to the tacky surface of the not fully dried and/or not fully cured layer, followed by spray forming any further polymer layer over the existing layer with structural component adhered to such layer. In certain embodiments, this can result in securing and embedding of the structural component between the two spray formed layers, where the structural component provides enhanced strength and support in the upper at the location in which the structural component is provided due, e.g., to the structural component having a greater hardness (e.g., a greater harness or durometer value, such as a greater Shore A hardness value) in relation to the layers between which the structural component is embedded. Structural components can be formed of any suitable polymer and/or other material (e.g., harder plastic materials such as nylon). Alternatively, the structural support can be spray formed on a portion of the already formed layer (e.g., at a heel location of the last), where the polymer material that is spray formed may be spray formed as a harder material (e.g., a harder material has a greater durometer value in relation to a softer material, which can be measured, e.g., as a Shore A hardness value) at the locations in which a structural component is desired. The structural support material can even be of the same polymer type (e.g., PU or polyester) as the adjacent, underlying (already spray formed) polymer layer but having a different density or other physical characteristic that renders the structural components as formed to have a greater hardness (e.g., greater Shore A hardness) in relation to the underlying layer. As described in further detail herein, a variety of different types of structural components can be embedded between spray formed layers of the upper.

After all of the layers have been formed and sufficiently dried and/or cured, the formed upper can be removed from the last and inverted, being turned inside out (at 830, also depicted in FIG. 10D), where the first spray formed layer on the last (e.g., layer 710) becomes the exterior layer and the last spray formed layer (e.g., layer 730) becomes the interior or foot facing layer of the formed upper. In an example embodiment, the upper can basically be pulled or peeled back from the last such that it is turned inside out as it is removed from the last (where the mold release composition inhibits or minimizes undesirable sticking of the initial sprayed on/spray formed layer to the last surface).

In addition to three dimensional structural surface features being imparted to the exterior ("skin") layer of the upper by the last, the last can also impart other features to more than just one layer of the upper. For example, openings or eyelets can be formed in the upper based upon protrusions provided on the last (e.g., cylindrical protrusions 255 of last 200, cylindrical protrusions 455 of last 400, cylindrical protrusions 655 on last 600) which have greater lengths (i.e., extend further) than the combined thickness of the plurality of layers spray formed on the upper. For example, when the spray formed upper is pulled or peeled back from the last and turned inside out (as depicted, e.g., in FIG. 10D), openings are defined at locations of the upper corresponding with the projections on the last (e.g., eyelets 155 for upper 100, eyelets 355 for upper 300, eyelets 555 for upper 500).

Further, for embodiments in which the last is also configured to define a tongue portion or tongue member for the upper (e.g., tongue forming portion 445 for last 400 or tongue forming portion 645 for last 600, which facilitates that spray forming of tongue portion 345 for upper 300 or tongue portion 545 for upper 500), the spray forming process includes spray forming material over the tongue forming portion of the last to form the tongue member of the upper. As previously described herein, the tongue forming portion of the last can include an upper/outwardly facing surface (e.g., surface 446 of last 400) onto which material is spray formed, and such surface can be slightly raised to define a sharply angled transition to other surface portions of the tongue forming member, where this sharply angled transition can facilitate easy separation/removal of the tongue portion of the upper during peeling back of the upper from the last. Alternatively (e.g., refer to last 600), the tongue forming portion can be contoured with the shape of the vamp portion of the last and still form a tongue portion that is continuous/integral with the formed upper.

An optional final step in forming the upper (step 835) involves further heating and/or other processing to set the upper in its final shape. For example, in certain embodiments (depending upon materials used to form layers, dimensions of layers, structural components within and/or between layers, etc.), and due to the switching or flipping of the orientation of the interior and exterior layers of the upper upon removal from the last and switching its configuration from inside to out, the upper may have some slight deformations in certain locations. As a further optional step, the upper can be re-lasted or placed back on the last (or another last having similar dimensions as but not including the exterior structural surface features of the last used to form the upper) in its inside out or final configuration (i.e., with the exterior layer having the structural features, such as layer 710 of upper being in the exterior layer configuration) and at a suitable time period after forming the final layer (e.g., prior to the final layer being fully cured) so as to allow the upper to take its final relaxed form and shape and remove any potential deformations caused by its removal from the last (e.g., to align surface portions of the upper in their final desired shapes and configurations). In addition, the upper can also be heat treated while being re-lasted (e.g., at a temperature suitably less than the softening and/or melting temperature of at least one or all of the materials forming the upper) so as to enhance and/or accelerate this process.

Structural Features Achieved for the Upper Utilizing the Spray Forming Process

The spray forming process described herein facilitates the formation of a composite upper including a plurality of distinct or indistinct layers and in which at least one exposed layer (e.g., the exterior layer) has fine structural surface features imparted by corresponding structural features on the last. The process provides a number of benefits for forming uppers with a wide variance in physical properties at one or more different locations of the upper while also facilitating relative ease of production. Some examples of beneficial features imparted by this spray forming process are described as follows.

Internal structural components can be provided between layers of the spray formed upper (i.e., the structural components are embedded within the upper) to strengthen or provide structural support at different locations for different purposes. Some non-limiting examples of internal structural components include one or more heel structural support elements or heel counters that are applied to a layer located at the heel end of the last, one or more structural components that are provided along the surface of the layer that correspond with medial and/or lateral forming sides of the last, one or more structural components provided at the toe cage of the last (e.g., to strengthen the upper and provide added protection to the user's toes at the toe cage location), one or more metal or polymer annular ring members provided at suitable locations at or near the neck of the upper to provide structural support for eyelet openings (used for engaging with a shoe lace or other fastener of the shoe), etc. In addition to forming structural components between two layers of the upper, structural components can also be added during the formation of a single layer (e.g., during multiple spray passes used to form a single layer) so as to secure and embed the structural component within the single layer.

Figure 11A:
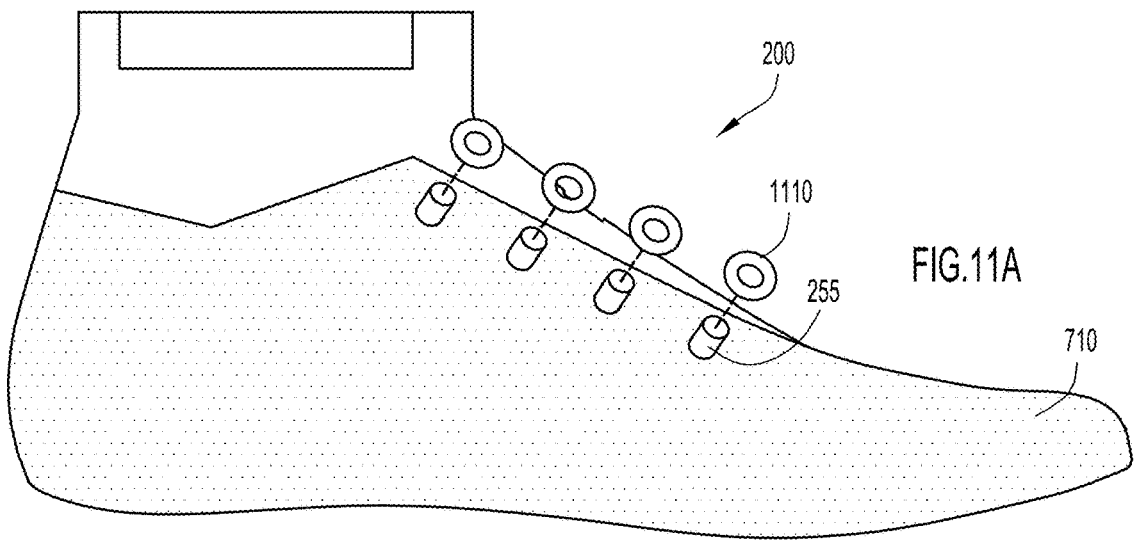
FIGS. 11A-11C depict a series of steps in a manufacturing process of a spray formed upper in which structural components (eyelet reinforcing members) are embedded between spray formed layers of an upper in accordance with an embodiment of the invention.
Figure 11B:
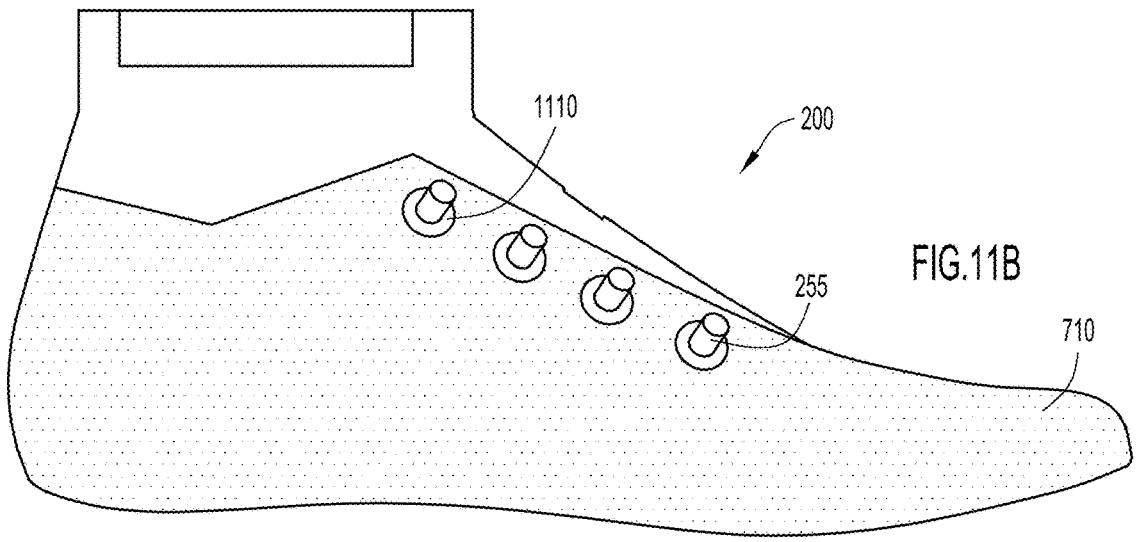
Figure 11C:
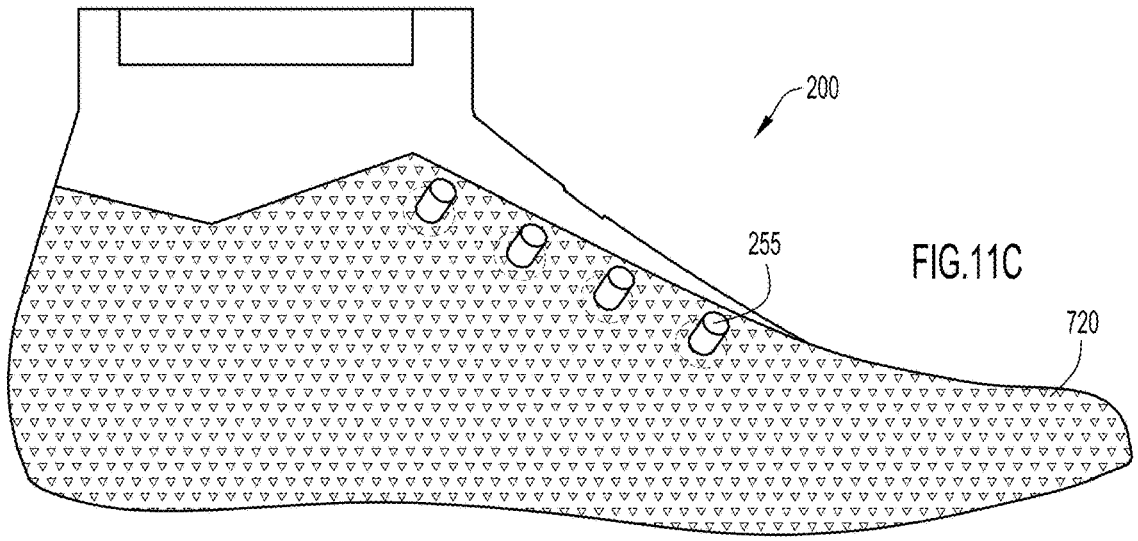

In an example embodiment depicted in FIGS. 11A-11C, eyelet strengthening components having an annular shape (e.g., metal annular components or metal rings, textile annular components or textile rings, etc.) 1110 can be placed over a spray formed layer (e.g., the first spray formed layer 710 that becomes the exterior "skin" layer of the upper, as shown in FIGS. 11A and 11B) and around eyelet forming protrusions 255 on the last 200 prior to spray forming another layer over the spray formed layer. The eyelet forming protrusions 255 comprise elongated (e.g., cylindrical) members that extend from the exterior surface of the last 1100. In FIG. 11C, a successive layer (e.g., layer) 720 is spray formed over the present layer (layer 710) and the components 1110. This results in embedding of the eyelet strengthening components 1110 within the upper (i.e., between layers of the upper) at the eyelet opening locations (i.e., at locations corresponding with the protrusions 255 on the last 200).

Figure 12A:
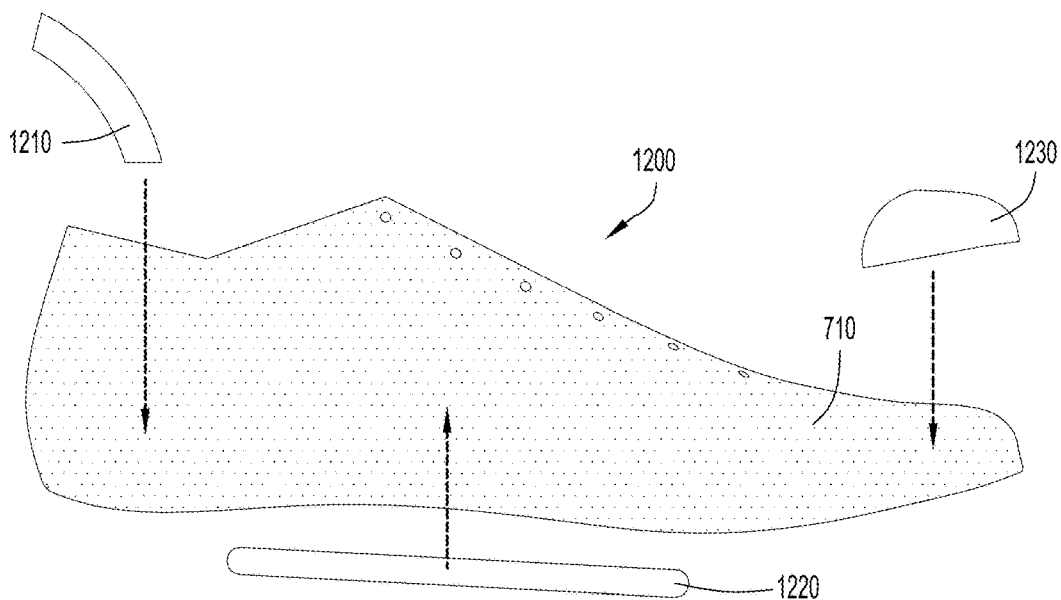
FIGS. 12A-12C depict a series of steps in a manufacturing process of a spray formed upper in which structural components (e.g., a heel counter, lateral and/or medial side structural support elements, and a toe cage reinforcing protection element) are embedded between spray formed layers of an upper in accordance with another embodiment of the invention.
Figure 12B:
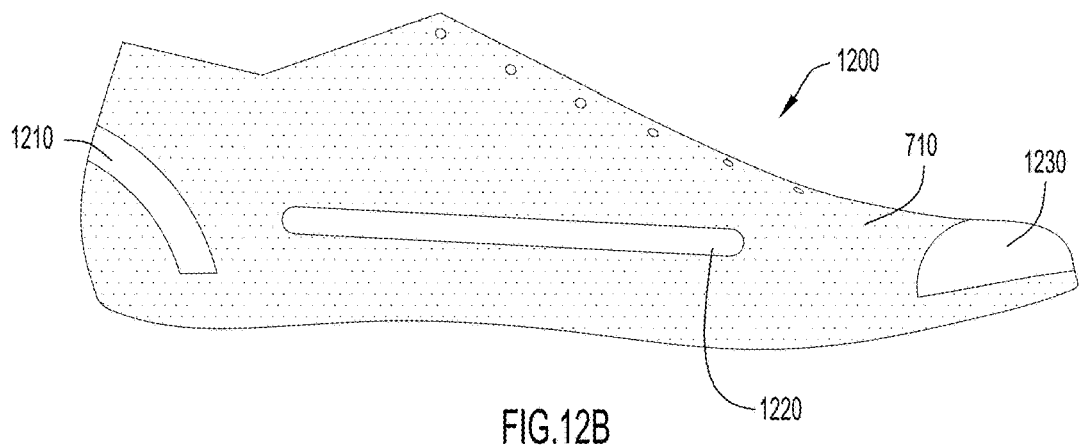
Figure 12C:
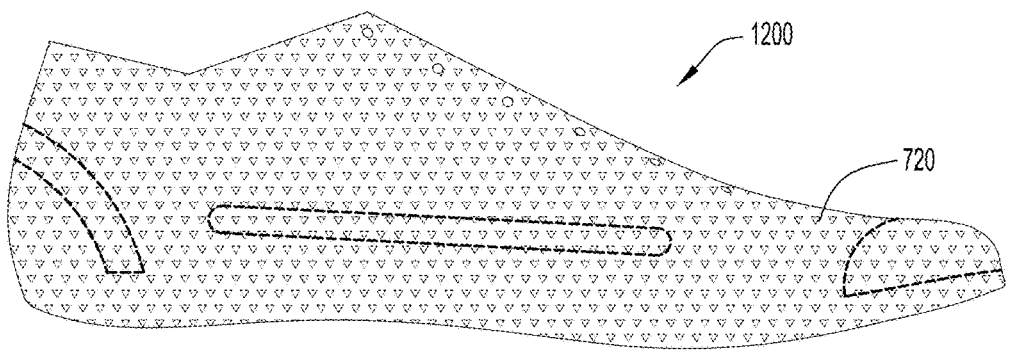

In another example embodiment depicted in FIGS. 12A-12C, structural support elements are provided on a spray formed layer (e.g., layer 710) of a last 1200. In particular, a curved member 1210 is provided around the heel end over the layer of the last 1200 (see FIGS. 12A and 12B), where the curved member 1210 can function as a heel counter (e.g., a structural heel support element) for the spray formed upper. An elongated member 1220 can be provided on the spray formed layer along one or both of the medial and lateral sides (e.g., to function in the spray formed upper as side structural support elements for the upper), while a further curved member 1230 can be provided on the spray formed layer at the toe cage portion of the last 1200 (e.g., to function in the spray formed upper as a toe cage protection member or element for the upper). A successive layer (e.g., layer 720) is then spray formed over the existing layer (e.g., layer 710) so as to cover and embed the structural support elements 1210, 1220 and 1230 between layers of the upper. The structural components can be formed of any suitable materials that provide sufficient support for their intended purpose. An example embodiment of a material used to form an embedded structural component is a polyamide material (e.g., nylon) or other suitable polymer material, a metal material, etc.

In addition, any of the layers can be spray formed as a nonwoven or other fibrous material layer (e.g., a fabric or textile layer). A fibrous material can also be spray formed or applied as an embedded structural component at any suitable locations on the last to provide a desired functional property for the spray formed upper. A fibrous material, as used herein, refers to any material that includes fibers or filaments that can be spray formed on the last or, alternatively, that can be preformed and applied to the last (e.g., to function as an embedded structural component of feature). Some example embodiments of fibrous material include, without limitation, a nonwoven web of continuous filaments that are spray formed on or that are preformed and applied to the last (e.g., onto a layer already spray formed on the last), staple fibers that are spray formed on or that are preformed and applied to the last (e.g., on a layer already spray formed on the last). In a further example embodiment, staple fibers can be combined with a suitable polymer or other binder material and spray formed onto the last (e.g., on a layer already spray formed on the last).

As previously noted, the filaments or fibers forming the nonwoven material layer can be formed from any suitable one or more types of polymer materials typically utilized for forming nonwoven fibrous webs including, without limitation, polyolefins (e.g., polyethylene, polypropylene, etc.), polyesters (e.g., polyethylene terephthalate), and polyamides (e.g., nylon), including fiber combinations that provide a desired elasticity to the nonwoven web such as elastane fibers (e.g., elastic PU, such as the types commercially available as Lycra or Spandex). The filaments or fibers can also have varying cross-sectional geometries with fiber types including, without limitation, side-by-side bicomponent or multi-component (i.e., two or more different polymer types forming a filament), sheath-core, island-in-the-sea, etc. By varying amounts and types of polymer materials (as well as filament cross-sections of such polymer materials) within the fibers/filaments used to form the nonwoven web fibrous layer, various physical characteristics of this layer can be controlled (e.g., breathability or air/moisture permeability, elasticity, moisture absorption, etc.).

By selecting an appropriate spray system including suitable polymer materials and a spray nozzle 1020 suitably configured to direct a flow of one or more polymer fibers or filaments toward the last, a nonwoven web (i.e., a web of entangled polymer fibers or filaments) or other fibrous material (e.g., staple fibers or staple fibers combined with a binder material) can be formed of any suitable thicknesses and densities (either uniform or varying over the fibrous material layer). Any suitable fibrous material layer (i.e., a material layer that includes polymer filaments or fibers, such as staple fibers or continuous filaments) can be spray formed on the last to form layers or embedded structural components of a spray formed upper. The spray formed fibrous material layer can also be allowed to dry to a sufficient degree prior to spray forming any further layer upon this layer.

In an example embodiment, fibers or filaments can be spray formed as continuous filaments that deposit over the last at selected locations so as to form a nonwoven layer or fibrous mat type layer at the deposited locations.

In another example embodiment, staple fibers can be spray deposited in a suitable binder material (e.g., a polymer binder) to form a spray formed nonwoven or other fibrous material layer. For example, a fibrous material composition can include staple fibers of sufficient length (e.g., at least about 0.01 mm in length and no greater than about 20 mm in length) provided within a binder material. The binder material can comprise, e.g., a suitable organic solvent (e.g., a C2-C12 alkane, ether, alcohol, ketone or ester) combined with a suitable block copolymer (e.g., a polystyrene-polybutadiene-polystyrene block copolymer) such that, when combined with the staple fibers, the binder material provides a suitable viscosity for the fibrous material composition to be sprayed onto the last.

Any number of subsequent layers of any suitable types (sprayed formed polymer layer, sprayed formed foam layer and/or sprayed formed nonwoven or other fibrous material layer) can be spray formed on the previous layer (i.e., by repeating steps 815 and 820 of the spray forming process), where the thicknesses of the layers can be selected based upon a particular application and the polymer material used to form such layers.

Figure 10B:
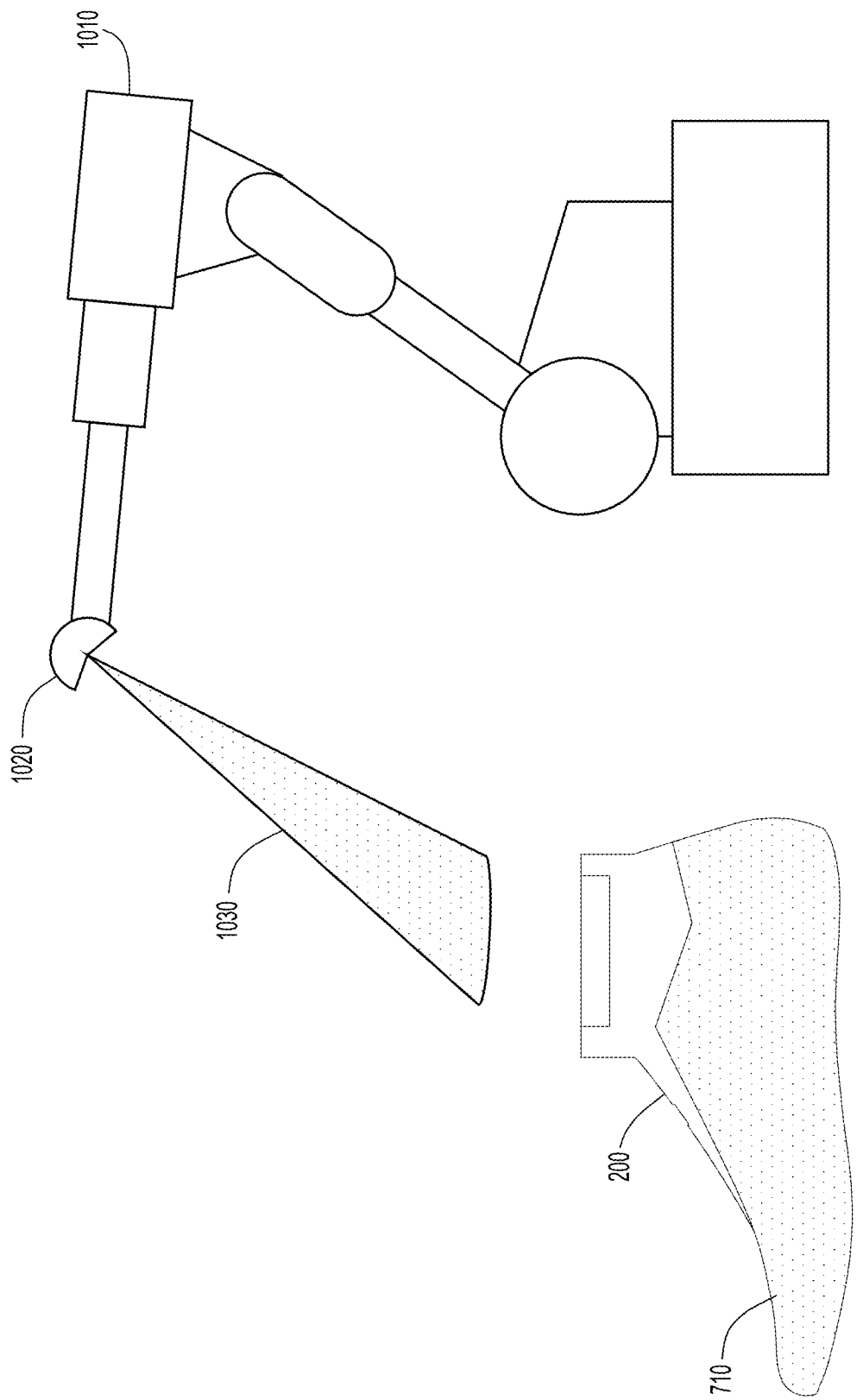
Figure 10C:
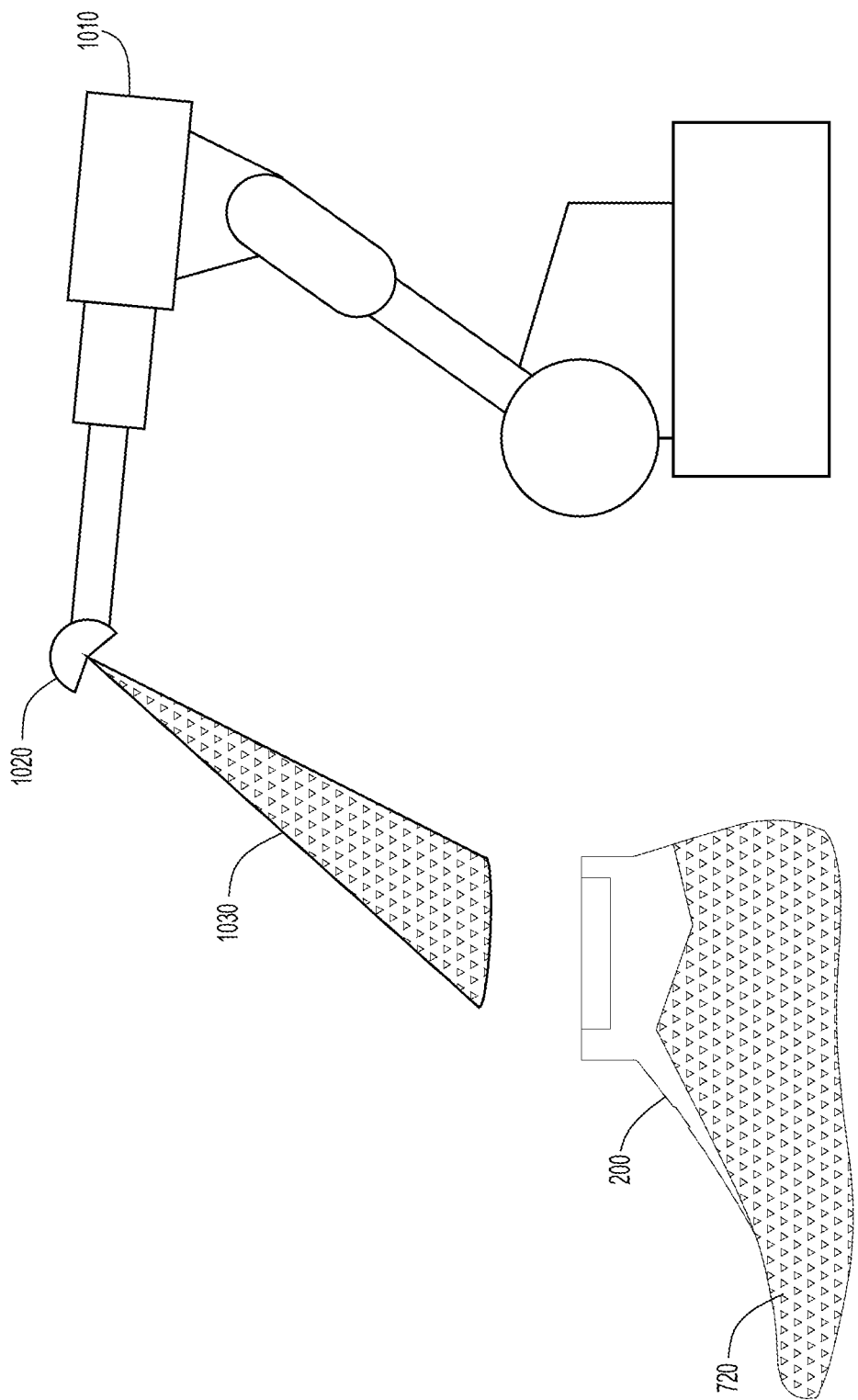

In the example embodiment of an upper including layers 710, 720 and 730 (FIG. 7), the first spray formed layer 710 can comprise an elastomeric PU material that forms the exterior plastic "skin" layer of the upper, the second layer 720 can comprise a foam material, such as a PU open cell foam material that differs from the PU plastic material forming layer 710, and the third layer 730 can be any suitable nonwoven or other fibrous material layer or other suitable polymer skin layer that forms the interior foot facing surface of the upper. As depicted in FIGS. 10B and 10C, the second layer 720 and third layer 730 are formed over layer 710 (formed by the first structural material layer spraying as depicted in FIG. 10A).

The spray forming process for manufacturing the upper can result in a fully seamless upper (i.e., no seams are in the upper), particularly when the upper is spray formed with one or more layers around a single, three dimensionally shaped last (i.e., there is no combination of two or more molds defining a single surface around which the layers are spray formed).

In particular, in the process in which the upper is formed such that the first spray formed structural layer on the last becomes the outermost, exterior surface layer of the upper (due to the upper being turned inside out after it is formed on the last), the outermost spray formed layer on the last (i.e., prior to removal of the upper from the last) can be spray formed so as to have a relatively smooth and seamless exposed surface (i.e., the surface which becomes the interior or foot facing surface of the upper after it has been turned inside out). This avoids or minimizes undesirable seams or other surface contours on the interior surface of the upper that might cause friction and irritation to a user's foot.

Polymer material layers that are spray formed on the last can be formed so as to impart a variety of different physical characteristics between layers at different locations of the upper and even different physical characteristics in a single layer at different locations of the upper over which such layer extends. The automated spray system, which can include a robotic spray arm, can be equipped with multiple spray nozzles so as to provide a number of different features within a single spray formed layer. For example, the multiple spray nozzles can be manipulated (e.g., via an automated process) to spray the same type of polymer material (e.g., PU) but having different densities and/or other physical characteristics at different locations of the same spray formed layer. In one embodiment, PU having a first density is sprayed at the locations of the last that define the lateral and medial sides of the upper and PU having a second density that differs from the first density is sprayed at locations of the last that define the heel cup and toe cage of the upper such that the two types of PU are defined within a single layer spray formed on the last (e.g., the first layer which forms the exterior layer of the upper after it is removed from the last and turned inside out).

In other embodiments, two different types of polymer materials may be spray formed within a single layer (e.g., using two separate spray nozzles of the robotic spray arm). In one such embodiment, a combination of two or more different polymer materials (e.g., PU and polyester) can be sprayed together over the desired locations of the last and thus combined to form the single layer at such locations. In other embodiments, the two or more different polymer materials (or different combinations of polymer materials) can be spray formed at separate locations but combining at their interfaces so as to define a single, integrated layer of the last. For example, for the first spray formed layer (which becomes the exterior layer of the upper), a first polymer material (e.g., PU) can be spray formed at certain locations of the last (e.g., the lateral and medial side locations) while a second polymer material (e.g., polyester or polyether) can be spray formed at other locations of the last (e.g., the heel cup location and/or the toe cage location) and the different polymer materials forming the layer are combined at their interfaces by the spray forming process such that a single, integral layer of the different polymer materials is formed.

Thus, various changes can be made during spray forming of one or more layers on the last (e.g., changing densities or other physical characteristics of the same polymer material type and/or changing polymer materials or different combinations of two or more polymer materials during spray forming passes to build a single layer) as a result of using the automated spray forming system and methods described herein.

The thickness of each layer of the upper can also be selectively and easily controlled by the spray forming system and process, where the thickness of two or more layers can differ and the thickness of a single layer can be maintained generally uniform or varied at different locations of the layer (and different corresponding locations of the upper). The selection of thicknesses of each layer can be based upon a number of factors including, without limitation, the types of polymer materials used to form each layer, the desired functionalities and physical properties desired for different locations of the upper based upon different applications of use, etc.

Generally, for the exterior skin layer, the thickness can range from about 0.1 mm (millimeter) to about 10.0 mm or greater, such as from about 0.5 mm to about 3.0 mm or greater. Other layers of the upper can have similar thickness dimensions (e.g., the inner skin layer or lining of the upper), while other layers can be much greater in thickness depending upon a particular application. For example, in embodiments in which a foam material layer such as PU foam is provided within the upper (e.g., layer 720 of the upper), the foam material can have the greatest thickness in relation to other layers and can further vary in thickness at different locations of the upper (e.g., having thicknesses in certain locations of about 100 mm or greater). In certain applications such as, e.g., basketball shoes, it may be desirable to provide additional padding or foam material along medial and/or lateral sides of the upper that correspond with the user's ankle (so as to protect and minimize or prevent rolling of an ankle). In such scenarios, the foam layer can vary in thickness so to have its greatest thickness at the locations requiring more padding and protection for the user's foot.

Regarding the structural features that are formed on the exterior surface of the upper (e.g., ribs 160 and channels 170 of layer 710 for the upper 100, or other structural features layer 710 such as those depicted for the upper 300 or the upper 500), the spray forming process facilitates the formation of structural features having very intricate or fine dimensions and complex patterns. Since the desired structural features on the exterior surface of the upper are imparted as inverted or reversed in contour (i.e., a negative image) in relation to the corresponding features on the exterior surface of the last, this enhances the ease and ability to mass produce uppers having such features with little waste and while minimizing manufacturing time (thus minimizing production costs). The structural surface features (e.g., ribs 160 and channels 170 for upper 100, or other three dimensional shapes such as those depicted for uppers 300 and 500) can have any suitable shapes dimensions, including any suitable lengths, widths and thicknesses or depths, where such shapes and dimensions are designed for a particular application and to provide a number of different functional features for the upper.

In example embodiments, the last can be designed to impart structural surface features to the exterior surface of the upper that have suitable dimensions and form selected shapes and patterns configured to make the composite upper resistant to tearing. Specifically, the surface features are configured to provide the composite upper with sufficient strength and or control flexure along areas of the upper. In this manner, the surface features function as a "ripstop" or tear resistance feature that protects against or minimizes tearing or ripping of the upper along certain tear lines that might otherwise be imparted to the upper surface (e.g., as the upper is removed from the last during the last stage of production). Depending upon the thickness of one or more layers of the upper and/or the overall thickness of the upper, one or more tear lines might propagate within an upper, e.g., when the upper is removed from the last on which it is formed and/or when subjected to any other frictional, stretching and/or shearing forces. This can be an issue for any material layer that is spray formed around a mold, where the tear strength can be diminished along certain weakened areas (e.g., areas in which a tear line might propagate quickly a portion of the layer in response to being subjected to certain pulling or stretching forces). The structural surface features, such as outwardly extending ribs and/or any other outwardly extending/thicker portions on the exterior surface of the upper, can prevent, inhibit or minimize any tear or at least a significant propagation of a tear along the upper due to the increasing thickness of the layer material (as well as the overall thickness of the upper) at the locations of such structural surface features.

The ripstop or tear resistant functional features can be selectively controlled, based upon selecting suitable dimensions for the structural surface features of the upper exterior surface, including length, width, thickness and depth of the structures, so as to prevent or minimize propagation of rips or tears along the upper surface (within a layer of the upper and/or throughout the entire upper). In particular, the height or thickness of outwardly extending structures (e.g., elongated structures or ribs) can be adjusted, based upon the type of polymer material used to form the layer and/or the location of the structures at the exterior surface of the upper, to selectively control the best ripstop functionality (i.e., the best or enhanced minimization or prevention of ripping or tearing of the upper at such locations). Selecting suitable dimensions (in particular the height or thickness) of the raised ribs or other outwardly extending structures can be material dependent. For example, ribs or other raised exterior surface structures for the upper can have thicknesses ranging from about 0.1 mm to about 3.0 mm or greater, where the selected thickness can depend upon the polymer material used to form the layer (e.g., about 1 mm or greater in thickness of ribs for a polyester material, about 2 mm or greater for a polyether or PU material, etc.) as well as the patterning of structures along the upper exterior surface. Raised or outwardly extending three dimensional structures can be aligned, for example, in a selected pattern and/or number per selected surface area in locations of known weakness in which tear lines along a layer can develop (so as to effectively impart a ripstop at such locations that prevents or minimizes propagation of a tear along the tear line of the layer).

The last can further be designed such that sub-features or micro-features are incorporated in the main or macro structural features. For example, ribs defined on the exterior surface of the upper can further include micro structures, such as grooves and/or raised surface features along one or more surfaces of the ribs or other outwardly extending structure on the exterior surface of the upper so as to function as a roughened (i.e., non-smooth) surface portion for the structure. This can be achieved, e.g., by etching and/or adding additional micro-features on the larger sized or macro structural features formed on the exterior surface of the last. The formation of the last (e.g., by 3D printing, by etching or machining, or in any other suitable manner) facilitates the formation of very elaborate structural features on the exterior surface of the last, including macro or larger sized features and micro or smaller sized features disposed on the macro features, that are imparted to the exterior surface of the upper. For example, for the repeating pattern unit of upper exterior surface portion 302 depicted in FIG. 3C for the upper 300, the hexagonal shaped three dimensional structural components 310 comprise a series of stepped platforms of structures that define varying thicknesses for the upper 300 within the area defined by the repeating pattern unit of upper exterior surface portion 302. The smaller stepped pattern portions (i.e., the stepped pattern portions that occupy the smallest area of the exterior surface of the upper) can define micro structures in relation to the larger stepped pattern portions. Such elaborate and intricate three dimensional patterning would be very difficult to achieve using conventional techniques for forming an upper. With the spray forming process described herein, a variety of different three dimensional structural component patterns can be formed (with macro structures and micro structures defined on the macro structures) on the upper.

Depending upon the number of layers used to form the upper, the materials used to form the layers, the thicknesses of different layers and/or the overall thickness of the upper, any exterior structural surface features (e.g., three dimensional repeating patterns of structural features) formed on the outer (e.g., skin) spray formed layer of the upper can also be imparted or translated to the interior surface of the inner (e.g., lining) layer of the upper. In other words, in such embodiments, three dimensional structural surface features provided to the exterior surface for the outer layer of the upper also result in forming corresponding three dimensional structural features on the interior surface of the inner layer of the upper. In example embodiments, the imparted or translated three dimensional features translated from the exterior layer surface to the interior layer surface can be a negative image or inverted/reversed in contour in relation to the surface contour features of the exterior layer surface (e.g., the surface pattern features on the interior surface of the upper can be similar to the same features provided on the last). Providing an upper that includes a three dimensional (i.e., uneven or non-smooth) contour along the interior surface of the upper inner layer can provide functional benefits for the upper, such as facilitating air flow (e.g., warming or cooling) within the upper when worn due to the pockets or channels that are created between the interface of the upper interior surface with the wearer's foot as a result of this three dimensional contouring.

The spray forming methods described herein further facilitate imparting breathability (e.g., air and/or water or moisture permeability) at selected portions of the upper. Material layers can be easily formed within portions of the upper that have different levels of porosity and/or breathability as well as other functionalities, such as moisture absorption. For example, a nonwoven or other fibrous material layer will typically have greater softness (in feel and texture), greater porosity, greater breathability and greater moisture absorption than a spray formed polymer layer (e.g., PU) that forms the outer, skin layer of the upper. However, such fibrous material layers may not provide as much structural strength or cushioning in certain areas of the upper where such features are desired. Accordingly, it may be desirable to form nonwoven or other fibrous material layers at certain portions of the upper to achieve desired feel, breathability, etc. while still including a plastic (e.g., PU) exterior or skin layer at other portions of the upper to achieve the desired strength and structural integrity of the upper at such portions.

The use of a spray formed nonwoven or other fibrous material layer in the upper facilitates formation of a variety of different uppers in which one or more fibrous material layers are incorporated at different locations of the upper.

In one example embodiment, such as previously described herein, a nonwoven fibrous material layer is provided primarily as an interior layer or lining for the upper (e.g., to provide moisture absorption and a soft feel against the user's foot). In this embodiment, the nonwoven material layer can be provided along some or all of the interior surface portions of the upper, and the nonwoven material layer is not exposed along the exterior of the upper. For example, the last spray formed layer (e.g., layer 530 as shown in FIG. 5) can be a fibrous material layer such as a nonwoven material layer.

In other embodiments, the nonwoven or other fibrous material layer can be formed so as to be exposed at one or more exterior portions of the upper. For example, the outer skin layer can be a harder plastic polymer layer such as PU spray formed first on the last, where the outer skin layer provides structural integrity for the upper and is formed (at least at portions of the upper) as a mesh or cage layer having a plurality of openings to expose a second, nonwoven material layer spray formed directly on the outer skin layer. To facilitate this formation, a last can be provided having raised structural surface features of sufficient length, width and thickness dimensions, where the thickness of the surface features can be about as large (e.g., as great as, slightly less than or slightly greater than) the desired thickness of the first layer to be spray formed on the last.

Figure 13B:
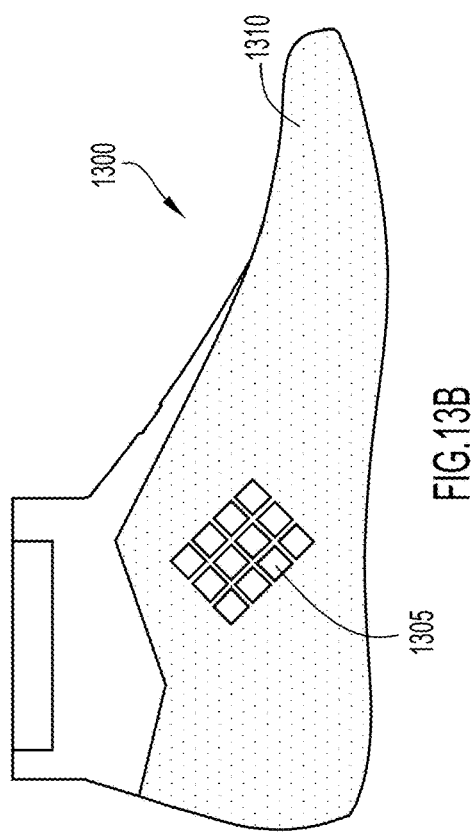
FIGS. 13A-13D depict a series of steps in a manufacturing process of a spray formed upper in which openings or windows can be formed within a spray formed layer (e.g., an exterior layer) of the upper to expose an underlying layer (e.g., a nonwoven or other fibrous fabric material layer) of the upper in accordance with an embodiment of the invention.
Figure 13D:
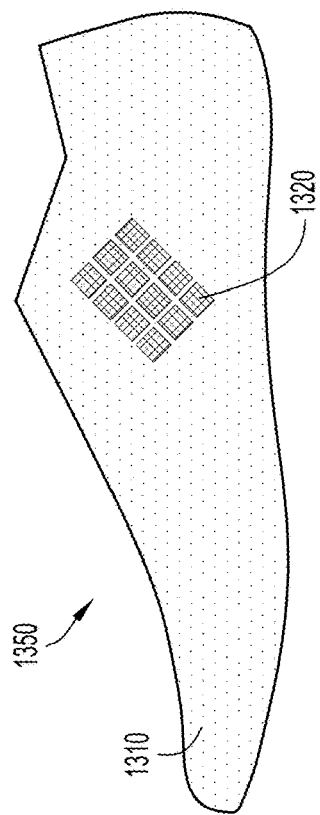
Figure 13A:
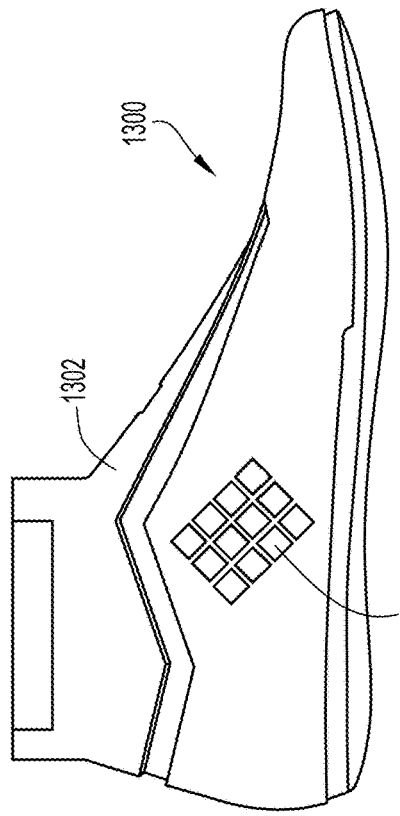
Figure 13C:
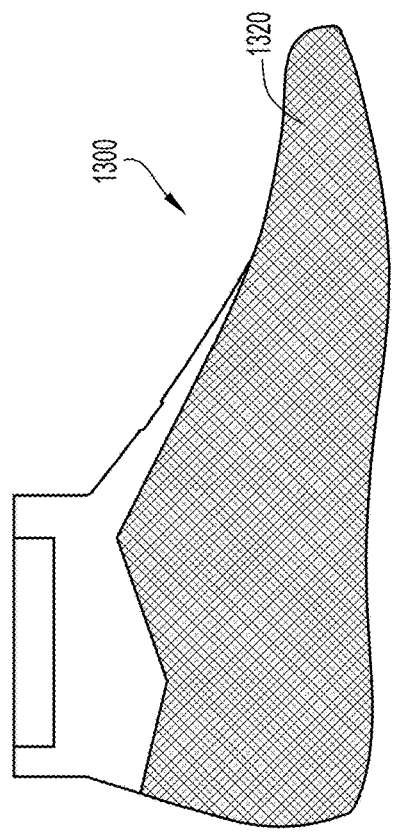

Referring to the example embodiment depicted in FIGS. 13A-13C, a last 1300 includes raised structural component features 1305 (FIG. 13A) at selected locations along one or more of its sides. A first polymer layer (e.g., PU) is spray formed so as to be deposited around and primarily or entirely within the channels defined between the raised structural component features 1305 of the last 1300 (note that portion 1302 of the last remains uncovered/not sprayed with polymer material to form the upper). While FIG. 13A only shows structural component features 1305 for the last 1300 at a selected area of the last (e.g., along a lateral or medial forming side of the last), it is noted that such structural component features can be provided along any one or more exterior surface areas of the last (e.g., along a majority of the exterior surfaces of the last).

The deposition of the polymer material by spray forming around the features 1305 and within the channels defined between the features 1305 can be achieved in a number of ways, including selective spray coating/depositing of the polymer material so as to avoid the features 1305 while spraying between the features 1305 (i.e., within the channels defined between the features), providing raised structural features that have angled upper surfaces to facilitate draining or self-leveling of the polymer material into the adjacent channels as the polymer material is spray coated on the last, providing chemically selective features within surface portions defining the channels and/or chemically repelling features on surface portions of the raised structures 1305 of the last 1300 (e.g., hydrophobic surface features, hydrophilic surface features, etc.) for the polymer material to be selectively spray deposited within the channels, etc. Upon spray forming the first layer 1310 on the last 1300, the layer 1310 can have a thickness that is the same or substantially similar to (but slightly smaller than) the lengths of the structural component features 1305 (FIG. 13B), such that openings are defined within the layer 1310 at the locations of the features 1305, and these openings translate to openings visible at the exterior surface of the upper after it is formed and removed from the last 1300.

A nonwoven or other fibrous material layer 1320 (FIG. 13C) can be spray formed over the last 1300 including layer 1310 (which will become the exterior polymer skin layer of the upper). The fibrous material layer 1320 adheres to the polymer skin layer 1310 such that, when removed from the last 1300 and turned inside out, the exterior skin layer 1310 forms a mesh or cage-like structure for the upper 1350 (FIG. 13D) in the areas corresponding with the structures 1305 on the last 1300 that is adhered to the nonwoven material layer, where portions of the fibrous material layer 1320 are also exposed to the exterior of the upper 1350 at the exposed areas or openings defined by the outer skin layer 1310.

This embodiment provides the upper with excellent breathability features due to the nonwoven material layer being exposed (i.e., not covered by the polymer skin layer having reduced breathability) at different areas along the upper while also having sufficient structural strength and integrity imparted to the upper by the polymer mesh or cage layer at the outer surface of the upper. In such embodiments, a nonwoven material layer can be provided so as to form a continuous inner lining layer of the upper (while also being exposed to the exterior at selected exterior surface portions of the upper).

The external polymer skin layer formed as a mesh or cage can further be formed with openings having any suitable sizes and/or shapes. In certain embodiments and for certain applications, it may be desirable to form the external polymer skin layer having openings such that the skin layer mesh structure defines a plurality of auxetic shaped patterns. Alternatively, the exterior surface of the external polymer skin layer can also have raised, three dimensional exterior surface features that comprise auxetic patterns (e.g., certain structural surface pattern features as depicted for the upper 500 as shown in FIG. 5). As previously noted, auxetics are structures or materials that have a negative Poisson's ratio such that, when stretched, they become thicker perpendicular to the applied force. The auxetic patterning of the external mesh polymer skin layer can impart certain features that enhance certain physical properties of the upper when the upper is stretched during use.

For certain applications (e.g., where less breathability for the upper is desired and/or greater structural strength is required), a nonwoven or other fibrous material layer can be provided only at certain portions of the upper and/or as an intermediate layer within a plurality of layers of the upper. For example, one or more nonwoven web material layers can be formed at openings or "windows" defined within and at selected portions of the exterior skin polymer layer. The windows can be defined, e.g., along lateral and/or medial sides of the upper where more breathability may be desired, while the exterior polymer skin layer is continuous (i.e., no windows or openings exposing the nonwoven web layers) at locations such as the heel end or toe cage of the upper. In such embodiments, nonwoven or other fibrous material layers can be selectively spray formed at only the locations of the last that define the windows for the exterior polymer skin layer (e.g., at large raised surface structures defined on the last). The fibrous material layers can be spray formed to cover and extend slightly beyond the window sections of the exterior polymer skin layer. Alternatively, an already formed/preformed fibrous material (e.g., a section of a nonwoven material web, or a section of staple fiber mat) can also be applied at the window sections instead of being spray formed at such window sections. A further polymer layer can then be spray formed over the portions of the exterior polymer skin layer that are not defined by the windows, where the further polymer layer is also spray formed over at least the edge portions of the nonwoven material layers so as to lock the nonwoven material layers in place at the window locations of the upper.

Figure 14A:
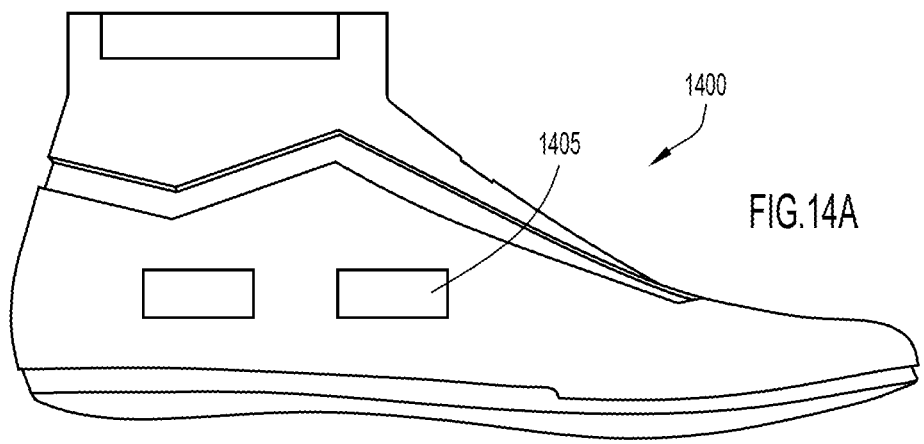
FIGS. 14A-14E depict a series of steps in a manufacturing process of a spray formed upper in which openings or windows can be formed within a spray formed layer (e.g., an exterior layer) of the upper to expose underlying and structural elements (e.g., pieces of nonwoven or other fibrous fabric materials) partially embedded within the upper in accordance with an embodiment of the invention.
Figure 14B:
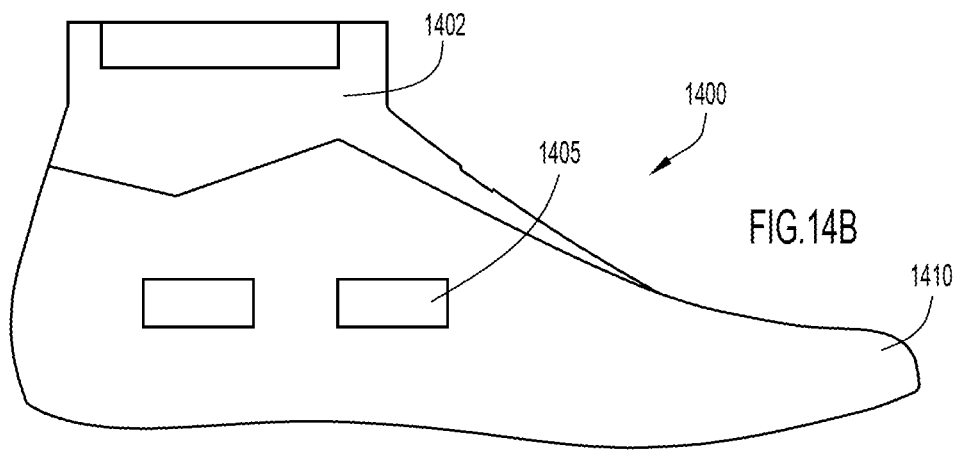
Figure 14C:
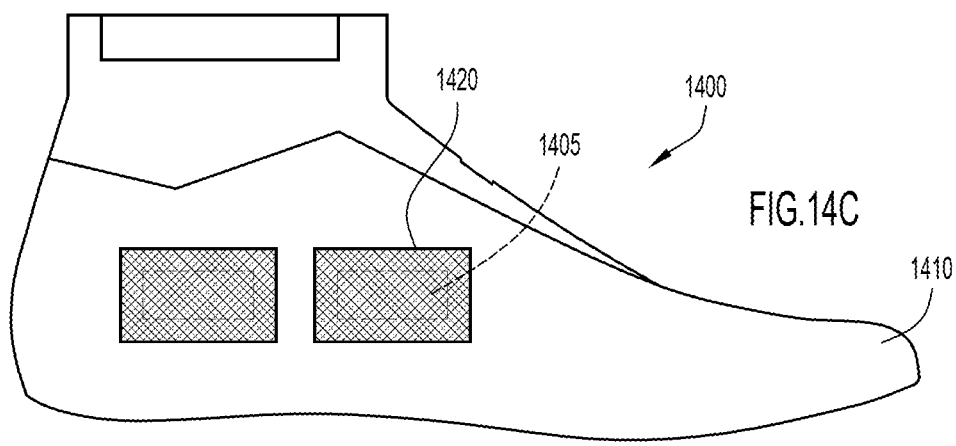
Figure 14D:
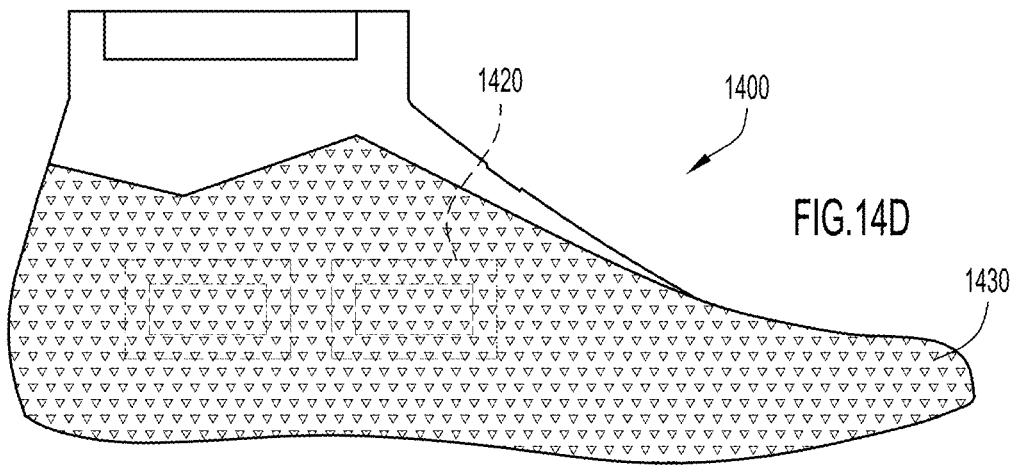
Figure 14E:
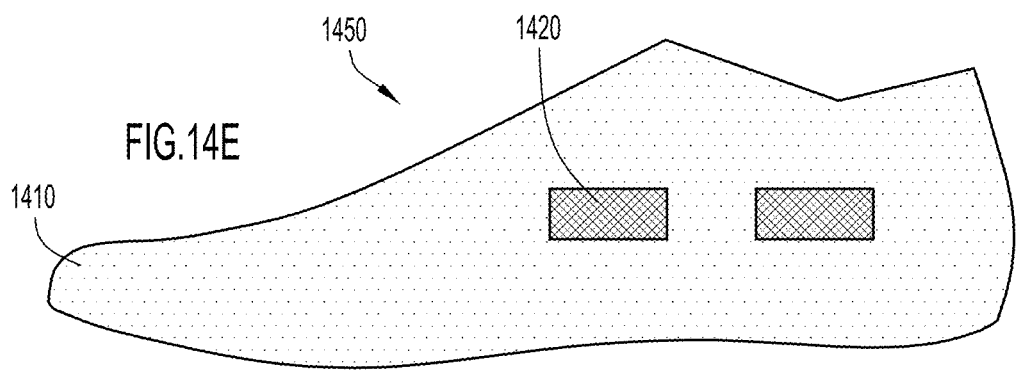

An example embodiment of forming windows in a spray formed layer of an upper with fibrous material structural component embedded within the upper and covering such windows is described with reference to FIGS. 14A-14E. Referring to FIG. 14A, a last 1400 includes exterior surface structural components comprising generally rectangular projections 1405 extending from a main exterior surface of the last 1400. The projections 1405 can be disposed, e.g., along lateral and medial forming sides of the last 1400. A first (e.g., PU) layer 1410 is spray formed over the last 1400 (FIG. 14B) to a thickness that is the same, substantially similar or slightly smaller than the lengths of the projections 1405 (note that portion 1402 of the last 1400 is not spray deposited with polymer material that forms the layer 1410 of the upper). Portions of, e.g., a fibrous material 1420 can be provided over the layer 1410 at the locations of the projections 1405 (FIG. 14C). The fibrous material can be spray formed over such locations. Alternatively, the fibrous material can comprise pieces of, e.g., a nonwoven fabric material, a knit fabric material, a woven fabric material and/or an embroidered fabric material. Each piece of fibrous/fabric material 1420 is suitably dimensioned to cover and extend slightly beyond (i.e., have a greater area than) the surface area of the corresponding opening in the layer 1410 (as defined by the corresponding projection 1405) which is covered by the fabric piece. A further material layer 1430 is then spray formed over the last to cover layer 1410 and also a portion of the perimeters defined by each fabric material 1420 (FIG. 14D), thus sufficiently securing each piece of fabric material 1420 between the layers 1410 and 1430. For example, a mask can be used when spray forming material layer 1430 over the last (where the mask is suitably aligned over the window locations that include fabric material 1420), such that the spray formed material layer 1430 does not cover fabric material 1420. When the spray formed upper 1450 is turned inside out and removed from the last 1400 (FIG. 14E), openings or windows within the layers 1410 and 1430 are covered by the fabric material 1420 to provide a desired porosity/breathability/air permeability for the upper 1450.

The embodiment of FIG. 14 is just one example of how windows can be formed in one or more layers of the upper (where the windows are formed in spray formed layers based upon structural components/raised structures provided on the last used to form the upper). In other example embodiments, the openings or windows in every spray formed layer can be formed/defined using a mask or plurality of masks.

In still further embodiments, a nonwoven or other fibrous material layer can be formed first on the last so as to become the exterior layer including exterior surface features imparted by the corresponding and negative image features defined on the last. Other layers (e.g., a PU layer, a polyester layer and/or a polyether layer) can then be spray formed over the nonwoven material layer. Alternatively, the upper can be formed entirely of a spray formed fibrous material layer. In certain embodiments, structural components can also be applied to the sprayed nonwoven material layer on the last, such as heel cup structural components (e.g., a heel counter element), lateral and/or medial side wall structural components (to strengthen the structural integrity of these sides of the upper), etc. followed by a further spray forming of nonwoven material over the structural components so as to lock such components in place within the upper.

Thus, the methods described herein facilitate the spray forming of an upper that includes nonwoven or other fibrous material within the upper (e.g., a single nonwoven material layer or a plurality of nonwoven material layers including structural components disposed within a single layer or between two or more layers).

In further embodiments, a fibrous/fabric material layer, such as a nonwoven, knit, woven or embroidered fabric layer, can be provided over a spray formed layer and then entirely embedded within the upper by spray forming a further layer entirely over the fibrous material layer. In such embodiments, the fibrous material layer can function as a reinforcing (e.g., fabric scrim) material embedded within the upper to add reinforcing structural support for the upper. In such embodiments, the embedded fabric layer can extend throughout the entire spray formed upper, through a majority (i.e., extending over 50% of the exterior surface defined by the upper) of the upper, or only at selected locations of the upper. Depending upon the type of fabric material to be embedded, the fabric material can either be sprayed onto the last (over an already spray formed layer) or preformed and applied to (e.g., pressed against) the last prior to spray forming a further layer.

In further examples, a fabric material, such as a knit fabric, a woven fabric, a nonwoven fabric, or an embroidered fabric, can be preformed and provided over a last to form a first layer. The fabric material can be a single, unitary (e.g., sock-like) member or, alternatively constructed in pieces that are secured together in any suitable manner (e.g., via stitching, adhesives, fabric tape, etc.). A second polymer material layer can be spray formed over the fabric layer. Upon removal of the upper from the last and turning the last inside out, the upper is defined by a fabric exterior surface and an interior polymer lining. Any suitably types of structural components and/or further spray formed layers can also be provided to form a multi-layer upper having a fabric look on the exterior while also having structural support and/or other desired features provided by other layers and/or structural components embedded within layers of the upper.

Breathability/air permeability for the upper can also be imparted without the use of fibrous material layers and/or in combination with fibrous material layers. In some embodiments, perforations or holes can be formed through at least the exterior polymer skin layer that is continuous (and optionally through other layers) of the upper so as to provide for air permeability through this layer. For example, in an embodiment in which a spray formed upper includes three layers, such as a relatively unbreathable PU plastic polymer exterior skin layer, a central PU open cell foam layer, and an inner nonwoven material layer forming the inner lining of the upper, perforations or holes can be formed within the PU exterior skin layer at selected locations of the upper to render a certain amount of breathability within the upper. Mechanical perforation of this exterior skin layer after it has been formed can cause undesirable damage to the layer (e.g., increasing the risk of rips or tears in this layer). Forming perforations by laser etching or laser cutting can be utilized to reduce the risk of damage to the layer. Utilizing the spray forming methods as described herein, external structural surface features can be provided on the last that also facilitate formation of perforations or openings in the exterior skin layer during the spray forming of this skin layer.

In one embodiment, the last can include raised elongated structural features, such as pillars, spikes or pins that are aligned along selected portions of and extend transversely from the exterior surface of the last. The raised elongated structures can have suitable lengths and transverse dimensions (e.g., diameters or widths) that respectively correspond with a desired thickness of the exterior polymer skin layer to be spray formed on the last and desired dimensions of the perforations to be formed within the skin layer. The polymer material (e.g., PU polymer) is spray formed on the last around the raised elongated structures up to about the length or height of the structures, with the further layers (e.g., PU open cell foam layer and a nonwoven material layer) then being spray formed over the skin layer. Removal of the upper results in the exterior skin layer having the perforations at the locations corresponding to the raised elongated structures on the last. In other embodiments, the perforations can be provided so as to extend through the entire thickness of the upper (i.e., the perforations extend through the combined thicknesses of all layers of the upper), where the elongated structures on the last have sufficient lengths that are greater than the overall or entire thickness of the upper that is spray formed over the last.

In another embodiment, the last can be formed as a hollow member that includes drain channels extending from the exterior surface of the last to its hollow interior or interior cavity. In spray forming a first layer over the last, the sprayed material forms on the surface of the last and drains at openings to the drain channels at the exterior surface of the last so as to define openings or perforations in the layer corresponding with the last drain channel openings. The last can further be formed to include surface features along the channels that inhibit or prevent adhering or sticking of the polymer material used to form the first sprayed layer along the channel walls and within the channels. For example, in an embodiment in which the polymer material that is first sprayed on the last is hydrophilic (or is provided in a carrier that is hydrophilic), the drain channels extending through the last can be formed such that the channel interior surface walls are hydrophobic (e.g., coated with a hydrophobic material) so as to inhibit adhering or sticking of polymer material draining through the channels (thus avoiding clogging of the channels). Thus, the last of this embodiment facilitates forming the upper so as to include perforations or openings in at least the external skin polymer layer.

In the embodiments described herein in relation to the drawings, the spray formed upper is formed as a single unitary three dimensional member that includes all of the boundary walls of the upper including the bottom wall (so as to be sock like in configuration) or to include all boundary walls with the exception of a bottom wall (where, in such embodiments, the upper can be secured to the sole structure via a strobel or other suitable bottom surface member). However, in other embodiments, an upper can be formed with one or more spray formed components that are then combined with each other or with other components (e.g., thermoformed or other formed components) to form the upper, such that one or more spray formed components can be removed from the last so as to have a generally planar configuration. For example, a spray formed upper component having one or more layers can be formed over portions of the last corresponding with the toe cage, lateral and medial sides of the upper, where such spray formed upper component (including structural features on the exterior skin surface) can then be combined with a heel cup member (e.g., a thermoformed heel cup member) and secured together (e.g., using a suitable adhesive, such as Bemis tape or any other suitable adhesion) to form the upper.

The methods described herein can further facilitate formation of an entire shoe using a spray forming process. For example, one or more suitable molds can be arranged in position with the spray formed upper (e.g., the spray formed upper can be re-lasted or placed on a last again after it has been spray formed) and a sole structure (e.g., midsole or combination of midsole with outsole) of one or more selected polymer materials can then be spray formed or injection molded within the mold(s) so as to adhere to lower surface portions or a bottom surface of the upper (e.g., when the upper is formed as a sock-like structure).

Figure 10D:
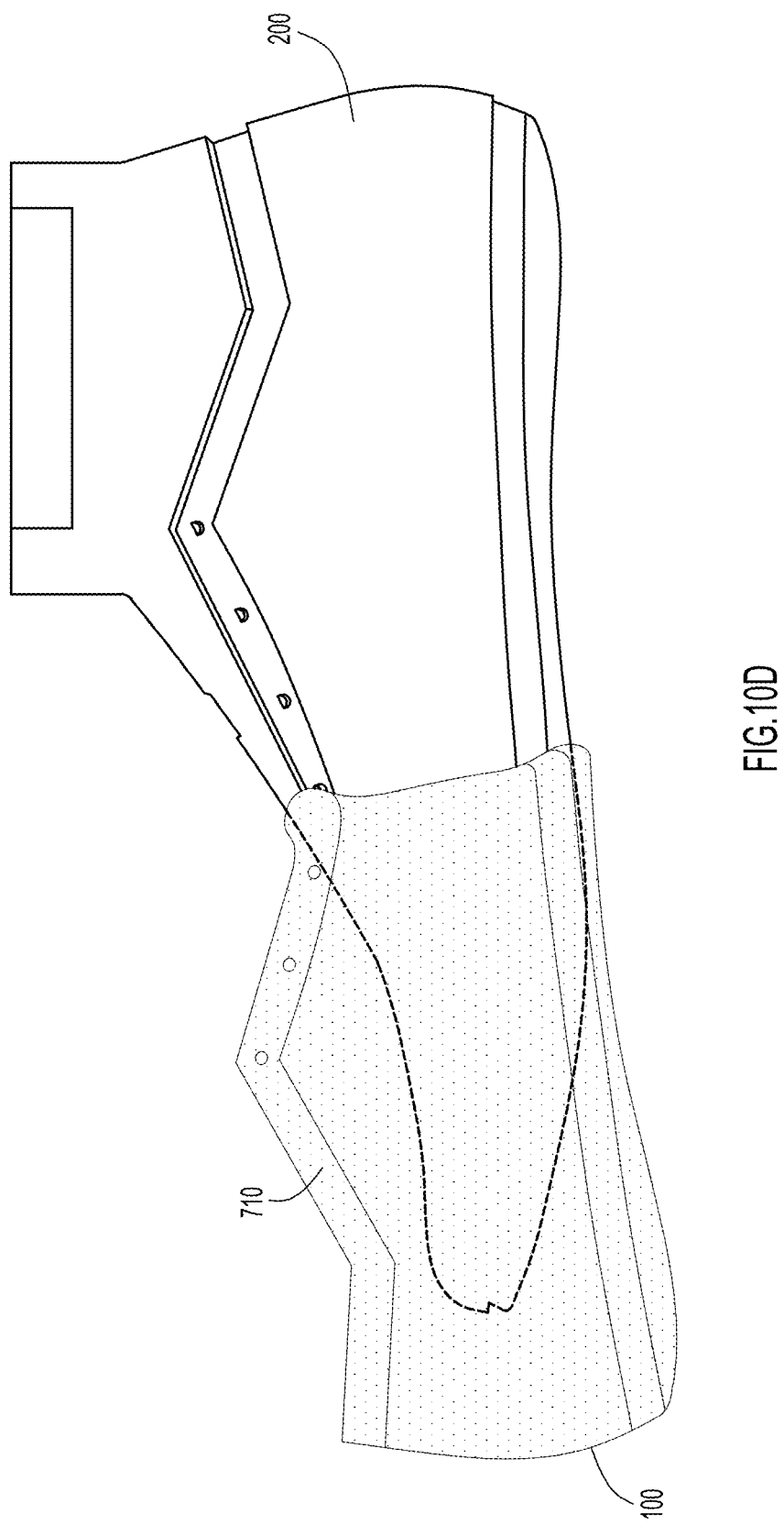
Figure 15:
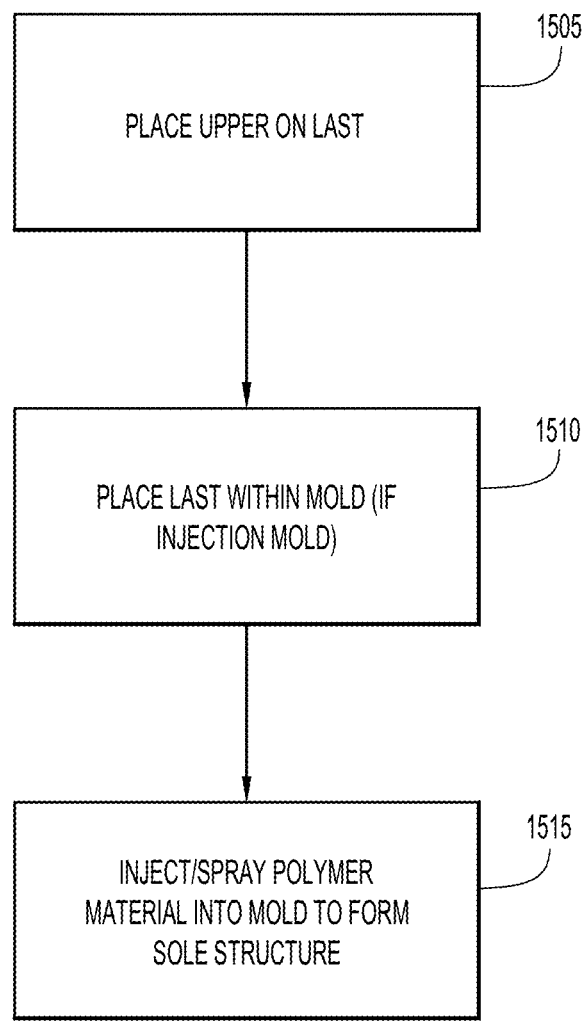
FIG. 15 depicts a flowchart that sets forth method steps for forming a shoe including a spray formed upper and a sole structure spray formed on or injection molded to the upper in accordance with embodiments of the invention.
Figure 16A:
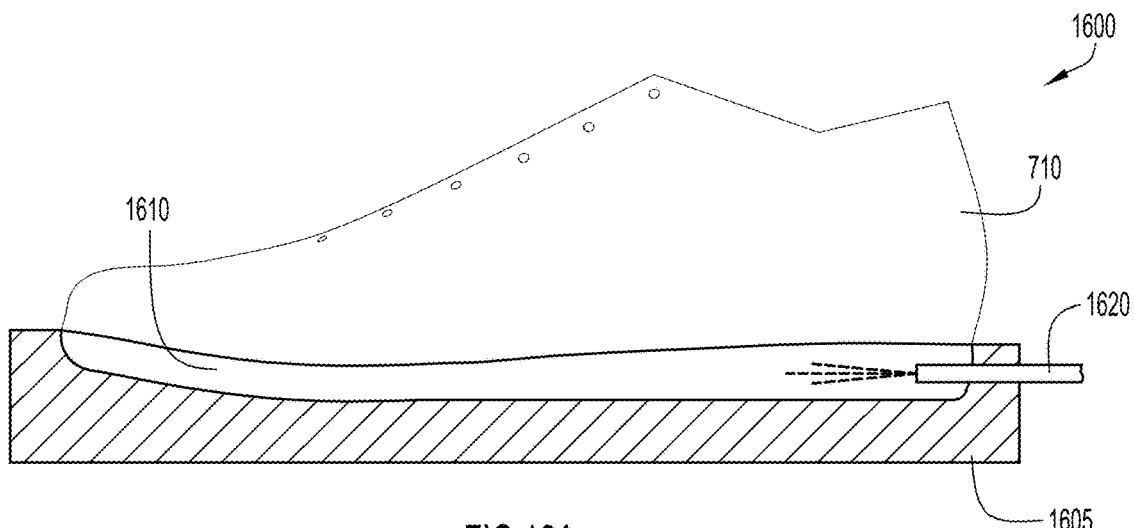
FIGS. 16A-16C depict a series of process steps for forming a shoe utilizing the process depicted in the flowchart of FIG. 15.
Figure 16B:
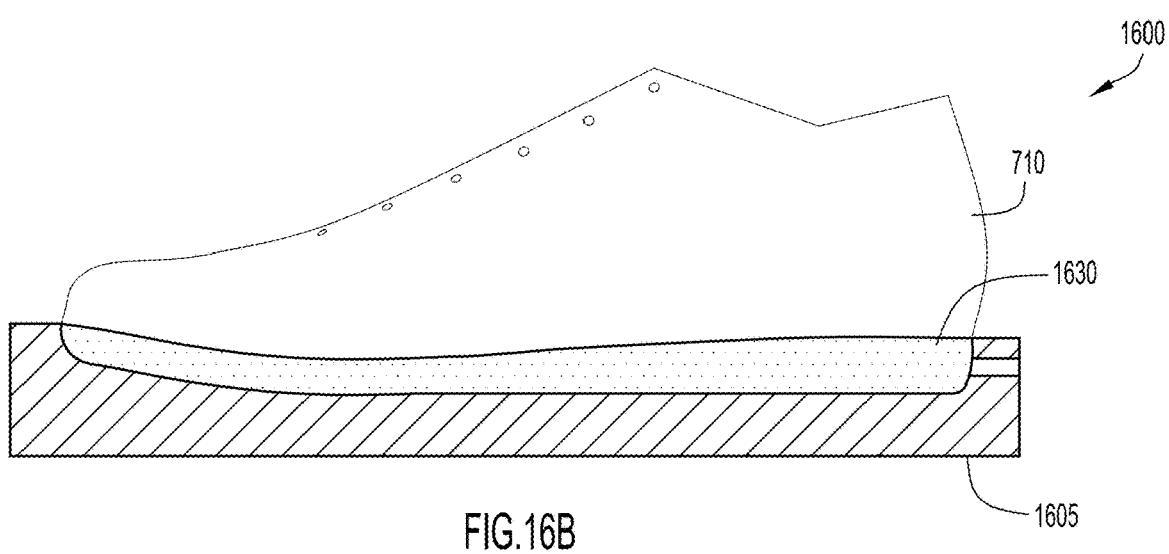
Figure 16C:
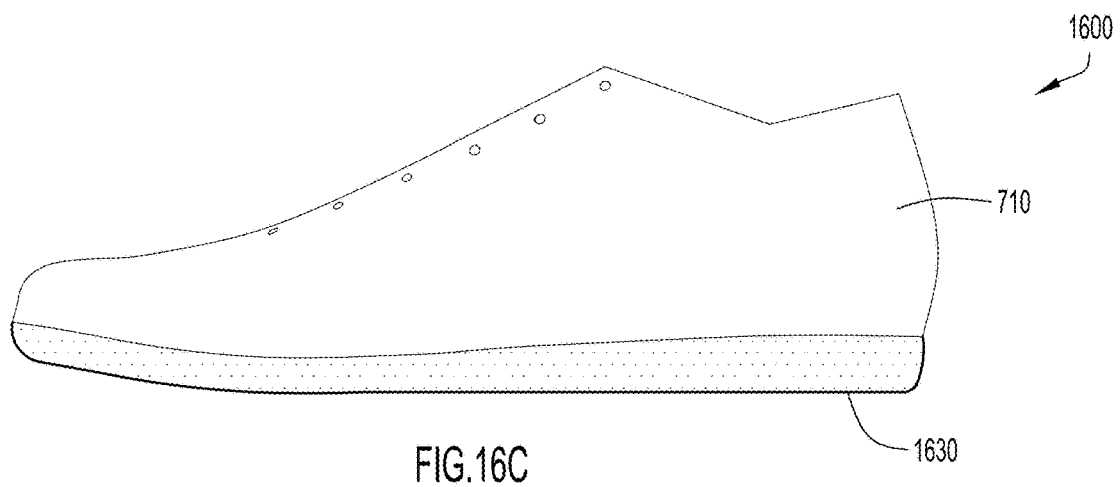

Referring to the flowchart of FIG. 15 and corresponding FIGS. 16A-16C, a process for forming an entire shoe (i.e., an upper combined with a sole structure) is described. The upper can initially be formed, e.g., utilizing the process as described herein and depicted in the flow chart process steps of FIG. 8. At 1505, the formed upper, which has been removed from the last (e.g., as depicted in FIG. 10D) can be placed on a last (the same last used to spray form the upper or, alternatively, a different last) in its final form such that the exterior surface of the upper remains exposed while on the last. As shown in FIG. 16A, an upper is fit on a last 1600 having its exterior surface 710 facing outward (i.e., away from the last). In this embodiment, the spray formed upper is formed as a sock-like structure including a bottom side.

At 1510, the last including the upper can be placed within a mold (if the process includes injection molding). The mold can enclose a portion of the last with upper or, alternatively, entirely enclose the last with upper. The mold further includes a cavity such that, when the last with upper is partially or entirely secured within the mold, the cavity is located below a lower surface of the upper (see FIG. 16A, upper with last 1600 is fit within a mold 1605 such that a mold cavity 1610 is located directly below a bottom surface of the upper). Alternatively, the sole structure can be spray formed onto the bottom surface of the upper in a manner similar to spray forming layers onto the last to form the upper.

At 1515, polymer material is injected molded into the mold cavity or, if spray formed, sprayed onto the bottom surface of the upper to form the sole structure (see, e.g., FIG. 16A, sole structure forming polymer material is injected into the cavity 1610 with an injection nozzle 1620). The mold can be configured such that one or more different types of polymer material are sprayed or injected into the mold cavity. This facilitates the formation of a sole structure formed of a single material or a sole structure formed of a combination of different materials that define different portions of the sole structure. For example, a sole structure can be formed with a midsole structure comprising a midsole material that provides a cushioning layer for the shoe and an outsole structure comprising an outsole material that is harder than the midsole material (i.e., the outsole material has a greater Shore A hardness value than that of the midsole material) and provides a durable, abrasion/wear resistant ground-engaging surface for the shoe. At FIG. 16B, the sole structure 1630 is formed by polymer material injected or spray formed within the mold cavity 1610, where the polymer material adheres to the bottom surface of the upper.

After the sole structure has sufficiently dried, hardened and/or cured, the upper with last 1600 can be removed from the mold 1605 (FIG. 16C).

In further embodiments for forming a shoe, structural elements, such as a hard plate (e.g., a nylon plate) or other suitable structure can be embedded by the spray forming or injection molding process used to form a sole structure at the bottom of the spray formed upper. In an example embodiment, a first polymer layer can be spray formed over the bottom surface of the upper (e.g., while the upper is supported on a last), a nylon plate or other suitable structural component can be applied to the sprayed formed layer, and a further layer can then be spray formed over the structural component so as to embed the structural component between the two spray formed layers (i.e., to embed the structural component within the sole structure formed at the bottom of the upper).

While the invention has been described in detail and with reference to specific embodiments thereof, it will be apparent to one skilled in the art that various changes and modifications can be made therein without departing from the spirit and scope thereof.

It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed:

1. A last for forming an upper of an article of footwear, the last comprising:
    an upper shaped main body portion that forms a main portion of the upper, the main body portion including a lateral side, a medial side, a toe end, and a heel end, and a top side that extends between the lateral side and the medial side and also between the toe end and the heel end; and
    a tongue forming portion connected with the main body portion and that forms a tongue portion of the upper, wherein the tongue forming portion extends upward and transversely outward in an angled manner away from and between the lateral and medial sides of the main body portion such that a terminal end of the tongue forming portion is distanced from the main body portion and also extends, in a direction transverse a lengthwise dimension of the last, beyond the lateral and medial sides of the main body portion;
    wherein an exterior surface of the last includes a plurality of three dimensional structural surface components.

2. The last of claim 1, wherein the structural surface components include a plurality of different patterns.

3. The last of claim 2, wherein at last one pattern repeats along a portion of the exterior surface.

4. The last of claim 2, wherein at least one pattern comprises a pattern of three dimensional structures that impart auxetic features to the upper formed on the last.

5. The last of claim 2, wherein at least one pattern comprises a pattern unit comprising raised ribs and grooves disposed between the ribs, and the pattern unit repeats over a portion of the exterior surface.

6. The last of claim 2, wherein at least one pattern comprises a plurality of arc shaped ribs with arc shaped grooves disposed between the arc shaped ribs, and the pattern is located along the lateral side and/or the medial side and at the toe end of the main body portion of the last.

7. The last of claim 1, wherein the structural surface components include elongated protrusions that facilitate formation of eyelet openings for an upper that is formed on the last.

8. The last of claim 1, wherein the last is hollow and includes an interior cavity.

9. The last of claim 1, wherein the upper shaped main body portion includes an interior cavity, and the interior cavity is at least partially filled with a thermal fluid that heats or cools the last.

10. The last of claim 8, wherein the last includes openings on the exterior surface that provide inlets to drain channels extending to the interior cavity.

11. The last of claim 1, wherein the last comprises a metal material.

12. The last of claim 1, wherein the last comprises a polymer material.

13. The last of claim 1, wherein the three dimensional structural surface components, disposed over at least 50% of the exterior surface of the last.

14. The last of claim 1, wherein the three dimensional structural surface components, disposed over at least 75% of the exterior surface of the last.

15. The last of claim 1, wherein the tongue forming portion includes an outwardly facing surface that faces away from the main body portion, and the outwardly facing surface has a concave contour that is oriented in the direction transverse the lengthwise dimension of the last, and the outwardly facing surface includes raised edges that define an angled transition to further surface portions of the tongue forming portion that extend from the outwardly facing surface back toward the main body portion.

16. The last of claim 15, wherein the angled transition defined between the raised edges and the further surface portions forms cut-in lines for the tongue portion of the upper formed on the last, and the cut-in lines facilitate separation between the tongue portion and the outwardly facing surface of the tongue forming portion during removal of the upper formed on the last.

17. A last for forming an upper of an article of footwear, the last comprising:
    an upper shaped main body portion including a lateral side, a medial side, a toe end, a heel end; and
    a tongue forming portion connected with the main body portion and that forms a tongue portion of the upper, the tongue forming portion extending upward and transversely outward in an angled manner away from the main body portion;
    wherein the tongue forming portion includes an outwardly facing surface that faces away from the main body portion, and the outwardly facing surface has a concave contour that is oriented in a direction transverse a lengthwise dimension of the last and between the lateral and medial sides of the main body portion, and the outwardly facing surface includes raised edges that define an angled transition to further surface portions of the tongue forming portion that extend from the outwardly facing surface back toward the main body portion.

18. The last of claim 17, wherein an exterior surface of the last includes a plurality of three dimensional structural surface components.

* * * * *